United States Patent
Hartmann et al.

(10) Patent No.: US 10,346,529 B2
(45) Date of Patent: *Jul. 9, 2019

(54) USING PHYSICAL OBJECTS IN CONJUNCTION WITH AN INTERACTIVE SURFACE

(71) Applicant: Microsoft Technology Licensing, LLC, Redmond, WA (US)

(72) Inventors: Björn U. Hartmann, San Mateo, CA (US); Andrew D. Wilson, Seattle, WA (US); Hrvoje Benko, Bellevue, WA (US); Meredith J. Morris, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 246 days.

This patent is subject to a terminal disclaimer.

(21) Appl. No.: 15/157,992

(22) Filed: May 18, 2016

(65) Prior Publication Data

US 2017/0024370 A1 Jan. 26, 2017

Related U.S. Application Data

(60) Continuation of application No. 13/851,797, filed on Mar. 27, 2013, now Pat. No. 9,372,552, which is a
(Continued)

(51) Int. Cl.
*G06F 3/033* (2013.01)
*G06F 3/0484* (2013.01)
(Continued)

(52) U.S. Cl.
CPC .......... *G06F 17/241* (2013.01); *G06F 3/0325* (2013.01); *G06F 3/03543* (2013.01);
(Continued)

(58) Field of Classification Search
CPC ................. G06F 17/241; G06F 17/242; G06F 17/30017; G06F 3/04883; G06F 3/04845;
(Continued)

(56) References Cited

U.S. PATENT DOCUMENTS

| 4,402,608 A | 9/1983 | DiMatteo et al. |
| 4,786,966 A | 11/1988 | Hanson et al. |

(Continued)

FOREIGN PATENT DOCUMENTS

| CN | 1378741 A | 11/2002 |
| CN | 101198964 | 6/2008 |

(Continued)

OTHER PUBLICATIONS

Liao, C. et al.; "PapierCraft: A Command System for Interactive Paper"; UIST '05; Oct. 23-27, 2005; Seattle, WA; 4 pages.
(Continued)

*Primary Examiner* — Md Saiful A Siddiqui
(74) *Attorney, Agent, or Firm* — Rainier Patents, P.S.

(57) ABSTRACT

An interaction management module (IMM) is described for allowing users to engage an interactive surface in a collaborative environment using various input devices, such as keyboard-type devices and mouse-type devices. The IMM displays digital objects on the interactive surface that are associated with the devices in various ways. The digital objects can include input display interfaces, cursors, soft-key input mechanisms, and so on. Further, the IMM provides a mechanism for establishing a frame of reference for governing the placement of each cursor on the interactive surface. Further, the IMM provides a mechanism for allowing users to make a digital copy of a physical article placed on the interactive surface. The IMM also provides a mechanism which duplicates actions taken on the digital copy with respect to the physical article, and vice versa.

20 Claims, 22 Drawing Sheets

Related U.S. Application Data division of application No. 12/241,281, filed on Sep. 30, 2008, now Pat. No. 8,427,424.

(51) Int. Cl.

| | | |
|---|---|---|
| *G06F 3/042* | (2006.01) | |
| *G06F 3/0482* | (2013.01) | |
| *G06F 3/0488* | (2013.01) | |
| *G06F 3/0481* | (2013.01) | |
| *G06F 17/24* | (2006.01) | |
| *G06F 16/40* | (2019.01) | |
| *G06F 3/041* | (2006.01) | |
| *G06F 3/0354* | (2013.01) | |
| *G06F 3/03* | (2006.01) | |

(52) U.S. Cl.
CPC .......... *G06F 3/0416* (2013.01); *G06F 3/0421* (2013.01); *G06F 3/0482* (2013.01); *G06F 3/04812* (2013.01); *G06F 3/04845* (2013.01); *G06F 3/04883* (2013.01); *G06F 3/04886* (2013.01); *G06F 16/40* (2019.01); *G06F 17/242* (2013.01); *G06F 2203/04808* (2013.01)

(58) Field of Classification Search
CPC ............. G06F 3/04812; G06F 3/04886; G06F 3/0421; G06F 3/0325; G06F 3/0416; G06F 3/0482; G06F 2203/04808; G06F 3/03543

See application file for complete search history.

(56) References Cited

U.S. PATENT DOCUMENTS

| | | | |
|---|---|---|---|
| 5,511,148 A * | 4/1996 | Wellner | H04N 1/00381 345/156 |
| 5,528,263 A * | 6/1996 | Platzker | G06F 3/011 345/156 |
| 5,552,839 A | 9/1996 | Kuhl | |
| 5,714,997 A | 2/1998 | Anderson | |
| 5,870,136 A | 2/1999 | Fuchs et al. | |
| 6,009,359 A | 12/1999 | El-Hakim et al. | |
| 6,252,579 B1 | 6/2001 | Rosenberg et al. | |
| 6,369,805 B1 | 4/2002 | Kuzunuki et al. | |
| 6,431,711 B1 | 8/2002 | Pinhanez | |
| 6,542,154 B1 | 4/2003 | Knittel | |
| 6,570,566 B1 | 5/2003 | Yoshigahara | |
| 7,027,040 B2 | 4/2006 | Rekimoto et al. | |
| 7,027,659 B1 | 4/2006 | Thomas | |
| 7,069,516 B2 | 6/2006 | Rekimoto | |
| 7,164,789 B2 | 1/2007 | Chen et al. | |
| 7,182,465 B2 | 2/2007 | Fuchs et al. | |
| 7,199,793 B2 | 4/2007 | Oh et al. | |
| 7,204,428 B2 | 4/2007 | Wilson | |
| 7,242,818 B2 | 7/2007 | Beardsley et al. | |
| 7,260,474 B1 | 8/2007 | Thayathil et al. | |
| 7,348,963 B2 | 3/2008 | Bell | |
| 7,379,047 B2 | 5/2008 | Drucker et al. | |
| 7,394,459 B2 | 7/2008 | Bathiche et al. | |
| 7,397,464 B1 | 7/2008 | Robbins et al. | |
| 7,479,967 B2 | 1/2009 | Bachelder et al. | |
| 7,576,727 B2 | 8/2009 | Bell | |
| 7,599,561 B2 | 10/2009 | Wilson et al. | |
| 7,747,067 B2 | 6/2010 | Popescu et al. | |
| 7,812,815 B2 | 10/2010 | Banerjee et al. | |
| 7,843,449 B2 | 11/2010 | Krah | |
| 7,942,530 B2 | 5/2011 | Majumder et al. | |
| 8,035,614 B2 | 10/2011 | Bell et al. | |
| 8,068,095 B2 | 11/2011 | Pryor | |
| 8,130,330 B2 | 3/2012 | Tan et al. | |
| 8,427,424 B2 | 4/2013 | Wilson et al. | |
| 8,570,320 B2 | 10/2013 | Izadi et al. | |
| 8,570,423 B2 | 10/2013 | Robinson et al. | |
| 8,730,309 B2 | 5/2014 | Wilson et al. | |
| 9,137,511 B1 | 9/2015 | LeGrand et al. | |
| 2001/0035845 A1 | 11/2001 | Zwern | |
| 2001/0044858 A1 * | 11/2001 | Rekimoto | G06F 3/011 710/1 |
| 2001/0048429 A1 | 12/2001 | Liao et al. | |
| 2002/0105623 A1 | 8/2002 | Pinhanez | |
| 2002/0158873 A1 | 10/2002 | Williamson | |
| 2003/0020707 A1 | 1/2003 | Kangas et al. | |
| 2003/0034976 A1 | 2/2003 | Raskar et al. | |
| 2003/0042401 A1 | 3/2003 | Gartner et al. | |
| 2003/0071784 A1 | 4/2003 | Sato et al. | |
| 2003/0227470 A1 | 12/2003 | Genc et al. | |
| 2004/0037450 A1 | 2/2004 | Bradski | |
| 2004/0046711 A1 | 3/2004 | Triebfuerst | |
| 2004/0046736 A1 | 3/2004 | Pryor et al. | |
| 2004/0183775 A1 | 9/2004 | Bell | |
| 2004/0257540 A1 | 12/2004 | Roy et al. | |
| 2005/0017739 A1 | 1/2005 | Hamren et al. | |
| 2005/0099603 A1 | 5/2005 | Thomas et al. | |
| 2005/0135670 A1 | 6/2005 | Vaidyanathan | |
| 2005/0185150 A1 | 8/2005 | Turner et al. | |
| 2006/0001645 A1 | 1/2006 | Drucker et al. | |
| 2006/0001650 A1 * | 1/2006 | Robbins | G06F 3/0421 345/173 |
| 2006/0036944 A1 | 2/2006 | Wilson | |
| 2006/0100930 A1 * | 5/2006 | Novak-Torre | G06Q 30/02 705/14.4 |
| 2006/0109239 A1 | 5/2006 | Hsiung | |
| 2006/0139314 A1 | 6/2006 | Bell | |
| 2006/0158452 A1 | 7/2006 | Borger et al. | |
| 2006/0230192 A1 * | 10/2006 | Parry | G06F 3/041 710/15 |
| 2006/0294247 A1 | 12/2006 | Hinckley et al. | |
| 2007/0013716 A1 | 1/2007 | Kjeldsen et al. | |
| 2007/0055782 A1 | 3/2007 | Wright et al. | |
| 2007/0124370 A1 | 5/2007 | Nareddy et al. | |
| 2007/0126864 A1 | 6/2007 | Bhat et al. | |
| 2007/0126938 A1 | 6/2007 | Tan et al. | |
| 2007/0132733 A1 | 6/2007 | Ram | |
| 2007/0134456 A1 | 6/2007 | Fritschen | |
| 2007/0139386 A1 * | 6/2007 | Martin | G06F 3/04886 345/173 |
| 2007/0247422 A1 | 10/2007 | Vertegaal et al. | |
| 2007/0299338 A1 | 12/2007 | Stevick et al. | |
| 2008/0002262 A1 | 1/2008 | Chirieleison | |
| 2008/0007567 A1 | 1/2008 | Clatworthy et al. | |
| 2008/0031327 A1 | 2/2008 | Wang et al. | |
| 2008/0095468 A1 | 4/2008 | Klemmer et al. | |
| 2008/0180402 A1 | 7/2008 | Yoo et al. | |
| 2008/0199071 A1 | 8/2008 | Gu | |
| 2008/0214233 A1 | 9/2008 | Wilson et al. | |
| 2008/0229194 A1 * | 9/2008 | Boler | G06F 3/002 715/700 |
| 2008/0231634 A1 | 9/2008 | Gyde et al. | |
| 2008/0246781 A1 | 10/2008 | Surati et al. | |
| 2008/0263458 A1 | 10/2008 | Altberg et al. | |
| 2008/0285843 A1 | 11/2008 | Lim | |
| 2008/0316201 A1 | 12/2008 | Nayer et al. | |
| 2009/0027330 A1 | 1/2009 | Aida | |
| 2009/0037841 A1 | 2/2009 | Bell et al. | |
| 2009/0091581 A1 | 4/2009 | Lapa | |
| 2009/0109280 A1 | 4/2009 | Gotsman et al. | |
| 2009/0124379 A1 | 5/2009 | Wells | |
| 2009/0128783 A1 | 5/2009 | Shih et al. | |
| 2009/0143141 A1 | 6/2009 | Wells et al. | |
| 2009/0149250 A1 | 6/2009 | Middleton | |
| 2009/0167966 A1 | 7/2009 | Nam et al. | |
| 2009/0215533 A1 | 8/2009 | Zalewski et al. | |
| 2009/0217187 A1 | 8/2009 | Kendall et al. | |
| 2009/0237564 A1 | 9/2009 | Kikinis et al. | |
| 2009/0244309 A1 | 10/2009 | Maison et al. | |
| 2010/0037273 A1 | 2/2010 | Dressel et al. | |
| 2010/0073366 A1 | 3/2010 | Tateno | |
| 2010/0073476 A1 | 3/2010 | Liang et al. | |
| 2010/0103196 A1 | 4/2010 | Kumar et al. | |
| 2010/0103386 A1 | 4/2010 | Kikinis et al. | |
| 2010/0128112 A1 | 5/2010 | Marti et al. | |
| 2010/0164990 A1 | 7/2010 | Van Doorn | |
| 2010/0182416 A1 | 7/2010 | Holmgren et al. | |

(56) References Cited

U.S. PATENT DOCUMENTS

| | | |
|---|---|---|
| 2010/0194863 A1 | 8/2010 | Lopes et al. |
| 2010/0194872 A1 | 8/2010 | Mathe et al. |
| 2010/0199230 A1 | 8/2010 | Latta et al. |
| 2010/0201878 A1 | 8/2010 | Barenbrug et al. |
| 2010/0201894 A1 | 8/2010 | Nakayama et al. |
| 2010/0225743 A1 | 9/2010 | Florencio et al. |
| 2010/0281432 A1 | 11/2010 | Geisner et al. |
| 2010/0315491 A1 | 12/2010 | Carter et al. |
| 2010/0330843 A1 | 12/2010 | Gao et al. |
| 2011/0018903 A1 | 1/2011 | Lapstun et al. |
| 2011/0025689 A1 | 2/2011 | Perez et al. |
| 2011/0058709 A1 | 3/2011 | Kipman et al. |
| 2011/0107216 A1 | 5/2011 | Bi |
| 2011/0205242 A1 | 8/2011 | Friesen |
| 2011/0205341 A1 | 8/2011 | Wilson et al. |
| 2011/0216948 A1 | 9/2011 | Valla et al. |
| 2011/0234481 A1 | 9/2011 | Katz et al. |
| 2011/0263326 A1 | 10/2011 | Gagner et al. |
| 2011/0304691 A1 | 12/2011 | Newton et al. |
| 2011/0316845 A1 | 12/2011 | Roberts et al. |
| 2012/0086624 A1 | 4/2012 | Thompson et al. |
| 2012/0105585 A1 | 5/2012 | Masalkar et al. |
| 2012/0113223 A1 | 5/2012 | Hilliges et al. |
| 2012/0117514 A1 | 5/2012 | Kim et al. |
| 2012/0140038 A1 | 6/2012 | Bi et al. |
| 2012/0154277 A1 | 6/2012 | Bar-Zeev et al. |
| 2012/0154619 A1 | 6/2012 | Lee |
| 2012/0157204 A1 | 6/2012 | Kelsey et al. |
| 2012/0162254 A1 | 6/2012 | Anderson et al. |
| 2012/0194516 A1 | 8/2012 | Newcombe et al. |
| 2012/0194517 A1 | 8/2012 | Izadi et al. |
| 2012/0212509 A1 | 8/2012 | Benko et al. |
| 2012/0223885 A1 | 9/2012 | Perez et al. |
| 2012/0223909 A1 | 9/2012 | Tse et al. |
| 2012/0264510 A1 | 10/2012 | Wigdor et al. |
| 2012/0268570 A1 | 10/2012 | Trumbull |
| 2012/0274745 A1 | 11/2012 | Russell |
| 2012/0293547 A1 | 11/2012 | Perez et al. |
| 2012/0315965 A1 | 12/2012 | Bathiche |
| 2013/0002815 A1 | 1/2013 | Smoot et al. |
| 2013/0069985 A1 | 3/2013 | Wong et al. |
| 2013/0147686 A1 | 6/2013 | Clavin et al. |
| 2013/0187835 A1 | 7/2013 | Vaught et al. |
| 2013/0229353 A1 | 9/2013 | Hartmann et al. |
| 2013/0336629 A1 | 12/2013 | Mulholland et al. |
| 2014/0051510 A1 | 2/2014 | Benko et al. |
| 2014/0125785 A1 | 5/2014 | Na et al. |
| 2014/0247263 A1 | 9/2014 | Wilson et al. |
| 2014/0253692 A1 | 9/2014 | Wilson et al. |
| 2015/0049001 A1 | 2/2015 | Rahman et al. |

FOREIGN PATENT DOCUMENTS

| | | |
|---|---|---|
| EP | 0622722 A2 | 11/1994 |
| JP | 04-056993 | 2/1992 |
| JP | 04-328627 | 11/1992 |
| JP | H05289814 A | 11/1993 |
| JP | H07129319 | 5/1995 |
| JP | HEI 07-168949 | 7/1995 |
| JP | HEI 09-46776 | 2/1997 |
| JP | H11134327 | 5/1999 |
| JP | 2000322367 | 11/2000 |
| JP | 2001-175374 | 6/2001 |
| JP | 2005031747 A | 2/2005 |
| JP | 2006-148730 | 6/2006 |
| JP | 2007-226406 | 6/2007 |
| JP | 2007299384 | 11/2007 |
| JP | 2008-033844 | 2/2008 |
| JP | 2008-112077 | 5/2008 |
| JP | 2012-510673 | 5/2012 |
| KR | 1020020040773 | 5/2002 |
| KR | 1020020079847 | 10/2002 |
| KR | 100811015 B1 | 2/2008 |
| TW | 200531747 | 10/2005 |
| WO | 2005017739 A1 | 2/2005 |
| WO | 2007134456 A1 | 11/2007 |
| WO | 2009/069958 A2 | 6/2009 |
| WO | 2010/019802 A1 | 2/2010 |
| WO | 2011/106201 A2 | 9/2011 |

OTHER PUBLICATIONS

Lin, et al., "DENIM: Finding a Tighter Fit Between Tools and Practice for Web Site Design," Proceedings of the SIGCHI Conference on Human Factors in Computing Systems, 2000, pp. 510-517, 8 pages.

Matsushita, et al., "HoloWall: Designing a Finger; Hand, Body, and Object Sensitive Wall," UIST 97, Banff, Alberta, Canada, ACM Press, 1997, pp. 209-210, 2 pages.

"Microsoft Surface" homepage, available at ,<http://www.surface.com>>, accessed on Jan. 7, 2009, 1 page.

Moggridge, Designing Interactions, book published by MIT Press, 2007, table of contents, available at <<http://www.designinginteractions.com/chapters>>, accessed on Jan. 8, 2009, 1 page.

Moraveji, et al., "Mischief: Supporting Remote Teaching in Developing Regions," Proceedings of the Twenty-Sixth Annual SIGCHI Conference on Human Factors in Computing Systems, 2008, pp. 353-362, 10 pages.

Newman, et al., "Sitemaps, Storyboards, and Specifications: a Sketch of Web Site Design Practice," Proceedings of the 3rd Conference on Designing Interactive Systems: Processes, Practices, Methods, and Techniques 2000, pp. 263-274, 12 pages.

Olsen, et al., "Spilling: Expanding Hand Held Interaction to Touch Table Displays," Second Annual IEEE International Workshop on Horizontal Interactive Human-Computer System, 2007, pp. 163-170, 8 pages.

"Optimus Maximus keyboard," Art Lebedev Studio, available at <<http://www.artlebedev.com/everything/optimus/>>, accessed on Jan. 5, 2009, 5 pages.

Parker, et al., "TractorBeam: Seamless Integration of Local and Remote Pointing for Tabletop Displays," Proceedings of Graphics Interface 2005, 2005, pp. 33-40, 8 pages.

Patten, et al., "Sensetable: A Wireless Object Tracking Platform for Tangible User Interfaces," Proceedings of CHI 2001, ACM Press, Mar. 31-Apr. 5, 2001, 8 pages.

Piper, et al., "Illuminating Clay: A 3-D Tangible Interface for Landscape Analysis," retrieved at <<http://citeseerx.ist.psu.edu/viewdoc/downloand?doi=10.1.1.16.5243&rep=rep1&type=pdf>>, Proceedings of the SIGCHI Conference on Human Factors in Computing Systems, 2002, 8 pages.

Rekimoto, et al., "Augmented Surfaces: a Spatially Continuous Work Space for Hybrid Computing Environments," Proceedings of the SIGCHI Conference on Human Factors in Computing Systems; the CHI is the Limit, 1999, pp. 378-385, 8 pages.

Rekimoto, et al., "Data Tiles: a Modular Platform for Mixed Physical and Graphical Interactions," Proceedings of the SIGCHI Conference on Human Factors in Computing Systems, 2001, pp. 269-276, 8 pages.

Shen, et al., "DiamondSpin: an Extensible Toolkit for Around-the-Table Interaction," Proceedings of the SIGCHI Conference on Human Factors in Computing Systems, 2004, pp. 167-174, 8 pages.

Sokoler, et al., "Physically Embodied Video Snippets Supporting Collaborative Exploration of Video Material During Design Sessions," Proceedings of the Second Nordic Conference on Human-Computer Interaction, 2002, pp. 139-148, 10 pages.

Starner, et al., "The Perceptive Workbench: Computer-vision-based Gesture Tracking, Object Tracking, and 3D Reconstruction for Augmented Desks," retrieved at <<http://www.amyhurst.com/publications/starner-perceptive-mva03.pdf>>, Machine Vision and Applications, vol. 14, Springer-Verlag, 2003, pp. 59-71, 13 pages.

Subrahmanian, et al., "Boundary Objects and Prototypes at the Interfaces of Engineering Design," Computer Supported Cooperative Work, vol. 12, Issue 2, 2003, pp. 185-203, ACM abstract provided only, 2 pages.

Tang, et al., "A Framework for Understanding the Workspace Activity of Design Teams," Proceedings of the 1988 ACM Conference on Computer-Supported Cooperative Work, 1988, pp. 244-249, 6 pages.

(56) References Cited

OTHER PUBLICATIONS

Ullmer, et al., "The metaDESK: Models and Prototypes for Tangible User Interfaces," Proceedings of the 10th Annual ACM Symposium on User Interface Software and Technology, 1997, pp. 223-232, 10 pages.
Underkoffler, et al., "Urp: a Lumious-Tangible Workbench for Urban Planning and Design," Proceedings of the SIGCHI Conference on Human Factors in Computing Systems: the CHI is the Limit, 1999, pp. 386-393, 8 pages.
Wellner, P.; "Interacting with Paper on the DigitalDesk"; Communications of the ACM; vol. 36, Nol. 7; Jul. 1993; 17 pages.
Wilson, et al., "Bringing Physics to the Surface," Proceedings of the 21st Annual ACM Symposium on User Interface Software and Technology, 2008, pp. 67-76, 10 pages.
Wilson, et al., "FlowMouse: A Computer Vision-Based Pointing and Gesture Input Device," accessible at <<http://research.microsoft.com/~cutrell/Interact 2005FlowMouse.pdf>>, Interact, 2005, 14 pages.
Wu, M et al.; "Gesture Registration, Relaxation, and Reuse for Multi-Point Direct-Touch Surfaces"; Proceedings of the First IEEE International Workshop on Horizontal Interactive Human-Computer Systems; 2006; pp. 1-8, 8 pages.
Zhang, et al., "Visual Panel: Virtual Mouse, Keyboard and 3D Controller with an Ordinary Piece of Paper," Proceedings of the 2001 Workshop on Perceptive User Interfaces, 2001, 8 pages.
PCT Application PCT/US2009/054607; Search Report and Written Opinion dated Apr. 6, 2010, 7 pages.
CN Patent Application 200980139375.3; First Office Action dated Dec. 18, 2012; 14 pages.
Japan Patent Office, Office Action dated Oct. 1, 2013 in JP 2011-530082 Filed Aug. 21, 2009, 8 pages.
CN Patent Application 200980139375.3; Third and Final Office Action dated Jan. 8, 2014; 10 Pages.
JP Response to First Office Action dated Oct. 1, 2013 for Application No. 2011-530082, Filed Dec. 26, 2013, 11 pages.
Notice of Allowance dated Apr. 5, 2016 from Japan Patent Application No. 2014-0142550, 5 pages.
CN200980139375.3, Response to Notice of Re-examinatin dated Aug. 7, 2014, filed Oct. 9, 2014, 11 pages.
CN Response to the First Office Action dated Dec. 18, 2012 for Application No. 200980139375.3, as Filed Apr. 19, 2013, 14 pages.
CN Second Office Action dated Aug. 7, 2013 for Application No. 200980139375.3, 11 pages.
CN Response to the Second Office Action dated Aug. 7, 2013 for Application No. 200980139375.3, as Filed Aug. 30, 2013, 15 pages.
"Notice on Re Examination received for Chinese Patent Application No. 200980139375.3", dated Aug. 7, 2014, 5 pages.
Non-Final Office Action dated Dec. 24, 2012 from U.S. Appl. No. 12/819,230, 18 pages.
Response filed Mar. 24, 2013 to Non-Final Office Action dated Dec. 24, 2012 from U.S. Appl. No. 12/819,230, 16 pages.
Final Office Action dated May 9, 2013 from U.S. Appl. No. 12/819,230, 20 pages.
Response filed Oct. 11, 2013 to Final Office Action dated May 9, 2013 from U.S. Appl. No. 12/819,230, 13 pages.
Notice of Allowance dated Jan. 8, 2014 from U.S. Appl. No. 12/819,230, 9 pages.
International Search Report and Written Opinion dated Oct. 24, 2011 from PCT Patent Application No. PCT/US2011/024925, 11 pages.
Notice on the First Office Action dated Jun. 20, 2013 from China Patent Application No. 201180010523.9, 24 pages.
Response filed Oct. 30, 2013 to the First Office Action dated Jun. 20, 2013 from China Patent Application No. 201180010523.9, 11 pages.
Search Report dated May 13, 2014 from European Patent Application No. 11747870.1, 3 pages.
Examination Report dated May 23, 2014 from European Patent Application No. 11747870.1, 7 pages.
Response to Examination Report filed Jun. 25, 2014 from European Patent Application No. 11747870.1, 10 pages.
Summons to Oral Proceedings dated Nov. 10, 2014 from European Patent Application No. 11747870.1, 9 pages.
Decision to Refuse dated Jun. 3, 2015 from European Patent Application No. 11747870.1, 4 pages.
Request for Examination and Voluntary Amendment filed Jan. 29, 2014 from Japan Patent Application No. 2012-555036, 6 pages.
Office Action dated Dec. 4, 2014 from Japan Patent Application No. 2012-555036, 4 pages.
Response filed Feb. 10, 2015 from Japan Patent Application No. 2012-555036, 9 pages.
Decision to Grant dated Apr. 21, 2015 from Japan Patent Application No. 2012-555036, 5 pages.
Office Action dated Aug. 25, 2015 from Japan Patent Application No. 2014-142550, 8 pages.
Office Action dated Aug. 18, 2015 from Japan Patent Application No. 2014-142551, 8 pages.
Notice of Allowance dated Jan. 8, 2014 from China Patent Application No. 201180010523.9, 8 pages.
Notice of Allowance dated Aug. 5, 2014 from Japan Patent Application No. 2011-530082, 5 pages.
Response filed Nov. 16, 2015 to Office Action dated Aug. 18, 2015 from Japan Patent Application No. 2014-142551, 9 pages.
Final Office Action dated Nov. 27, 2015 from U.S. Appl. No. 13/084,786, 22 pages.
Notice of Allowance dated Jan. 4, 2016 from U.S. Appl. No. 13/074,041, 5 pages.
Response filed Nov. 20, 2015 to Office Action dated Aug. 25, 2015 from Japan Patent Application No. 2014-0142550, 8 pages.
Voluntary Amendment filed May 29, 2014 from China Patent Application No. CN 201210037666.5, 13 pages.
International Preliminary Report on Patentability dated Apr. 5, 2011 from PCT Patent Application No. PCT/US2009/054607, 5 pages.
Nakashima et al., "An Integrated 2D-3D Work Environment for Cooperative Modeling," Journal of Electronics, Information and Communication Engineers Technical Report, vol. 103, Issue 639, Jan. 26, 2004, pp. 41-46, 6 pages.
Response to Second Office Action filed Jul. 10, 2014 from Japanese Patent Application No. 2011-530082, 6 pages.
Appeal and Amendment filed Aug. 9, 2016 from Japan Patent Application No. 2014-142551, 12 pages.
U.S. Appl. No. 61/307,422, filed Feb. 23, 2010, entitled "Projector and Depth Camera Systems for Deviceless Augmented Reality and Interaction," Inventor: Wilson et al., 18 pages.
International Preliminary Report on Patentability dated Sep. 7, 2012 from PCT Patent Application No. PCT/US2011/024925, 5 pages.
Preliminary Amendment and Terminal Disclaimer filed Jun. 13, 2016 from U.S. Appl. No. 14/281,885, 10 pages.
Notice of Allowance dated Aug. 12, 2016 from U.S. Appl. No. 14/281,885, 81 pages.
First Office Action dated Feb. 23, 2016 from China Patent Application No. 201210037666.5, 10 pages.
Response filed Jul. 11, 2016 to First Office Action dated Feb. 23, 2016 from China Patent Application No. 201210037666.5, 16 pages.
Office Action dated Apr. 12, 2016 from Japan Patent Application No. 2014-142551, 6 pages.
Third Office Action dated Mar. 14, 2017 from Japanese Patent Application No. 2014-142551, 10 pages. (With No English Translation).
Zhang, Zhengyou, "A Flexible New Technique for Camera Calibration", Proceedings of the IEEE Transactions on Pattern Analysis and Machine Intelligence, vol. 22, Issue 11, Nov. 1, 2000, pp. 1330-1334, 5 pages.
Fuchs et al., "Augmented Reality Visualization for Laparoscopic Surgery," Lecture Notes in Computer Science, vol. 1496, Proceedings of the First International Conference on Medical Image Computing and Computer-Assisted Intervention, Oct. 11-13, 1998, 10 pages.
Gargallo et al., "Bayesian 3D Modeling from Images using Multiple Depth Maps", Proceedings of the 2005 IEEE Computer Society

(56) References Cited

OTHER PUBLICATIONS

Conference on Computer Vision and Pattern Recognition (CVPR'05), vol. 2, Jun. 20-26, 2005, 7 pages.
Gingichashvili, Sarah, "Play/Anywhere—Microsoft's Interactive Playground," retrieved at <<http://thefutureofthings.com/news/1037/playanywhere-microsofts-interactiv-e-playground.html>>, Nov. 2, 2007, 2 pages.
Nguyen et al., "Depth Image-Based Rendering from Multiple Cameras with 3D Propagation Algorithm," International Conference on Immersive Telecommunications, Proceedings of the 2nd International Conference on Immersive Telecommunications, May 27-29, 2009, 6 pages.
Ohta et al., "Share-Z: Client/Server Depth Sensing for See-Through Head Mounted Displays," Presence: Teleoperators and Virtual Environments, vol. 11, No. 2, Apr. 2002, 9 pages.
Wilson, Andrew D., "Depth-Sensing Video Cameras for 3D Tangible Tabletop Interaction," in Proceedings of Second Annual IEEE International Workshop on Horizontal Interactive Human-Computer Systems (Tabletop 2007), Oct. 10-12, 2007, pp. 201-204, 4 pages.
Zhou et al., "Multiple-Projector Display with Continuous Self-Calibration," International Conference on Computer Graphics and Interactive Techniques, Proceedings of the 5th ACM/IEEE International Workshop on Projector Camera Systems, Aug. 10, 2008, 7 pages.
Ngan, et al., "Calibrating a Pan-tilt Camera Head", In Image and Vision Computing Workshop, Dec. 1995, 6 Pages.
"International Search Report & Written Opinion Issued in PCT Application No. PCT/US2012/026823", dated Sep. 28, 2012, 6 Pages.
Pinhanez, Claudio, "Augmenting Reality with Projected Interactive Displays", In Proceedings of the International Symposium on Virtual and Augmented Architecture, Jun. 21, 2001, 9 Pages.
Pinhanez, Claudio, "The Everywhere Displays Projector: A Device to Create Ubiquitous Graphical Interfaces", In Proceedings of the 3rd International Conference on Ubiquitous Computing, Sep. 30, 2001, 18 Pages.
Raskar, et al., "iLamps: Geometrically Aware and Self-Configuring Projectors", In Proceedings of ACM Transactions on Graphics, vol. 22, Issue 3, Jul. 30, 2006, 10 Pages.
Raskar, et al., "Multi-Projector Displays Using Camera-Based Registration", In Proceedings of the Conference on Visualization, Oct. 24, 1999, 9 Pages.
Sodhi, et al., "Kinect-Projector Calibration", In CS 498 Computational Photography—Final Project, University of Illinois at Urbana-Champaign, Dec. 14, 2010, 11 Pages.
Extended Search Report dated Jan. 30, 2017 from European Patent Application No. 09818173.8, 15 pages.
Notice of Allowance dated Mar. 2, 2015 from Chinese Patent Application No. 200980139375.3, 7 pages.
Non-Final Office Action dated Apr. 2, 2015 from U.S. Appl. No. 13/074,041, 19 pages.
Restriction Requirement dated Jun. 21, 2011 from U.S. Appl. No. 12/241,281, 7 pages.
Response filed Jul. 20, 2011 to Restriction Requirement dated Jun. 21, 2011 from U.S. Appl. No. 12/241,281, 7 pages.
Non-Final Office Action dated Aug. 25, 2011 from U.S. Appl. No. 12/241,281, 26 pages.
Response filed Nov. 2, 2011 to Non-Final Office Action dated Aug. 25, 2011 from U.S. Appl. No. 12/241,281, 13 pages.
Applicant-Initiated Interview Summary dated Nov. 9, 2011 from U.S. Appl. No. 12/241,281, 3 pages.
Final Office Action dated Jan. 6, 2012 from U.S. Appl. No. 12/241,281, 27 pages.
Applicant-Initiated Interview Summary dated Mar. 22, 2012 from U.S. Appl. No. 12/241,281, 3 pages.
Response filed May 2, 2012 to Final Office Action dated Jan. 6, 2012 filed May 2, 2012 from U.S. Appl. No. 12/241,281, 11 pages.
Non-Final Office Action dated Jul. 20, 2012 from U.S. Appl. No. 12/241,281, 20 pages.

Applicant-Initiated Interview Summary dated Sep. 20, 2012 from U.S. Appl. No. 12/241,281, 3 pages.
Response filed Oct. 22, 2012 to Non-Final Office Action dated Jul. 20, 2012 from U.S. Appl. No. 12/241,281, 13 pages.
Notice of Allowance dated Dec. 24, 2012 from U.S. Appl. No. 12/241,281, 10 pages.
Non-Final Office Action dated Feb. 1, 2013 from U.S. Appl. No. 13/074,041, 22 pages.
Response filed May 29, 2013 to Non-Final Office Action dated Feb. 1, 2013 from U.S. Appl. No. 13/074,041, 15 pages.
Non-Final Office Action dated Aug. 23, 2013 from U.S. Appl. No. 13/074,041, 20 pages.
Response filed Dec. 3, 2013 to Non-Final Office Action dated Aug. 23, 2013 from U.S. Appl. No. 13/074,041, 19 pages.
Final Office Action dated Jan. 8, 2014 from U.S. Appl. No. 13/074,041, 23 pages.
Response filed Apr. 30, 2014 to Final Office Action dated Jan. 8, 2014 from U.S. Appl. No. 13/074,041, 16 pages.
Agarawala, et al., Keepin' it Real: Pushing the Desktop Metaphor with Physics, Piles and the Pen, Proceedings of the SIGCHI Conference on Human Factors in Computing Systems, 2006, pp. 1283-1292, 10 pages.
Anderson, et al., "Tangible Interaction + Graphical Interpretation: a New Approach to 3D Modeling," retrieved at <<http://www.merl.com/papers/docs/TR2000-13.pdf>>, Mitsubishi Electric Information Technology Center America, Technical Report No. TR-2000-13, 2000, Cambridge, MA, in Proceedings of the 27th Annual Conference on Computer Graphics and Interactive Techniques, 14 pages.
Bell, et al., "Dynamic Space Management for User Interfaces," Proceedings of the UIST 2000: ACM Symposium on User Interface Software and Technology, 2000, pp. 239-248, 10 pages.
Bill Buxton home page, referencing publication "Sketching User Experiences," available at <http: http://www.billbuxton.com/>>, accessed on Jan. 7, 2009, 6 pages.
Brignull, et al., "The Introduction of a Shared Interactive Surface into a Communal Space," Proceedings of the 2004 ACM Conference on Computer Supported Cooperative Work, 2004, 10 pages.
Buchenau, et al., "Experience Prototyping," Proceedings of the 3rd Conference on Designing Interactive Systems: Processes, Practices, Methods, and Techniques, 2000, pp. 424-433, 10 pages.
Cook, et al., "Designers' Use of Paper and the Implications for Informal Tools," Proceedings of the 17th Australia Conference on Computer-Human Interaction: Citizens Online: Considerations for Today and the Future, 2005, pp. 1-10, 10 pages.
Coutaz, et al., "Coupling Interaction Resources: an Analytical Model," Proceedings of the 2005 Joint Conference on Smart Objects and Ambient Intelligence: Innovative Context-Aware services: Usages and Technologies, Oct. 2005, pp. 183-188, 6 pages.
Cotting, et al., "Interactive Environment-aware Display Bubbles," Proceedings of the 19th Annual ACM Symposium on User Interface Software and Technology, 2006, pp. 245-254, 10 pages.
Dias, et al., "Tangible Interaction for Conceptual Architectural Design," retrieved at <<http://ieeexplore.ieee.org/stamp/stamp.jsp?tp=&amumber=1106951>>, The First IEEE International Workshop on Augmented Reality Toolkit, 2002, pp. 1-9, 9 pages.
Dietz, et al., "DiamondTouch: a Multi-User Touch Technology," Mitsubishi Electric Research Laboratories, report TR2003-125, Oct. 2003, 10 pages.
Fitzmaurice, et al., "Bricks: Laying the Foundations for Graspable User Interfaces," Proceedings of the SIGCHI Conference on Human Factors in Computing Systems, 1995, pp. 442-449, 8 pages.
Forlines, et al., "Direct-touch vs. Mouse Input for Tabletop Displays," Proceedings of the SIGCHI Conference on Human Factors in Computing Systems, 2007, pp. 647-656, 10 pages.
Grossman, et al., "An Interface for Creating and Manipulating Curves Using a High Degree-of-freedom Curve Input Device," retrieved at <<http://www.dgp.toronto.edu/~ravin/papers/chi2003_curvemanipulation.pdf>>, Proceedings of the SIGCHI Conference on Human Factors in Computing Systems, 2003, 8 pages.

(56) References Cited

OTHER PUBLICATIONS

Guimbretiere, et al., "Fluid Interaction with High-Resolution Wall-Size Displays," Proceedings of the 14th Annual ACM Symposium on User Interface Software and Technology, 2001, pp. 21-30, 10 pages.

Hailpern, et al., "Team Storm: Demonstrating an Interaction Model for Working with Multiple Ideas During Creative Group Work," Proceedings of the 6th ACM SIGCHI Conference on Creativity & Cognition, 2007, pp. 193-202, 10 pages.

Haller, et al., "Shared Design Space," ACM SIGGRAPH 2006 Emerging Technologies, International Conference on Computer Graphics and Interactive Techniques, Article 29, 12 pages.

Hinrichs, et al., "Examination of Text-Entry Methods for Tabletop Displays," Proceedings of the Second Annual IEEE International Workshop on Horizontal Interactive Human-Computer Systems, 2007, pp. 105-112, 8 pages.

Holman, et al., "Paper Windows: Interaction Techniques for Digital Paper," Proceedings of the SIGCHI Conference on Human Factors in Computing Systems, 2005, pp. 591-599, 9 pages.

Hosokawa, et al., "Tangible Design Support System Using RFID Technology," retrieved at <<http://www.acm.org>>, Proceedings of the 2nd International Conference on Tangible and Embedded Interaction, 2008, pp. 75-78, 4 pages.

Kim, et al., "Video-Based Document Tracking: Unifying Your Physical and Electronic Desktops," Proceedings of the 17th Annual ACM Symposium on User Interface Software and Technology, 2004, pp. 99-107, 9 pages.

Kitamura, et al., "Real-time 3D Interaction with ActiveCube," retrieved at <<http://citeseerx.ist.psu.edu/viewdoc/download?doi=10.1.1.22.9277&rep=rep1&type=pdf>>, CHI '01 Extended Abstracts on Human Factors in Computing Systems, 2001, pp. 355-356, 2 pages.

Klemmer, et al., "How Bodies Matter: Five Themes for Interaction Design," Proceedings of the Designing Interactive Systems, 2006, pp. 140-149, 10 pages.

Klemmer, "Integrating Physical and Digital Interactions," Computer, Oct. 2005, pp. 111-113, 4 pages.

Klemmer, et al., "The Designers' Outpost: a Task-Centered Tangible Interface for Web Site Information Design," available at <<http://www.si.umich.edu/mwnewman/pubs/uist2001>>, 2001, 10 pages.

Koike, et al., "Integrating Paper and Digital Information on Enhanced-Desk: A Method for Realtime Finger Tracking on an Augmented Desk System," ACM Transaction on Computer-Human Interaction, vol. 8, No. 4, Dec. 2001, pp. 307-322, 16 pages.

Koshimizu, et al., "SnapTable: Physical Handling for Digital Documents with Electronic Paper," Proceedings of the Third Nordic Conference on Human-computer Interaction, 2004, pp. 401-404, 4 pages.

Lange, et al., "Insight lab: an Immersive Team Environment Linking Paper, Displays, and Data," Proceedings of the 1998 Conference on Human Factors in Computing Systems, 1998, pp. 550-557, 8 pages.

Leibe, et al., "The Perceptive Workbench: Toward Spontaneous and Natural Interaction in Semi-Immersive Virtual Environments," Proceedings of the IEEE Virtual Reality 2000 Conference, 2000, 4 pages.

Leithinger, et al., "Improving Menu Interaction for Cluttered Tabletop Setups with User-Drawn Path Menus," Second Annual IEEE International Workshop on Horizontal Interactive Human-Computer System, 2007, pp. 121-128, 8 pages.

Preliminary Amendment filed Mar. 27, 2013 from U.S. Appl. No. 13/851,797, 8 pages.

Non-Final Office Action dated Apr. 10, 2014 from U.S. Appl. No. 13/851,797, 30 pages.

Response filed Jun. 16, 2014 to the Non-Final Office Action dated Apr. 10, 2014 from U.S. Appl. No. 13/851,797, 14 pages.

Notice of Allowance dated Aug. 21, 2014 from U.S. Appl. No. 13/851,797, 13 pages.

Examiner-Initiated Interview Summary dated Jan. 26, 2015 from U.S. Appl. No. 13/851,797, 2 pages.

Notice of Allowance dated Mar. 24, 2015 from U.S. Appl. No. 13/851,797, 16 pages.

Notice of Allowance dated Jul. 6, 2015 from U.S. Appl. No. 13/851,797, 14 pages.

Notice of Allowance dated Nov. 5, 2015 from U.S. Appl. No. 13/851,797, 25 pages.

Notice of Allowance dated Apr. 6, 2016 from U.S. Appl. No. 13/851,797, 18 pages.

Communication pursuant to Rule 164(1) EPC with Supplementary European Search Report dated Oct. 6, 2016 from European Patent Application No. 09818173.8, 7 pages.

Terminal Disclaimer Decision mailed Jun. 21, 2016 from U.S. Appl. No. 14/281,885, 1 page.

Second Office Action dated Mar. 11, 2014 from Japan Patent Application No. 2011-530082, 8 pages.

Boverie et al., "Comparison of Structured Light and Stereovision Sensors for New Airbag Generations", retrieved at <<http://homepages.laas.fr/lerasle/pdf/cep03.pdf>>, vol. 11, No. 12, Dec. 2003, pp. 1413-1421, 9 pages.

Dodds et al., "A Communication Task in HMD Virtual Environments: Speaker and Listener Movement", Proceedings of the 23rd Annual Conference on Computer Animation and Social Agents (CASA), 2010, 4 pages.

El-Hakim et al., "Sensor Based Creation of Indoor Virtual Environment Models", Proceedings of the 1997 International Conference on Virtual Systems and MultiMedia, Sep. 10-12, 1997, 9 pages.

El-Hakim et al., "Two 3-D Sensors for Environment Modeling and Virtual Reality: Calibration and Multi-View Registration", Proceedings of International Archives on Photogrammetry and Remote Sensing, vol. 35, 1996, 10 pages.

Henrysson et al., "Face to Face Collaborative AR on Mobile Phones," Proceedings from the Fourth IEEE and ACM International Symposium on Mixed and Augmented Reality, Oct. 5-8, 2005, pp. 80-89, 11 pages.

Hu et al., "Sensors and Data Fusion Algorithms in Mobile Robotics", Retrieved at <<http://cswww.essex.ac.uk/staff/hhu/Papers/CSM-422.pdf>>, Research report CSM422 University of Essex, Jan. 10, 2005, pp. 1-12, 12 pages.

Leiva et al., "3D Reconstruction of a Static Indoor Environment by Fusion of Sonar and Video Data", retrieved at <<http://webpersonal.uma.es/-EPEREZ/files/SIRS01.pdf>>, on Mar. 15, 2011, 10 pages.

Scheibe et al., "Data Fusion and Visualization of Panoramic Images and Laser Scans", Retrieved at <<http://www.lr.de/os/Portaldata/48/Resources/dokumente/projekte/pancam_laser.pdf>>, on Mar. 15, 2011, 8 pages.

Sequeira et al., "3D Reconstruction of Indoor Environments", Proceedings of International Conference on Image Processing, vol. 2, Sep. 16-19, 1996, 4 pages.

Tang et al., "Augmented Reality Systems for Medical Applications", IEEE Engineering in Medicine and Biology Magazine, May-Jun. 1998, pp. 49-58, 10 pages.

Cotting et al., "Adaptive Instant Displays: Continuously Calibrated Projections Using Per-Pixel Light Control", Computer Graphics Forum, 2005, vol. 24, pp. 705-714, 10 pages.

Non-Final Office Action dated Dec. 20, 2012 from U.S. Appl. No. 13/155,422, 10 pages.

Response filed Apr. 22, 2013 to Non-Final Office Action dated Dec. 20, 2012 from U.S. Appl. No. 13/155,422, 12 pages.

Final Office Action dated Aug. 16, 2013 from U.S. Appl. No. 13/155,422, 22 pages.

Response filed Nov. 15, 2013 to Final Office Action dated Aug. 16, 2013 from U.S. Appl. No. 13/155,422, 14 pages.

Non-Final Office Action dated Apr. 11, 2014 from U.S. Appl. No. 13/155,422, 9 pages.

Response filed Jul. 11, 2014 to Non-Final Office Action dated Apr. 11, 2014 from U.S. Appl. No. 13/155,422, 11 pages.

Notice of Allowance dated Aug. 15, 2014 from U.S. Appl. No. 13/155,422, 8 pages.

Non-Final Office Action dated Mar. 26, 2015 from U.S. Appl. No. 13/155,422, 19 pages.

(56) References Cited

OTHER PUBLICATIONS

Response filed Jul. 22, 2015 to Non-Final Office Action dated Mar. 26, 2015 from U.S. Appl. No. 13/155,422, 12 pages.
Notice of Allowance dated Sep. 15, 2015 from U.S. Appl. No. 13/155,422, 11 pages.
Non-Final Office Action dated Mar. 12, 2013 from U.S. Appl. No. 13/084,786, 24 pages.
Response filed Jun. 12, 2013 to Non-Final Office Action dated Mar. 12, 2013 from U.S. Appl. No. 13/084,786, 13 pages.
Final Office Action dated Jul. 17, 2013 from U.S. Appl. No. 13/084,786, 27 pages.
Response filed Oct. 17, 2013 to Final Office Action dated Jul. 17, 2013 from U.S. Appl. No. 13/084,786, 16 pages.
Non-Final Office Action dated Jul. 8, 2015 from U.S. Appl. No. 13/084,786, 29 pages.
U.S. Appl. No. 61/444,123, filed Feb. 17, 2011, entitled "Providing an Interactive Experience Using a 3D Depth Camera and 3D Projector," Inventor: Benko et al., 53 pages.
Response filed Aug. 21, 2015 to Office Action dated Apr. 2, 2015 from U.S. Appl. No. 13/074,041, 14 pages.
Notice of Allowance dated Sep. 16, 2015 from U.S. Appl. No. 13/074,041, 5 pages.
International Preliminary Report on Patentability dated Aug. 21, 2013 from PCT Patent Application No. PCT/US2012/24786, 4 pages.
"Office Action Issued in European Patent Application No. 09818173.8", dated May 3, 2018, 8 Pages.
"Auto Yoke the First Automated Lighting Solution Designed for Theatrical Use", Retrieved from <<http://web.archive.org/web/20120309060116/http://www.citytheatrical.com/rcyoke.htm>>, Retrieved on Mar. 9, 2012, 2 Pages.
"Great Films Fill Rooms", Retrieved from <<http://web.archive.org/web/20130206135410/http://www.greatfilmsfillrooms.com/en/>>, Retrieved on Feb. 6, 2013, 1 Page.
"Liquid Crystal Shutter Glasses", Retrieved from <<https://en.wikipedia.org/wiki/Active_shutter_glasses>>, Retrieved on Apr. 8, 2011, 6 Pages.
"Microsoft Office Labs", Retrieved from <<http://www.microsoft.com/office/labs/index.html>>, Retrieved on Feb. 19, 2013, 7 Pages.
"Newton Game Dynamics", Retrieved from <<http://web.archive.org/web/20130222075951/http://newtondynamics.com/forum/newton.php>>, Retrieved on Feb. 22, 2013, 2 Pages.
Wilson, et al., "Steerable Augmented Reality with the Beamatron", In Proceedings of the 25th Annual ACM Symposium on user Interface Software and Technology, Oct. 7, 2012, pp. 413-422.
"Stereoscopy", Retrieved from <<http://en.wikipedia.org/wiki/Stereoscopy#Complementary_color_anaglyphs>>, Retrieved Date: Apr. 6, 2011, 34 Pages.
"Stereoscopy", Retrieved from <<https://web.archive.org/web/20110409235522/http://en.wikipedia.org/wiki/Stereoscopy>>, Retrieved on Apr. 6, 2011, 21 Pages.
"Structured Light 3D Scanning", Retrieved from <<https://sites.google.com/site/structuredlight/techniques>>, Retrieved on Nov. 26, 2010, 3 Pages.
"Search Report Issued in European Application No. 09818173.8", dated Jan. 31, 2017, 15 Pages.
"Supplementary Search Report Issued in European Patent Application No. 12752325.6", dated Jul. 25, 2014, 4 Pages.
"Final Office Action Issued in U.S. Appl. No. 13/039,179", dated Nov. 5, 2014, 25 Pages.
"Non-Final Office Action Issued in U.S. Appl. No. 13/039,179", dated Nov. 29, 2013, 22 Pages.
"Non-Final Office Action Issued in U.S. Appl. No. 13/039,179", dated Jul. 2, 2014, 24 Pages.
Molyneaux, et al., "Interactive Environment-Aware Handheld Projectors for Pervasive Computing Spaces", In Proceedings of the 10th International Conference on Pervasive Computing, Jun. 18, 2012, 18 Pages.

Molyneaux, et al., "Cooperative Augmentation of Smart Objects with Projector-Camera Systems", In the 9th International Conference on Ubiquitous Computing, Sep. 16, 2007, 18 Pages.
Manabe, et al., "Three Dimensional Measurement using Color Structured Patterns and Imaging Spectrograph", In Proceedings of 16th International Conference on Pattern Recognition, vol. 3, Aug. 11, 2002, pp. 649-652.
Izadi, et al., "KinectFusion: Real-time 3D Reconstruction and Interaction Using a Moving Depth Camera", In Proceedings of the 24th Annual ACM Symposium on user Interface Software and Technology, Oct. 16, 2011, 10 Pages.
Luus, et al., "Optimization by Direct Search and Systematic Reduction of the Size of Search Region", In Journal of American Institute of Chemical Engineering, vol. 19, Issue 4, Jul. 1973, pp. 760-766.
Levy, Steven, "Google Gets Transparent with Glass, Its Augmented Reality Project", Retrieved from <<http://web.archive.org/web/20140420214841/http://www.wired.com/2012/04/epicenter-google-glass-ar/>>, Apr. 4, 2012, 4 Pages.
Kjeldsen, et al., "Interacting with Steerable Projected Displays", In Proceedings of the Fifth IEEE International Conference on Automatic Face and Gesture Recognition, May 21, 2002, 6 Pages.
"Non-Final Office Action Issued in U.S. Appl. No. 13/891,116", dated Jan. 14, 2015, 13 Pages.
"Non-Final Office Action Issued in U.S. Appl. No. 13/891,116", dated Oct. 28, 2015, 7 Pages.
"Final Office Action Issued in U.S. Appl. No. 14/037,986", dated Nov. 18, 2015, 24 Pages.
"Non-Final Office Action Issued in U.S. Appl. No. 14/037,986", dated Apr. 27, 2015, 21 Pages.
Allen, Jonas, "I-Cocoon: The Next Wii?", Retrieved from <<http://www.dailygame.net/news/archives/008261.php>>, Sep. 11, 2008, 4 Pages.
Ashdown, et al., "Steerable Projector Calibration", In Proceedings of the IEEE Computer Society Conference on Computer Vision and Pattern Recognition-Workshops, Jun. 2005, 8 Pages.
Ates, et al., "Immersive Simulation of Visual Impairments Using a Wearable See-through Display", In Proceedings of the 8th International Conference on Tangible, Embedded and Embodied Interaction, Feb. 16, 2014, 4 Pages.
Baribeau, et al., "Color Reflectance Modeling Using a Polychromatic Laser Range Sensor", In Proceedings on IEEE Transactions on Pattern Analysis and Machine Intelligence, vol. 14, Issue 2, Feb. 1992, pp. 263-269.
Benko, et al., "Dyadic Projected Spatial Augmented Reality", In Proceedings of the 27th Annual ACM Symposium on User Interface Software and Technology, Oct. 5, 2014, 11 Pages.
Benko, et al., "Mirage Table: Freehand Interaction on a Projected Augmented Reality Tabletop", In Proceedings of the SIGCHI Conference on Human Factors in Computing Systems, May 5, 2012, pp. 199-208.
Benko, et al., "Multi-Point Interactions with Immersive Omnidirectional Visualizations in a Dome", In ACM International Conference on Interactive Tabletops and Surfaces, Nov. 7, 2010, pp. 19-28.
Billinghurst, et al., "Shared Space: An Augmented Reality Approach for Computer Supported Collaborative Work", In Virtual Reality, vol. 3, Issue 1, Mar. 1998, pp. 25-36.
Bimber, et al., "Spatial Augmented Reality: Merging Real and Virtual Worlds", by CRC Press, Aug. 8, 2005, 393 Pages.
Bishop, Todd, "Q&A: Microsoft LightSpace, One Step Closer to Star Trek Holodeck", Retrieved from <<http://web.archive.org/web/20101112094951/http://www.techflash.com/seattle/2010/10/qa_microsoft_lightspace_one_step_closer_to_star_trek_holodeck.html?>>, Oct. 7, 2010, 4 Pages.
Bolt, Richard A., "Put-That-There: Voice and Gesture at the Graphics Interface", In Proceedings of the 7th Annual Conference on Computer Graphics and Interactive Techniques, vol. 14 Issue 3, Jul. 14, 1980, pp. 262-270.
Borkowski, et al., "Spatial Control of Interactive Surfaces in an Augmented Environment", In Joint Working Conferences of Engineering Human Computer Interaction and Interactive Systems, Jul. 11, 2004, 16 Pages.

(56) References Cited

OTHER PUBLICATIONS

Butz, et al., "Applying the Peephole Metaphor in a Mixed-Reality Room", In Proceedings of IEEE Computer Graphics and Applications, vol. 26, Issue 1, Jan. 2006, pp. 56-63.
Butz, et al., "Searchlight—A Lightweight Search Function for Pervasive Environments", In Proceedings of the Second International Conference on Pervasive Computing, Apr. 21, 2004, 7 Pages.
Cao, et al., "Multi-User Interaction using Handheld Projectors", In Proceedings of the 20th Annual ACM Symposium on User Interface Software and Technology, Oct. 7, 2007, pp. 43-52.
Cauchard, et al., "Steerable Projection: Exploring Alignment in Interactive Mobile Displays", In Personal and Ubiquitous Computing, vol. 16, Issue 1, Apr. 12, 2011, pp. 27-37.
Ehnes, et al., "Projected Augmentation—Augmented Reality using Rotatable Video Projectors", In Proceeding of Third IEEE and ACM International Symposium on Mixed and Augmented Reality, Nov. 2, 2004, 10 Pages.
Harrison, et al., "OmniTouch: Wearable Multitouch Interaction Everywhere", In Proceedings of the 24th Annual ACM Symposium on User Interface Software and Technology, Oct. 16, 2011, 10 Pages.
Song, et al., "Use of LCD Panel for Calibrating Structured-Light-Based Range Sensing System", In Proceedings of IEEE Transactions on Instrumentation and Measurement, vol. 57, Issue 11, Nov. 2008, pp. 2623-2630.
Raskar, et al., "The Office of the Future: A Unified Approach to Image-Based Modeling and Spatially Immersive Displays", In Proceedings of the 25th Annual Conference on Computer Graphics and Interactive Techniques, Jul. 19, 1998, 10 Pages.
Willis, et al., "SideBySide: Ad-hoc Multi-user Interaction with Handheld Projectors", In Proceedings of the 24th Annual ACM Symposium on User Interface Software and Technology, Oct. 16, 2011, 10 Pages.
Underkoffler, et al., "Emancipated Pixels: Real-World Graphics in the Luminous Room", In Proceedings of the 26th Annual Conference on Computer Graphics and Interactive Techniques, Jul. 1, 1999, pp. 385-392.
Tsai, et al., "A New Technique for Fully Autonomous and Efficient 3D Robotics Hand/Eye Calibration", In Proceedings of IEEE Transactions on Robotics and Automation, vol. 5, Issue 3, Jun. 1989, pp. 345-358.
Sodhi, et al., "Lightguide: Projected Visualizations for Hand Movement Guidance", In Proceedings of the SIGCHI Conference on Human Factors in Computing Systems, May 5, 2012, 10 Pages.
Benko, Hrvoje, "Constructing Virtual 3D Models With Physical Building Blocks," Proceedings of the CHI'11 Extended Abstracts on Human Factors in Computing Systems, pp. 2173-2178, May 7-12, 2011, 6 pages.
"Dynamical Simulation," retrieved at <<http:/en.wikipedia.org/wiki/Dynamical_simulation>>, Wikipedia entry, retrieved on May 3, 2008, 4 pages.
Everitt, Cass, "Projective Texture Mapping," Retrieved at: <<http://developer.nvidia.com/objec/Projective_Texture_Mapping.html>>, Nvidia, Santa Clara, CA, 2001, 7 pages.
Billinghurst, et al., "Tangible Augmented Reality," ACM Special Interest Group on Computer Graphics and Interactive Techniques, 2008, 10 pages.
Hilliges, et al., "Interactions in the Air: Adding Further Depth to Interactive Tabletops," Proceedings of the 22nd Annual ACM Symposium on User interface Software and Technology, 2009, pp. 139-148, 10 pages.
Lavoie, et al., "Constructing 3D Virtual Reality Objects from 2D Images of Real Objects Using NURBS," Proceedings of the IEEE International Conference on Virtual Environments, Human-Computer Interfaces, and Measurement Systems, Jun. 2007, pp. 117-124, 8 pages.
Leibe, et al., "Toward Spontaneous Interaction with the Perceptive Workbench," IEEE Computer Graphics and Applications, 2000, 12 pages.
"Physics engine," Retrieved at <<http:/en.wikipedia.org/wiki/Physics_engine>>, Wikipedia Entry, Retrieved on Nov. 20, 2007, 5 pages.
Raffle, et al., "Topobo: A Constructive Assembly System with Kinetic Memory," Proceedings of the SIGCH I Conference on Human Factors in Computing Systems, pp. 647-654, 2004, 8 pages.
Rosenblum, Lawrence, J. "Applications of the Responsive Workbench," IEEE Computer Graphics and Applications, vol. 17, No. 4, 1997, pp. 10-15, 6 pages.
Segal, et al., "Fast Shadows and Lighting Effects Using Texture Mapping," Proceedings of the 19th Annual Conference on Computer Graphics and Interactive Techniques, 1992, pp. 249-252, 4 pages.
Wilson, et al., "Combining Multiple Depth Cameras and Projectors for Interactions on, Above and Between Surfaces," Proceedings of the 23nd Annual ACM Symposium on User interface Software and Technology, pp. 273-282, 10 pages.
Wilson, Andrew A., "Simulating Grasping Behavior on an Imaging Interactive Surface," Proceedings of the ACM International Conference on Interactive Tabletops and Surfaces, 2009, pp. 125-132, 8 pages.
"International Search Report and Written Opinion" from PCT Application No. PCT/US2012/024786, dated Oct. 18, 2012, 6 pages.
CN 200980139375.3; Response and Request for Reexamination Filed Apr. 8, 2014 to the Third Office Action dated Jan. 8, 2014, 11 pages.
CN200980139375.3; Decision on Reexamination dated Jan. 28, 2015, 11 pages.
JP Response to Second Office Action dated Mar. 11, 2014 for Application No. 2011-530082, Filed Jul. 10, 2014, 6 pages.
"Non-Final Office Action," From U.S. Appl. No. 13/074,041, dated Jun. 23, 2014, 21 pages.
Response Filed Sep. 23, 2014 to Non-Final Office Action dated Jun. 23, 2014 for U.S. Appl. No. 13/074,041, 16 pages.
"Final Office Action," From U.S. Appl. No. 13/074,041, dated Oct. 9, 2014, 25 pages.
Response Filed Jan. 9, 2015 to Final Office Action dated Oct. 9, 2014 for U.S. Appl. No. 13/074,04115 pages.

* cited by examiner

USING PHYSICAL OBJECTS IN CONJUNCTION WITH AN INTERACTIVE SURFACE

BACKGROUND

An interactive surface provides an alternative mechanism for interacting with computer-implemented applications. A typical interactive surface includes a projection mechanism for displaying information on the interactive surface. The interactive surface also includes an input mechanism for detecting selections made by a user in the course of interacting with the interactive surface. For example, the interactive surface may detect when the user touches particular parts of the interactive surface. Through such interaction, the user may manipulate digital objects which are displayed by the interactive surface and perform other operations.

There remains ample room for improvement in interactive surface technology. For instance, the input mechanism provided by an interactive surface is sometimes cumbersome to use (because, for instance, users may have difficulty entering information or manipulating digital objects using this input mechanism). The input mechanism may also provide unsatisfactory precision and responsiveness.

Further, the interactive surface may potentially confuse users. This may be particularly a problem when multiple users engage the same interactive surface. In this scenario, the interactive surface can potentially become cluttered with multiple digital objects. Further, for a large interactive surface, it may become difficult for users to manipulate some digital objects that are beyond their reach.

Further, the interactive surface may fail to provide a collaborative environment which accommodates the manner in which users naturally interact in groups. For example, the collaborative environment may fail to provide a convenient mechanism for sharing information among participants of a meeting; the interactive surface may likewise fail to provide a suitable mechanism for collaboratively working on shared information.

There may be additional shortcomings of existing interactive surface technology.

SUMMARY

In one illustrative implementation, an interactive management module (IMM) is described for allowing users to engage an interactive surface using physical devices ("devices"). The IMM detects placement of a device at a selected location and orientation on the interactive surface. In response, the IMM displays a digital object on the interactive surface for use in association with the device. The digital object can be placed in proximity to the device; further, the digital object can have the same orientation as the device. In one case, the device is a keyboard-type device and the digital object provides a display interface that presents a visual representation of information entered by a user using the keyboard-type device.

According to another illustrative aspect, the IMM can interact with multiple physical input devices that are placed on the interactive surface at the same time, thus accommodating the use of the interactive surface in a collaborative environment.

According to another illustrative aspect, the IMM displays a visual attribute which associates the device with the digital object. For example, the IMM can present borders (or the like) around both the digital object and the device; the borders can be assigned the same color to convey the affiliation between the digital object and the device. Alternatively, or in addition, the visual attribute can correspond to a line which connects the digital object to the device.

According to another illustrative aspect, a user can move the device in proximity to another existing display object. In response, the IMM can automatically associate the device with that other display object.

According to another illustrative aspect, the user can move another existing display object in proximity to the device. In response, the IMM can automatically associate the existing display object with the device.

According to another illustrative aspect, the IMM can detect the placement of a second device in proximity to the first-mentioned device. In response, the IMM can associate both devices with a single digital object. In one particular example, a first user may enter a first selection using the first device and a second user may enter a second selection using the second device. Upon bringing the first and second devices together, the IMM can merge the selections identified by the two users, creating a combined selection.

According to another illustrative aspect, the IMM can display a new digital object at a location on the interactive surface which: a) satisfies at least one placement constraint to an extent deemed appropriate; and b) reduces interference between the new digital object and other existing objects on the interactive surface.

According to another illustrative aspect, the device is a mouse-type device. The IMM operates by determining an absolute position of the mouse-type device and an orientation of the mouse-type device on the interactive surface. The IMM uses this information to define a frame of reference. The IMM displays a cursor on the interactive surface relative to the frame of reference that has been defined. The frame of reference can be selected relative to a nearest edge of the interactive surface (or other reference object associated with the interactive surface) or the orientation of the mouse-type device itself, and so on.

According to another illustrative aspect, the IMM allows a user to activate a touch mode of the mouse-type device, whereupon the cursor simulates a finger contact point.

According to another illustrative aspect, the IMM allows the user to modify a digital object using any combination of cursor contact points and finger contact points. For instance, the user can manipulate out-of-reach digital objects using one or more cursor contact points (e.g., as controlled by multiple input devices that are simultaneously placed on the interactive surface).

According to another illustrative aspect, the IMM can maintain a plurality of image representations of the interactive surface (and/or individual digital objects and/or physical objects that have been placed on the interactive surface) at different respective points in time. A user can retrieve these image representations to investigate the history of operations taken with respect to the interactive surface.

According to another illustrative implementation, an interactive management module (IMM) is described for allowing users to engage an interactive surface that contains a physical article ("article"), such as a tangible medium (e.g., a physical document) having information visually presented on its surface. In one illustrative implementation, the IMM operates by detecting the placement of an article on the interactive surface. The IMM then displays an interface object on the interactive surface for use in association with the article. The IMM detects a copy-related activation by a user of the interface object, and, in response, generates a digital copy of the article. The copy-related activation can correspond to a motion in which the user metaphorically drags the digital copy off the article by pulling on the interface object. The IMM deposits the digital copy at a location on the interactive surface identified by the user.

According to another illustrative aspect, the IMM can generate the digital copy by taking an image of the entire interactive surface, and then cropping the image of the entire surface to obtain an image of the article.

According to another illustrative aspect, the IMM can detect a user's selection of a particular part of the digital copy. In response, the IMM can highlight a corresponding part of the article. The same procedure can be performed in reverse, e.g., where the user selects a part of the article, prompting the IMM to highlight a corresponding part of the digital copy.

According to another illustrative aspect, the IMM can detect when the user makes a mark on the digital copy. In response, the IMM can apply a corresponding digital mark to the physical article. The same procedure can be performed in reverse, e.g., where the user makes a mark on the article, prompting the IMM to make a corresponding mark on the digital copy.

According to another illustrative aspect, the IMM can detect that the user has moved the digital copy to an editing region of the interactive surface. The IMM can next detect that user has applied a physical mark to the digital copy within the editing region. In response, the IMM can generate another digital copy of the article. This other digital copy includes a digital representation of the physical mark, along with its original content.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth an approach that allows users to engage an interactive surface using physical objects that are placed on the interactive surface. In one case, the physical objects may correspond to keyboard-type devices, mouse-type devices, or other types of input devices (or any combination of different types of input devices). The physical objects may also correspond physical documents (or the like) having information presented on their respective surfaces. The approach also provides various mechanisms for managing the association between physical objects that are placed on the interactive surface and respective digital objects.

According to one scenario, the use of physical objects may facilitate a user's engagement with the interactive surface. For example, keyboard-type devices and mouse-type devices exhibit time-tested reliable behavior with which most users are readily familiar; the approach can leverage these beneficial features in the context of an interactive surface environment. Further, the approach may provide useful techniques for disambiguating the correspondence between physical objects placed on the interactive surface and digital objects associated with the physical objects. This aspect may help reduce confusion when multiple users are engaging the same interactive surface. Further, the approach provides tools which allow users to access and manipulate digital objects which are out-of-reach on the interactive surface. Further, the approach provides tools for allowing users to conveniently disseminate information to other users in a collaborative environment; the approach then allows users to collaboratively interact with the shared information in an efficient and user-friendly manner. More generally, the concepts disclosed herein may address one or more of the challenges or problems previously noted, but are not limited to addressing all or any of these challenges or problems.

This disclosure is organized as follows. Section A describes illustrative systems and tools that can be used to engage an interactive surface using physical objects. Section B describes illustrative applications of the systems and tools set forth in Section A. Section C describes illustrative processing functionality that can be used to implement any aspect of the features described in Sections A and B.

Figure 23:
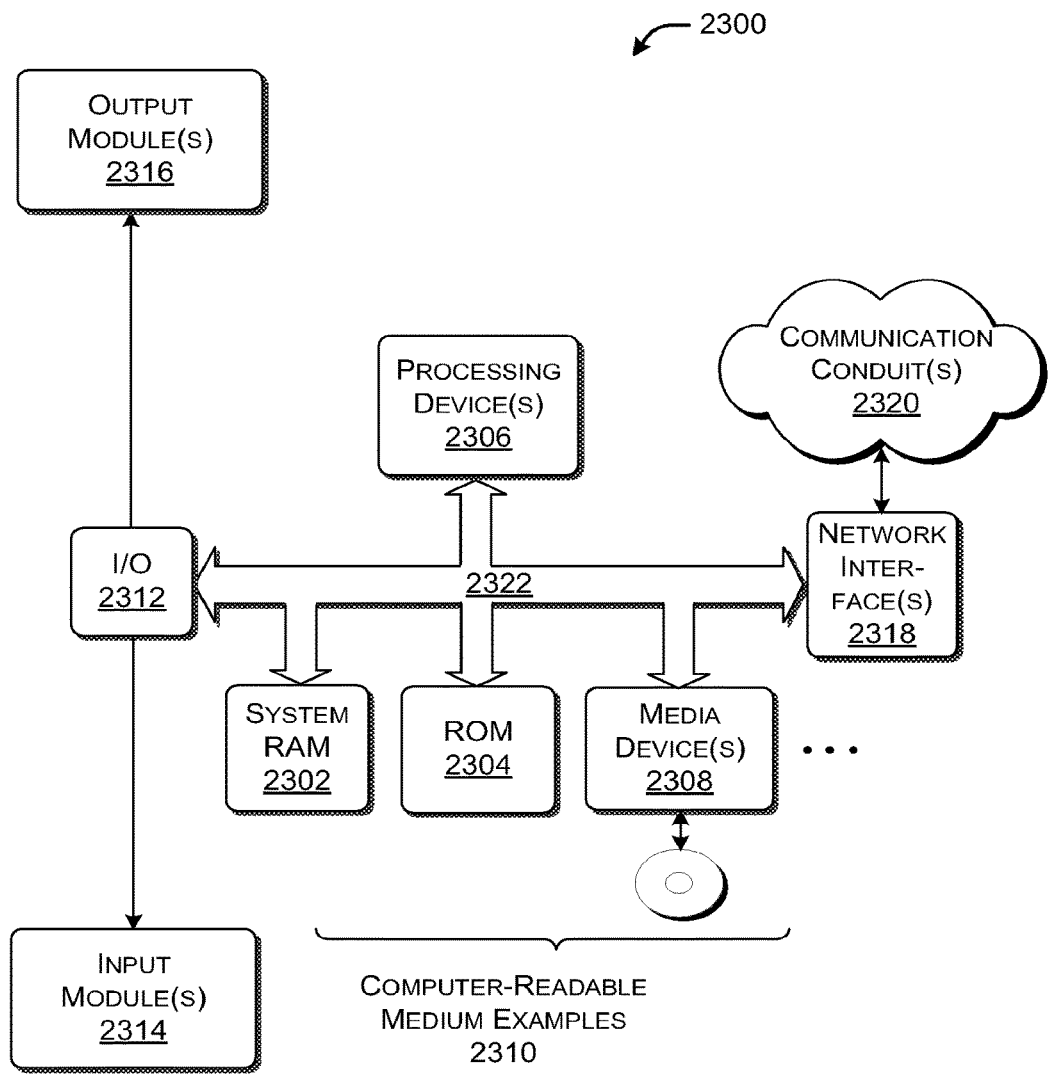
FIG. 23 shows illustrative processing functionality that can be used to implement any aspect of the features shown in the foregoing drawings.

As a preliminary matter, some of the figures describe the concepts in the context of one or more components, variously referred to as functionality, modules, features, elements, etc. The various components shown in the figures can be implemented in any manner, for example, by software, hardware, firmware, manual processing operations, and so on, or any combination of these implementations. In one case, the illustrated separation of various components in the figures into distinct units may reflect the use of corresponding distinct physical components. Alternatively, or in addition, any single component illustrated in the figures may be implemented by plural physical components. Alternatively, or in addition, the depiction of any two or more separate components in the figures may reflect different functions performed by a single physical component. FIG. 23, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (or can be performed in parallel). The blocks shown in the flowcharts can be implemented by software, firmware, hardware, manual processing, any combination of these implementations, and so on.

As to terminology, the phase "configured to" encompasses any way that any kind of functionality can be constructed to perform an identified operation. The functionality can be configured to perform an operation using, for instance, hardware, software, firmware, etc., and/or any combination thereof.

The term "logic" encompasses any functionality for performing a task. For instance, each operation illustrated in the flowcharts corresponds to logic for performing that operation. In one case, logic may correspond to computer-readable instructions. In another case, logic may correspond to discrete logic components, or a combination of computer-readable instructions and discrete logic components, etc.

A. Illustrative Systems and Tools

A.1. Overview of an Illustrative Interactive Surface Environment (FIGS. 1-4)

Figure 1:
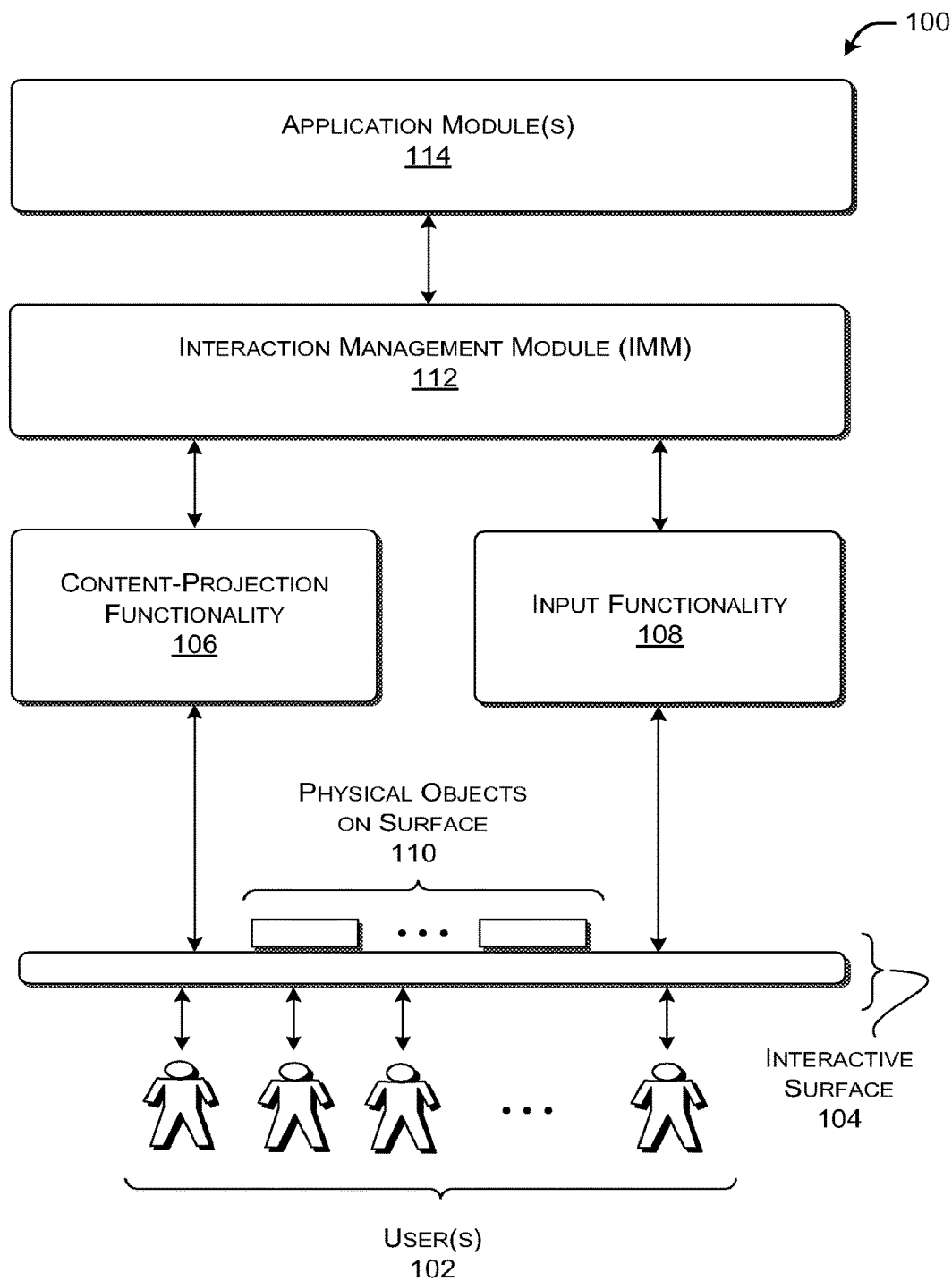
FIG. 1 shows an illustrative interactive surface environment in which a plurality of users can engage an interactive surface.

FIG. 1 shows an illustrative interactive surface environment 100 in which a plurality of users 102 can engage an interactive surface 104. In the case most commonly evoked herein, the interactive surface 104 corresponds to flat horizontal table-top of any size. However, there is no limitation placed on what may constitute the interactive surface 104. In other cases, the interactive surface 104 can be mounted vertically (e.g., on a wall), or at any other non-horizontal orientation. Alternatively, or in addition, the interactive surface 104 can have a curved surface, or any other kind of non-flat contour.

Broadly, any kind of content-projection functionality 106 can be used to project information onto the interactive surface 104. In one case, the content-projection functionality 106 can correspond to one or more video projectors which project information onto the interactive surface 104. Such content-projection functionality 106 can be disposed above the interactive surface 104, below the interactive surface 104, or at any other orientation with respect to the interactive surface 104 (or at any combination of orientations). Alternatively, or in addition, the content-projection functionality 106 can be integrated with the interactive surface itself 104. The placement of the content-projection functionality 106 can be selected, in part, based on the constraints associated with each application of the interactive surface 104. For instance, in certain cases, it may be appropriate to position the content-projection functionality 106 above the digital surface 104 because physical objects placed on the interactive surface 104 might otherwise occlude the digital content (e.g., if projected from below).

Figure 2:
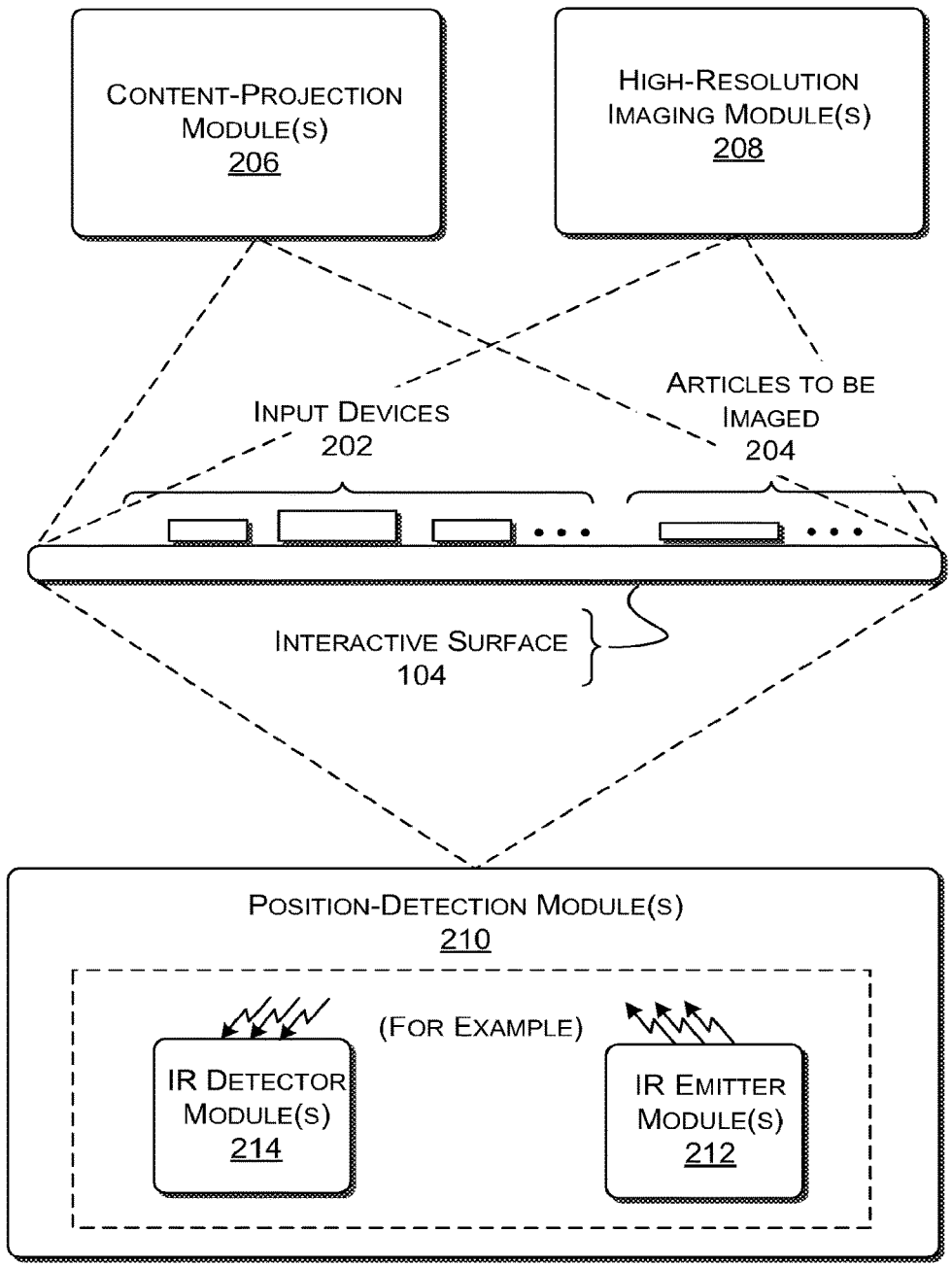
FIG. 2 shows illustrative content-projection functionality and input functionality that can be used in the interactive surface environment of FIG. 1.

Input functionality 108 is used to receive input from the users as the users engage the interactive surface 104. Again, various types and combinations of input functionality can be used. In one case, the input functionality 108 can correspond to one or more remote sensors that sense the user's engagement with the interactive surface 104. For example, the input functionality 108 can include an infrared emitter-detector arrangement which can detect when a user touches or otherwise moves close to the interactive surface 104. The input functionality 108 can also provide imaging functionality which generates a high-resolution image of the interactive surface 104 for use as an input. Any such remote-sensing-type input functionality 108 can be disposed above the interactive surface 104, below the interactive surface 104, or at any other orientation with respect to the interactive surface 104 (or at any combination of orientations). Alternatively, or in addition, the input functionality 108 can be integrated with the interactive surface 104 itself. Again, the placement of the input functionality 108 can be selected, in part, based on the constraints associated with each application of the interactive surface 104. Further, as will be described in more detail below, one or more physical objects 110 can be placed on the interactive surface 104. A subset of these physical objects 110 can correspond to input-type devices. These input devices may receive input from the users as the users interact with the interactive surface 104, and thus form part of the suite of technology that constitutes the input functionality 108. FIG. 2 will provide additional details regarding one illustrative implementation of the content-projection functionality 106 and the input functionality 108.

An interaction management module (IMM) 112 corresponding to any functionality for managing the projection of content onto the interactive surface 104 and the processing of the user's inputs. More specifically, the IMM 112 can correspond to technology for performing the various procedures which will be described below, as illustrated in FIGS. 5-22.

The IMM 112 interacts with one or more application-providing modules 114 (referred to in the plural below for brevity). The application modules 114 provide any type of functionality that the users can engage, such as search functionality, document processing functionality, communication functionality (e.g., Email functionality, instant messaging functionality, etc.), and so on. The application modules 114 can correspond to local application resources, remote (network-accessible) application resources, or some combination thereof. No limitation is placed on what may constitute an application module as this term is used herein. Moreover, while many of the examples developed herein will involve the use of multiple users 102 interacting with a common application module in collaborative fashion, multiple users can use the interactive surface 104 to simultaneously interact with different application modules 114. Further, a single user can engage the interactive surface 104.

Returning to the interactive surface 104 itself, as mentioned above, a user can place any combination of physical objects 110 onto its surface. The term "physical object" encompasses any type of tangible object that can be physically handled by the user. A "digital object," by contrast, encompasses any type of object that is electronically projected onto the surface of the interactive surface 104 by the content-projection functionality 106. The general term "object" encompasses any class of objects, including physical objects and digital objects.

The physical objects 110 described herein encompass two types of objects: devices and articles. These terms are labels of convenience in this explanation and are to be construed broadly. A device encompasses any mechanism that serves a functional role in interacting with the interactive surface 104. For example, one type of device corresponds to a keyboard-type device which is traditionally used to enter text and other information by manually depressing its keys. Another type of device corresponds to a mouse-type device which is traditionally used to control the movement of a cursor and perform other navigational functions within a graphical user interface (GUI) setting. These are only two examples. Other input devices can be used to interact with the interactive surface 104, such as game console-type devices, joystick-type devices, and so on.

The term physical article encompasses any physical object that can be imaged by the input functionality 108 for any purpose. In the case most commonly evoked herein, the term physical article corresponds to a tangible medium that visually presents information on its surface. For instance, in one concrete case, the physical article can correspond to a document having text and/or graphics and/or any other information on its surface. For example, the physical article can correspond to a paper document or the like. In another case, the physical article can correspond to a screen or the like which projects information thereon. In other cases, the article can correspond to any other physical object, such as a three-dimensional model (e.g., a model house, a model car, a doll, etc.), a part of the human anatomy (e.g., a hand), and so on. No limitation is placed on what may constitute an article. Indeed, an article may correspond to a device as described above. The term "article" will be used instead of "physical article," except in those instances where it is appropriate to emphasize the distinction between a physical article and a digital copy of the physical article.

FIG. 2 shows one representative and non-limiting implementation of the content-projection functionality 106 and input functionality 108 that can be used in the interactive surface environment 100 of FIG. 1. In this illustrative example, the interactive surface 104 corresponds to a flat horizontal surface (e.g., as provided by the top of a table). The physical objects 110 on its surface can correspond to one or more devices 202 (e.g., one or more keyboard-type devices, one or more mouse-type devices, etc.), and/or one or more articles 204 to be imaged (e.g., one or more documents, etc.).

The content-projection functionality 106 of FIG. 1 can correspond to one or more content-projection modules 206 (referred to in the plural below for brevity). For example, each of the content-projection modules 206 can project a u×v panel of image content onto the interactive surface 104. Taken together, the content-projection modules 206 can provide a tiled mosaic of such u×v panels that spans the entire surface of the interactive surface 104. In one implementation, the content-projection modules 206 can be disposed above the interactive surface 104, projecting their content down onto the interactive surface 104.

The input functionality 108 of FIG. 1 can correspond to a suite of different mechanisms to receive information pertaining to a user's engagement with the interactive surface 104. One such mechanism is one or more high-resolution imaging modules 208 (referred to below in the plural for brevity). The high-resolution imaging modules 208 can correspond to one or more high-resolution video cameras for forming a high-resolution image of the surface of the interactive surface 104. Section B will provide examples of circumstances in which the IMM 112 can generate images of the interactive surface 104 using the high-resolution imaging modules 208. In one implementation, the high-resolution imaging modules 208 can be disposed above the interactive surface 104.

The input functionality 108 can also include one or more position-detection modules 210 (referred to in the plural below for brevity). In one illustrative example, the position-detection modules 210 can correspond to one or more infrared (IR) emitter modules 212 in conjunction with one or more IR detector modules 214. The IR emitter modules 212 project electromagnetic signals in the infrared spectrum onto the interactive surface 104. The IR detector modules 214 receive the IR signals that are reflected by the interactive surface 104 and physical objects placed on (or near) its surface.

By virtue of changes in the reflectance of IR signals, the position-detection modules 210 can detect when new physical objects are placed on the interactive surface 104 or when existing physical objects on the interactive surface 104 are moved (or removed). In one implementation, the position-detection modules 210 can be disposed below the interactive surface 104. In this example, the interactive surface 104 is constructed with a sufficient degree of opacity to "receive" images that are projected by the content-projection modules 206. In addition, the interactive surface 104 has a sufficient degree of transparency such that IR signals projected from beneath the interactive surface 104 can be used by the position-detection modules 210 in conjunction with the IMM 112 to detect the presence of objects placed on top of the interactive surface 104. One infrared detection system that can be used to implement the position-detection modules 210 is disclosed in U.S. Pat. No. 7,204,428, naming the inventor of Andrew D. Wilson.

The devices 202 are also components of the suite of input functionality 108. In one case, the devices 202 can provide input information corresponding to key depression data, mouse-click data, mouse position data, and so on. The devices 202 can communicate such input information to the IMM 112 in any manner, such by using wireless communication. Although not shown in FIG. 2, the suite of input functionality 108 can also include soft-key input mechanisms that are projected by the content-projection modules 206 onto the interactive surface 104. The soft-key input mechanisms provide touch-selection data that indicates when users touch or otherwise engage the soft-key input mechanisms.

Further, the IMM 112 can optionally employ edge detection functionality and/or shape detection functionality. This functionality analyzes an image of the interactive surface 104 to identify the profiles (contours) associated with the objects. The IMM 112 can apply this analysis to form a more accurate estimate of the positions and orientations of the objects placed on the interactive surface 104. The IMM 112 can also use this analysis to help identify the objects (e.g., to distinguish keyboard-type devices from mouse-type devices, to distinguish a physical object from a finger contact point, and so on).

Figure 3:
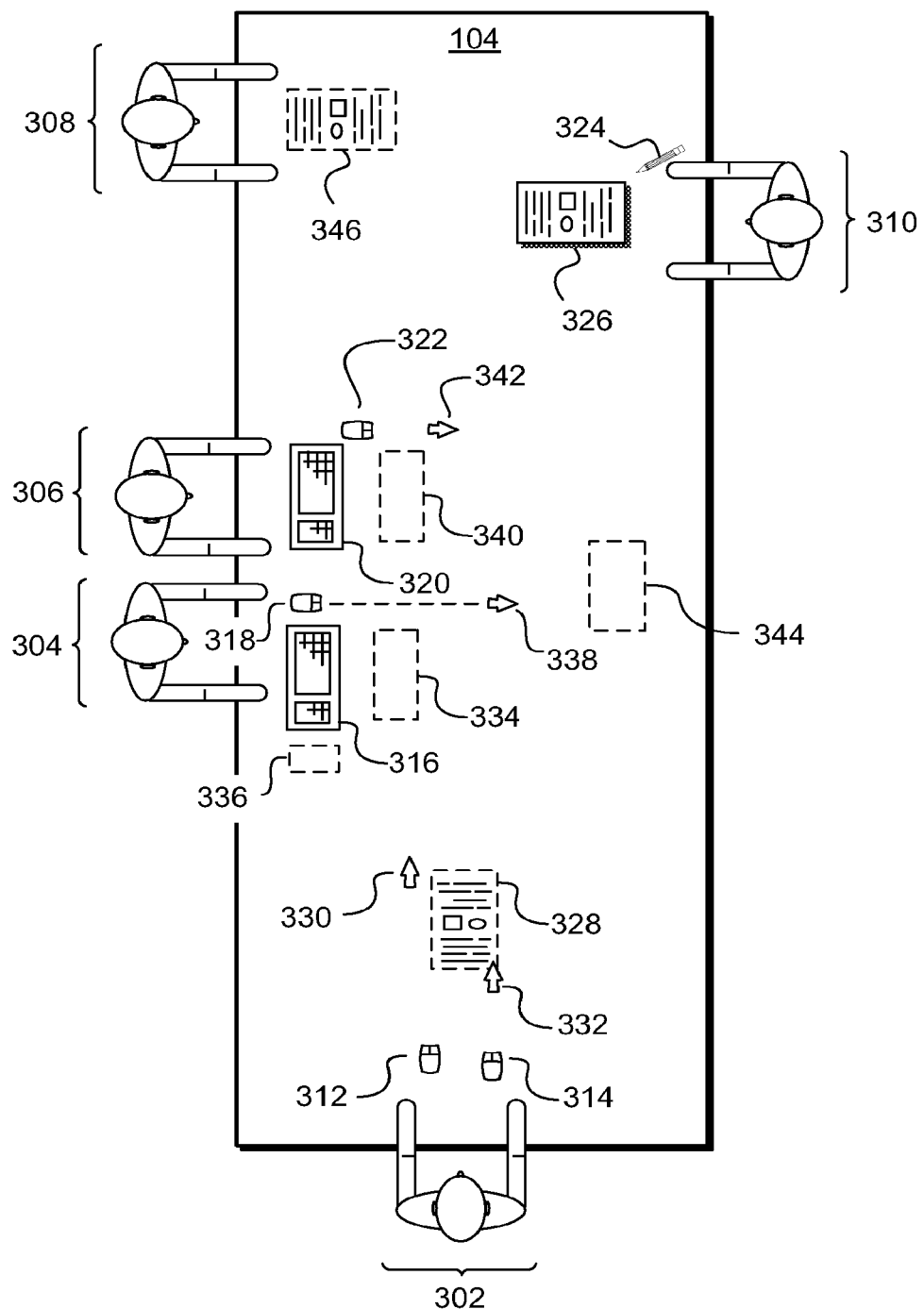
FIG. 3 shows an illustrative top-down view of an interactive surface for use in the illustrative interactive surface environment of FIG. 1.

FIG. 3 shows an illustrative top-down view of the interactive surface 104 for use in the interactive surface environment 100 of FIG. 1. In this example, the interactive surface 104 corresponds to a rectangular table-top of dimensions M×N. But, as stated, the interactive surface 104 can have any shape, surface contour, orientation, and size.

In the particular case of FIG. 3, the interactive surface 104 is large enough to host a collaborative environment in which a plurality of users (302, 304, 306, 308, 310) can simultaneously engage the interactive surface 104. As mentioned above, the users may work on the same application provided by a single application module, or the users can work on separate applications provided by different respective application modules 114.

Note that the users engage the interactive surface 104 using a plurality of physical objects. A first class of physical objects corresponds to input devices. Such devices include keyboard-type devices and mouse-type devices (but, as stated, the users can use any kind of input device). For example, user 302 is using two mouse-type input devices (312, 314). User 304 is using a keyboard-type device 316 in combination with a mouse-type device 318. Similarly, user 306 is using a keyboard-type device 320 in combination with a mouse-type device 322. User 308 does not operate any physical input device, but he or she can nevertheless manipulate digital objects using finger contacts (in a manner to be described below). User 310 uses a physical marking implement 324 (e.g., a pen, etc.) to create marks. A second class of physical objects includes articles. For example, user 310 is interacting with a physical document 326.

The interactive surface 104 also provides a collection of digital objects which are projected onto its surface by the content-projection modules 206. For example, the user 302 is interacting with a digital copy 328 of the physical article 326. The user also can interact with cursors (330, 332) which are controlled by the respective mouse-type devices (312, 314). The digital copy 328 and the cursors (330, 332) are digital objects insofar as they are not physical objects, but rather images projected onto the interactive surface 104 by the content-projection modules 206.

The user 304 is interacting with a display interface 334 which serves to display the information input by the user 304 using the keyboard-type device 316. The user 304 also interacts with an optional "soft key" input mechanism 336 that can be activated by the user 304 by pressing on its key(s) with a finger or stylus or using a cursor-simulated finger contact, etc. The user also interacts with a cursor 338 which is controlled by the mouse-type device 318. Again, all of these objects constitute digital objects that are projected onto the interactive surface 104.

In a similar manner, the user 306 is interacting with a display interface 340 that receives information input by the user using the keyboard-type device 320. The user 306 also interacts with a cursor 342 that is controlled by the mouse-type device 322. Further, the user 306 can interact with a joint display interface 344 which is shared with the user 304. That is, the joint display interface 344 can display the union of content entered by both user 304 and user 306.

User 308, like user 302, is interacting with a digital copy 346 of the physical article 326.

User 310 is currently not interacting with any digital objects.

Figure 4:
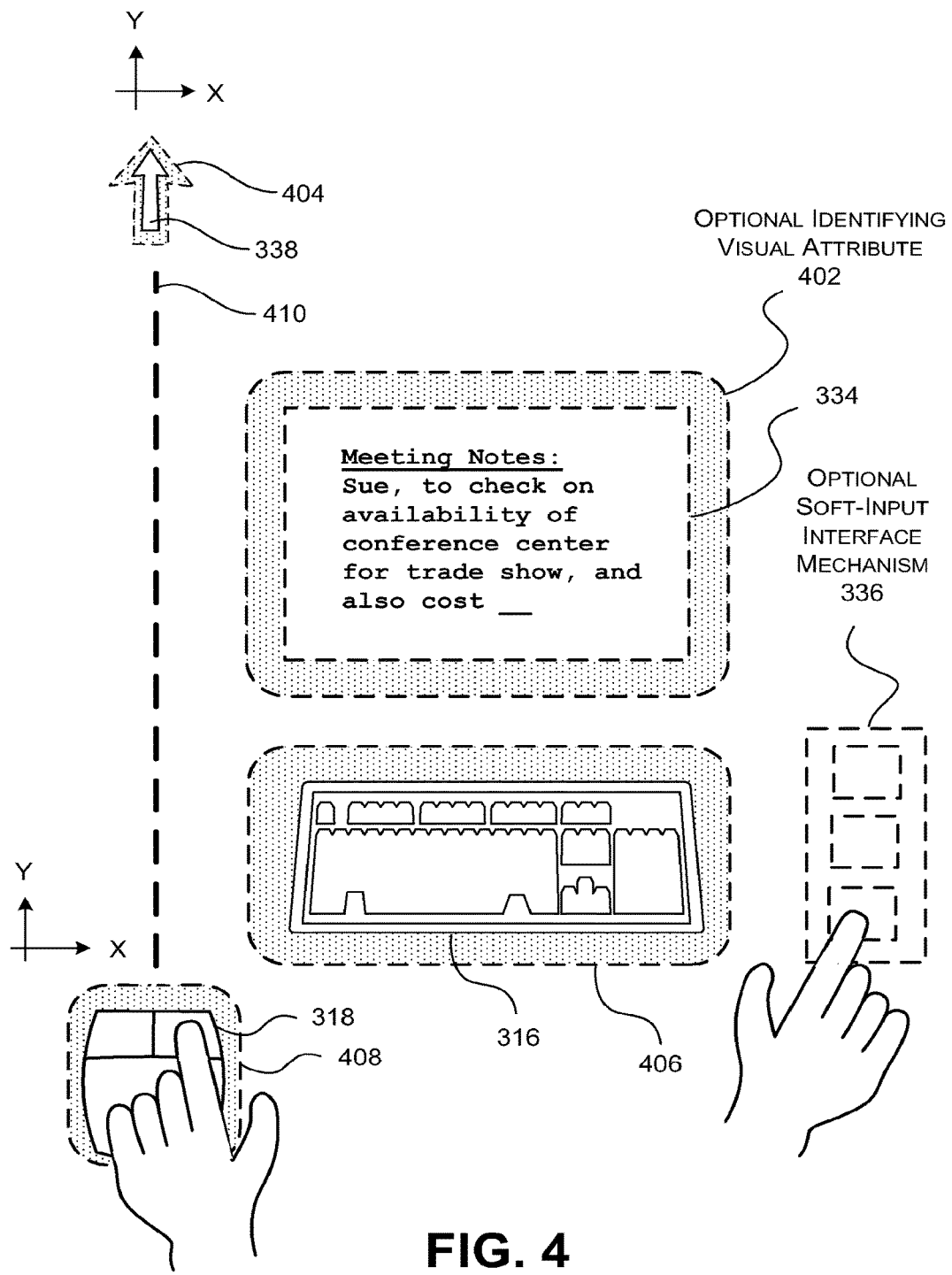
FIG. 4 is a more detailed top-down view of part of the interactive surface shown in FIG. 3.

FIG. 4 shows a more detailed depiction of the manner in which the user 304 can interact with the interactive surface 104. To repeat, the user 304 is using a keyboard-type device 316 and a mouse-type device 318 to engage the interactive surface 104. The keyboard-type device 316 is an example of one type of device for providing alphanumeric text entry. The interactive surface 104 provides three digital objects for use by the user 304, namely a display interface 334, an auxiliary a soft-key input mechanism 336, and a cursor 338.

In the illustrated scenario, the user 304 is using the keyboard-type device 316 to interact with a word processing program. The message that the user 304 is typing using the keyboard-type device 316 is displayed in the interface display 334. The user 304 may optionally use the soft-key input mechanism 336 to provide supplemental instructions that have a bearing on the task at hand. For example, the word processing program (in conjunction with the IMM 112) can provide a soft-key input mechanism 336 that allows the user 304 to perform actions on the message that he or she is typing. For example, the user 304 can use the soft-key input mechanism 336 to print the message, send the message to another user, and so on.

In another scenario (not shown), the IMM 112 can use the soft-key input mechanism 336 to establish a context for use in interpreting the information that the user 304 inputs through the keyboard-type device 316 (or some other input device). For example, if the user 304 is performing a search, the soft-key input mechanism 336 can be used to identify the data store to which the user's 304 search selection is to be applied. For instance, the soft-key input mechanism 336 can be used to specify whether the search selection is to be directed to a local database, an organizational database, or a remote public database, and so on.

As can be appreciated from the illustrative scenario shown in FIG. 3, in a multi-user setting, the interface surface 104 can easily become relatively cluttered with physical objects and digital objects. It may thus become confusing as to which user controls which object(s). To address this potential challenge, the IMM 112 provides a suite of mechanisms to help disambiguate "ownership" of objects.

According to one technique, the IMM 112 displays the digital objects near the devices which are associated with the digital objects. For example, as shown in FIG. 4, the IMM 112 can present the display interface 334 directly above the keyboard-type device 316 (although, in other implementations, the IMM 112 can present the display interface 334 at other locations relative to the keyboard-type device 316). Further, the IMM 112 can present the digital objects with an orientation that generally matches the orientation of the devices which are associated with the digital objects. For example, the orientation of the display interface 334 matches the orientation of the keyboard-type device 316. If the user changes the position and/or orientation of the keyboard-type device 316, the position and/or orientation of the display interface 334 will change in a corresponding manner. Further note that the orientation of the cursor 338 matches the orientation of the mouse-type device 318.

FIG. 4 also shows that the digital objects can be tagged with a visual attribute which helps the user 304 keep track of the digital objects which he or she "owns" or controls. For example, the IMM 112 can display a border 402 around the display interface 334 and a border 404 around the cursor 338. The IMM 112 can also optionally display a border 406 around the keyboard-type device 316 and a border 408 around the mouse-type device 318. The borders (402, 404, 406, 408) can be displayed in a single color which differs from respective colors assigned to other users, thus helping the user 304 keep track of the group of digital objects and devices which belong to him or her. The use of color borders is illustrative of one implementation. Alternatively, or in addition, the entire surfaces of the objects can be tinted in a telltale color. Alternatively, or in addition, the objects can be tagged with distinguishing information (such as distinguishing textual information, distinguishing symbolic information, etc.), and so on. Alternatively, or in addition, connecting lines can be drawn between the physical devices and their associated digital objects. For example, as shown in FIG. 4, the IMM 112 can project a line 410 that connects the mouse-type device 318 with its associated cursor 338.

The IMM 112 can establish associations between devices and digital objects in different ways. According to one representative mechanism, each physical input device can include an identifying tag on its underside (e.g., the side which contacts the interactive surface 104). For example, the tag may correspond to a bar code or other kind of machine-readable information. The position-detection modules 210 can read this tag to determine the identity of the physical device. This information, in turn, allows the IMM 112 to correlate the physical device with the digital objects that are associated with the device. Additional information regarding techniques for reading identifying information from devices placed on an interactive surface 104 can be found in U.S. Pat. No. 7,204,428, naming the inventor of Andrew D. Wilson.

Returning to FIG. 3, this figure encompasses many different usage scenarios that are described in detail in Section B below. Before delving into those scenarios, the remainder of this section provides additional information regarding base tools and mechanisms that can allow the IMM 112 to perform the functions that will be described in Section B.

Figure 6:
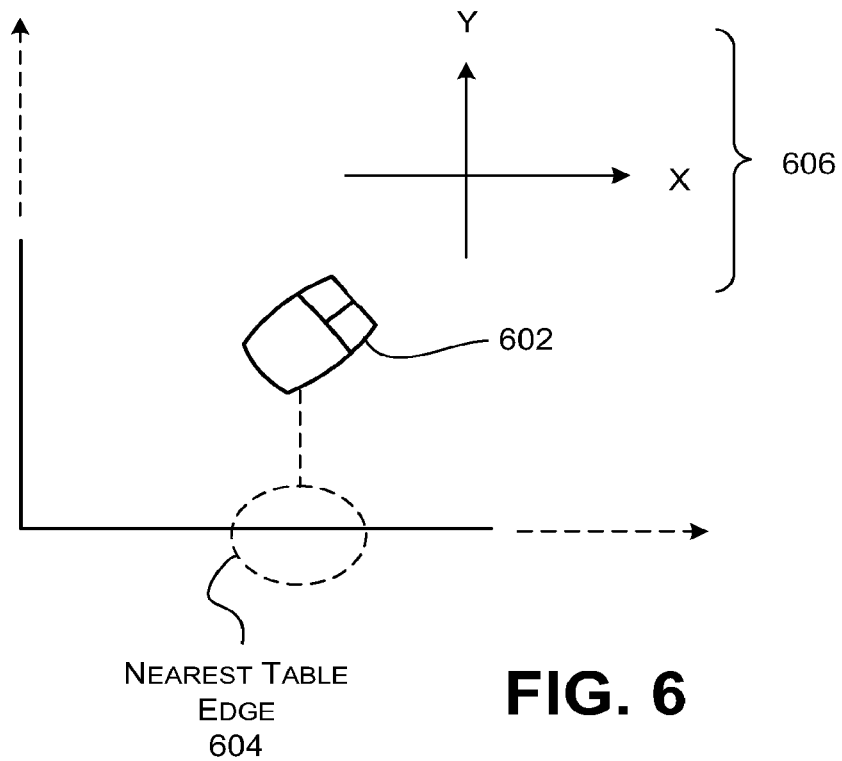
FIG. 6 shows a first technique for determining a frame of reference for use in positioning the cursor in the procedure of FIG. 5; here, the frame of reference is based on a nearest edge of the interactive surface.
Figure 7:
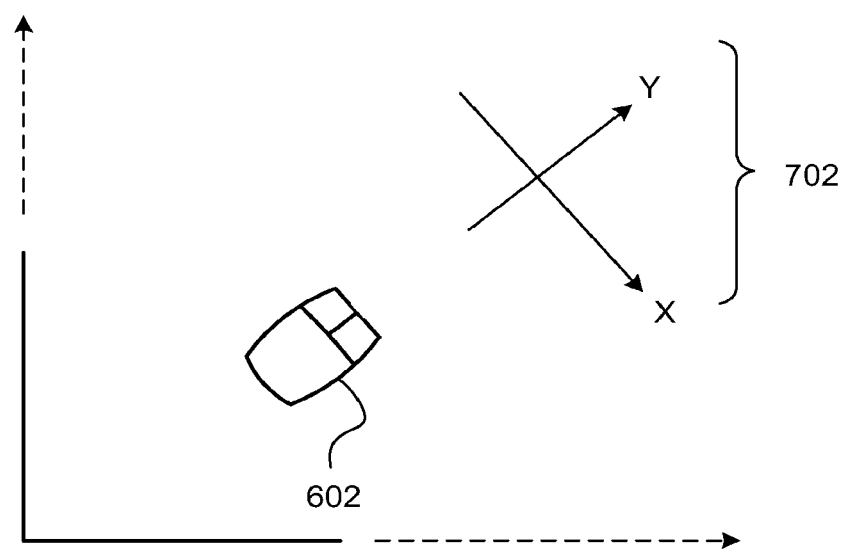
FIG. 7 shows a second technique for determining a frame of reference for use in positioning the cursor in the procedure of FIG. 5; here, the frame of reference is based on an orientation of a mouse-type device which is used to control the cursor.

A.2. Illustrative Cursor-Positioning Mechanisms (FIGS. 5-7)

Figure 5:
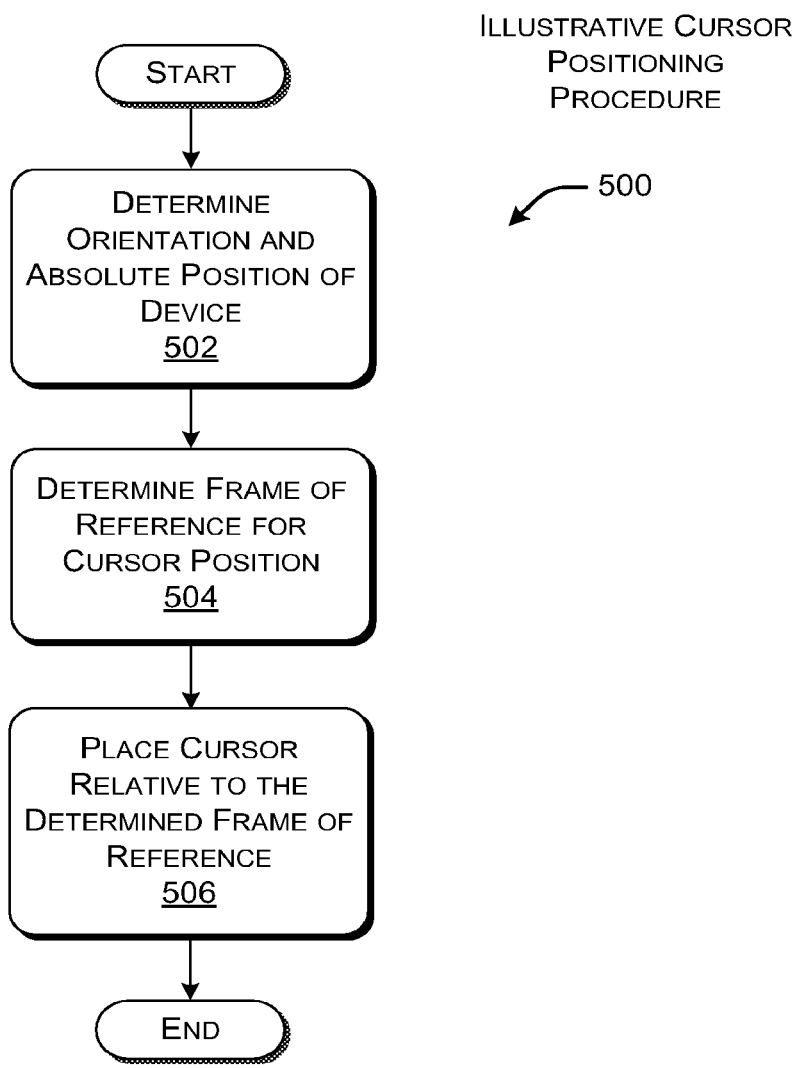
FIG. 5 is a flowchart that shows an illustrative procedure for determining a position of a cursor on an interactive surface.

FIG. 5 is a flowchart that shows an illustrative procedure 500 for determining a position of a cursor on an interactive surface 104.

In block 502, the IMM 112 determines the orientation and absolute position of a mouse-type device (or other type of input device that can be used to control a cursor). This information can be obtained from any of the input mechanisms described above, such as the position-detection modules 210.

In block 504, the IMM 112 determines a frame of reference for use in positioning the cursor. More specifically, a typical mouse-type device provides positional offset information that positions a cursor relative to a frame of reference. Block 504 determines this frame of reference. FIGS. 6 and 7 will provide two illustrative techniques for determining the frame of reference.

In block 508, the IMM 112 places the cursor at a position that is based the frame of reference determined in block 506. The placement of the cursor thus reflects the contribution of both a global (absolute) measurement (e.g., provided by the position-detection modules 210) and a relative offset measurement (e.g., provided by the mouse-type device itself). The relative offset measurement is generally more precise and responsive compared to the global measurement.

The placement of the cursor may also be based on a user-definable control display (CD) ratio. The CD ratio is a scaling factor that defines how far a cursor will advance on the interactive surface 104 in response to a corresponding movement of the mouse-type device. In one illustrative technique, the IMM 112 can display an auxiliary soft-key-type input mechanism in proximity to the mouse-type input device (not shown) that allows the user to adjust the CD ratio. For example, the auxiliary input mechanism can comprise a slider-mechanism or other tunable control mechanism that allows the user to adjust the CD ratio.

FIG. 6 shows a first technique for determining a frame of reference for use in positioning the cursor in the procedure of FIG. 5. In this technique, the IMM 112 determines the absolute position of a mouse-type device 602 and then determines the edge 604 of the interactive surface 104 that is closest to the position of the mouse-type device 602. The IMM 112 then defines a frame of reference 606 which is based on axes associated with the nearest edge 606. Alternatively, or in addition, any other stationary feature(s) of the interactive surface 104 can be used as a reference object or reference objects, such as one or more reference lines (not shown) on the interactive surface 104.

FIG. 7 shows a second technique for determining a frame of reference for use in positioning the cursor in the procedure of FIG. 5. In this technique, the IMM 112 determines both the absolute position and the orientation of the mouse-type device 602. The IMM 112 then defines a frame of reference 702 which corresponds to the determined orientation of the mouse-type device 602 itself. In this case, the frame of reference dynamically changes as the user moves the mouse-type device 602 on the interactive surface 104.

The two techniques described in FIGS. 6 and 7 are representative; the IMM 112 can apply yet additional techniques or combinations of different techniques to position the cursor.

In the above examples, the goal of the procedure 500 is to determine a frame of reference with respect to which relative placement of the cursor can be defined. The IMM 112 can also apply the information collected in the procedure 500 to provide a measurement of the absolute position of the mouse-type device 602 itself. For example, the IMM 112 can use the position-detection modules 210 or other global (i.e., surface-wide) position sensing mechanism to determine an absolute position of the mouse-type device 602. The IMM 112 can then use the relative position measurement provided by the mouse-type device 602 to adjust the above-determined absolute position as the mouse-type device 602 is moved.

It is possible to use just the position-detection module 210 to determine the absolute position of the mouse-type device 602, but it may be beneficial to determine the absolute position using the combination of measurements in the manner described above; this is because, for instance, the relative position measurement provided by the mouse-type device may be more responsive (and may potentially have a higher resolution) than the global measurement made by the position-detection modules 210. Similar benefits apply to the scenario shown in FIG. 5, where the goal is to determine the relative offset of the mouse-type device 602 with respect to a frame of reference. It is possible to use just the global measurements to determine the movement of the mouse-type device 602, but it may be desirable to use a combination of global measurements and local measurements; this is because the local measurements provided by the mouse-type device 602 may be more responsive and have a greater resolution compared to the global measurements.

A.3. Illustrative Image Acquisition Mechanisms (FIG. 8)

Figure 8:
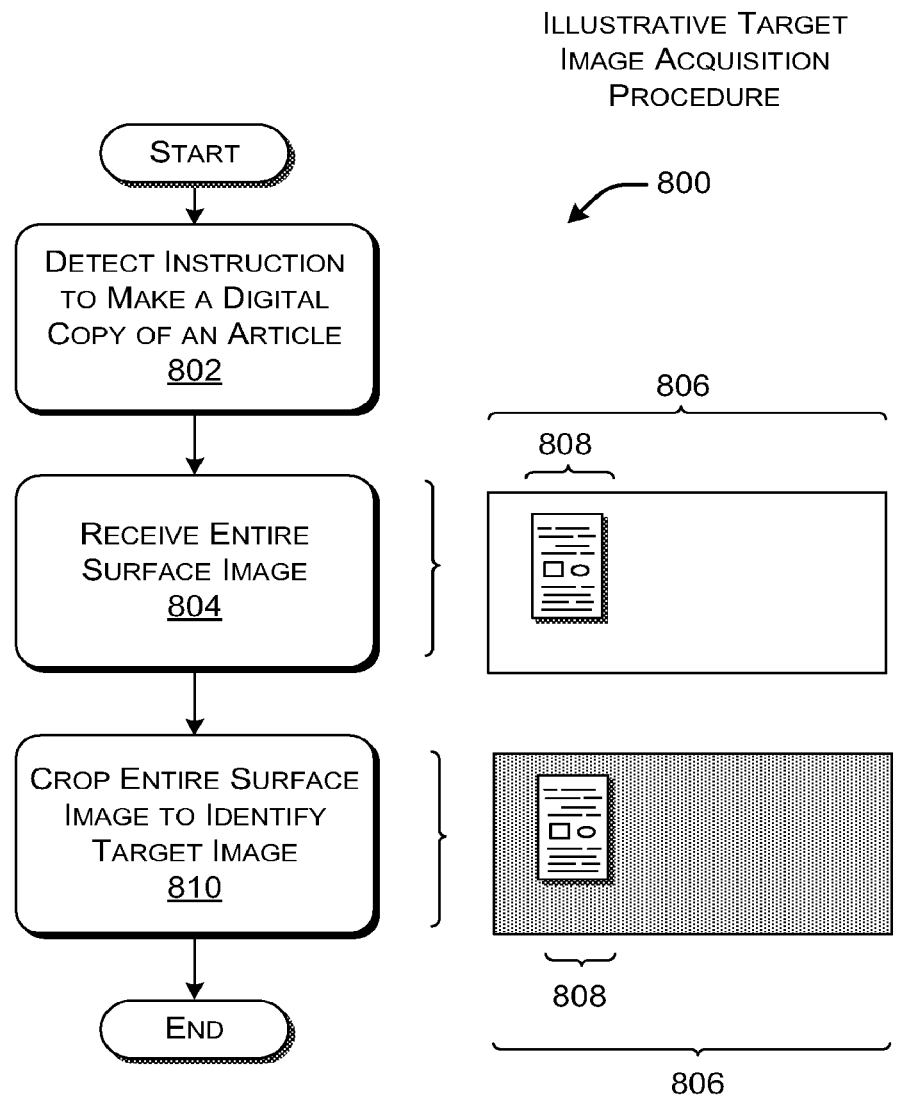
FIG. 8 is a flowchart (and accompanying example) that shows an illustrative procedure for generating a digital copy of an article that is placed on the interactive surface.

FIG. 8 is a flowchart (and accompanying example) that shows an illustrative procedure for forming a digital copy of an article or other kind of object that is placed on the interactive surface 104. FIG. 8 will be explained in the context of a specific scenario (depicted to the right of the flowchart operations), but it will be appreciated that this procedure 800 has general application to any image acquisition scenario.

In block 802, the IMM 112 detects an instruction to generate a digital copy of the article. Section B will describe representative occasions on which block 802 may be executed. For example, the IMM 112 can execute block 802 when a user activates an interface object associated with the article (e.g., by executing a dragging motion on the interface object).

In block 804, the IMM 112 receives the image of the entire interactive surface 104. FIG. 8 depicts this image as illustrative "entire surface image" 806. The entire surface image 806 includes a target image 808 as a component part thereof. The target image 808 corresponds to the article that is placed on the interactive surface 104.

In block 810, the IMM 112 crops the entire surface image 806 so that all the image content is effectively discarded except the target image 808. The target image 808 provides a digital copy of the article that can then be projected back onto the interactive surface 104 in a manner that will be described in Section B. The IMM 112 can use different techniques to crop the entire surface image 806. In one technique, the IMM 112 can use edge detection to determine the boundaries of the target image 808; the IMM 112 can then remove all of the image content outside these boundaries using cropping.

A.4. Illustrative Digital Object Placement Mechanisms (FIG. 9)

Figure 9:
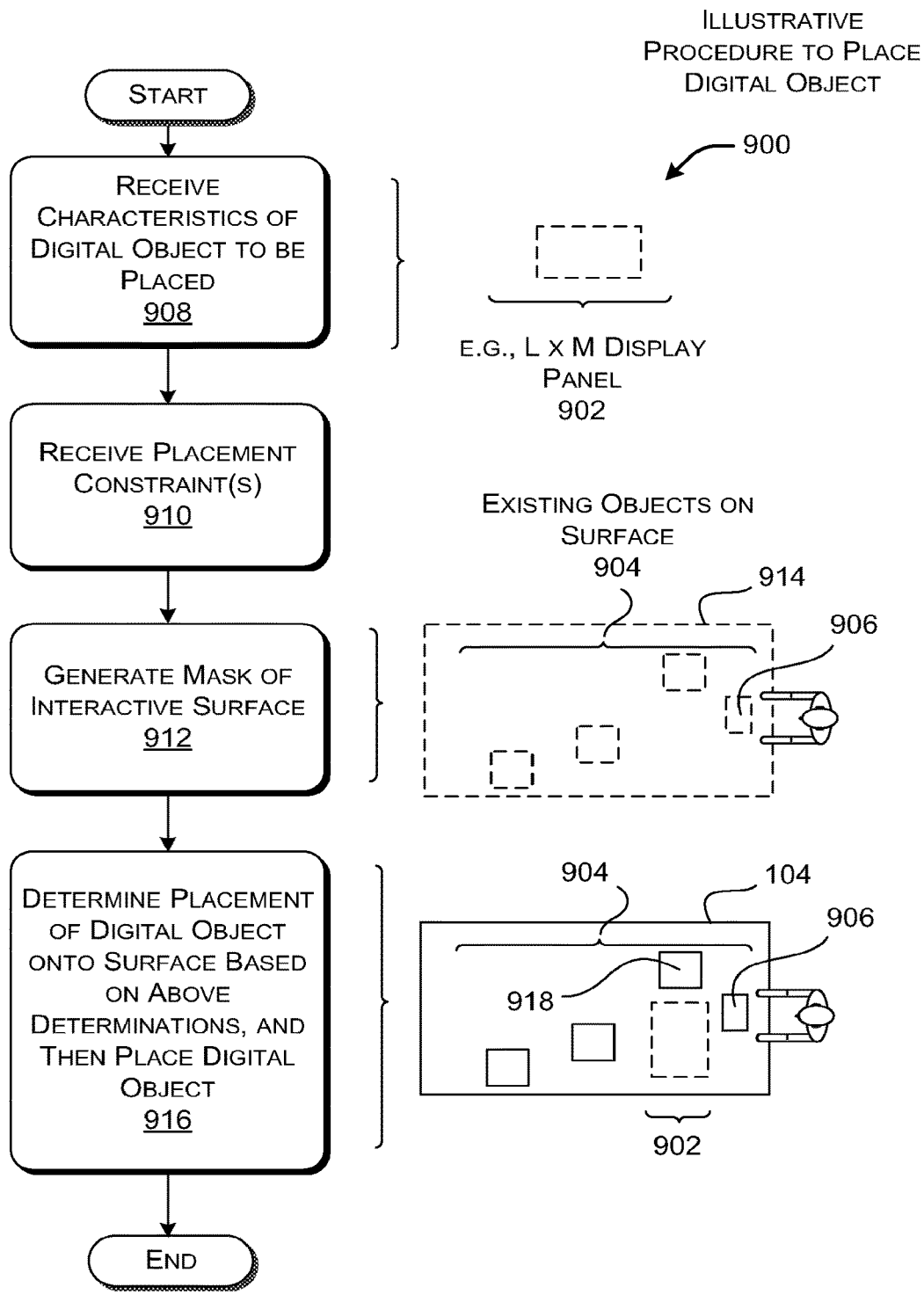
FIG. 9 is a flowchart (and accompanying example) that shows an illustrative procedure for placing a digital object on the interactive surface in a manner such that the digital object does not interfere with existing objects on the interactive surface.

FIG. 9 is a flowchart (and accompanying example) that shows an illustrative procedure 900 for placing a digital object on the interactive surface 104 in a manner such that the digital object does not interfere with existing objects on the interactive surface 104. In the merely representative example of FIG. 9, the IMM 112 may seek to place an L×M digital object 902 onto the interactive surface 104 such that the digital object 902 does not interfere with a collection of existing objects 904. For example, assume that the user has just placed a new keyboard-device 906 on the interactive surface 104. The IMM 112 responds by placing the digital object 902 onto the interactive surface 104. (In the specific scenario of FIG. 9, the display object 902 acts as a display interface for the keyboard-type device 906.) FIG. 9 will be explained in the specific context of the above-described scenario (involving digital object 902), but it will be appreciated that this procedure 900 has general application to any object placement scenario.

In block 908, the IMM 112 determines the characteristics of the digital object 902 that it wishes to place on the interactive surface 104. The characteristics of the digital object 902 may correspond to the dimensions of the digital object 902, or more generally, the shape of the perimeter of the digital object 902. In the representative example of FIG. 9, the IMM 112 determines that the object 902 has dimensions of L×M.

In block 910, the IMM 112 identifies at least one placement constraint. Each placement constraint corresponds to a rule which acts as a constraint to be satisfied in placing the digital object 902. For example, one rule that may apply to the scenario set forth above is that the digital object 902 is to be placed above the keyboard-device 906 (relative to the position of the user) and preferably as close as possible to the keyboard-type device 906 (or a few inches above the keyboard-type device 906, etc., depending on environment-specific placement factors). In one implementation, one or more of these constraints are defined as mandatory constraints that are required to be satisfied in the placement of the digital object 902. Alternatively, or in addition, one or more of these constraints are defined as preference-type constraints that are to be satisfied to an extent possible in the placement of the digital object 902. In yet other implementations, the IMM 112 can permit a user to attach a weight to each constraint which determines the relative importance of the constraint in the placement of the digital object 902. The IMM 112 can use these weights to prioritize the various considerations that go into placing the digital object 902, particularly in the case in which all of the constraints cannot be fully satisfied.

In block 912, the IMM 112 generates a mask (e.g., mask 914) of the entire surface of the interactive surface 104. The IMM 112 can form the mask 914 in any way or combination of ways, e.g., by using the position detection modules 210 to determine the placement of physical objects on the interface surface 104. As shown in FIG. 9, the mask 914 reveals the presence of the collection of pre-existing objects 904 on the interactive surface 104. These objects 904 may correspond to pre-existing physical objects and/or digital objects (note that the IMM 112 has a priori knowledge regarding the placement of digital objects because the IMM 112 is the agent which places these objects). Alternatively, or in addition, block 912 can use the high-resolution imaging modules 208 to form the mask 914.

In block 916, the IMM 112 determines the placement of the digital object 902 based on all the information discussed above, namely: a) the characteristics of the digital object 902 to be placed (as determined in block 908); b) the placement constraint(s) (as determined in block 910); and c) the positions of the existing objects 904 on the interactive surface 104 (as determined in block 912). The IMM 112 can use any algorithm for determining the placement of the object 902. In one representative case, the IMM 112 uses an integral image technique to determine an appropriate placement of the digital object 902 on the interactive surface 104. The IMM 112 applies the integral image technique by first forming an integral image table in a known manner. The integral image table can be used to investigate a plurality of placement possibilities in an efficient manner.

FIG. 9 shows that the L×M display object 902 is placed on the interactive surface 104 such that it does not overlap with any of the existing objects 904. Further, this placement at least partially satisfies the above-identified placement constraint(s), e.g., because the display object 902 is placed relatively close to user's keyboard-type device 906. However, the placement of the object 902 may not be optimal (from the standpoint of the placement constraints) due to the constraining presence of nearby object 918.

A.5. Illustrative Mechanisms for Using a Cursor as a Contact Point (FIG. 10)

A contact point corresponds to a point at which the user may engage the interactive surface 104 to manipulate a digital object that is presented on the interactive surface 104 or to perform some other action. In one case, the user can engage the interactive surface 104 by placing a finger (or other body part, such as an entire hand, etc.) or a physical pointing instrument (such as, a stylus, etc.) on or near the interactive surface 104. This type of contact point is broadly referred to herein as a finger contact point. In another case, a user can use a cursor which is controlled by a mouse-type input device as a simulated finger contact point. That is, the cursor can operate as a surrogate for the user applying a finger at the location defined by the cursor. The type of contact point associated with a cursor is referred to as a cursor contact point. Here, the term cursor encompasses any digital object that can be manipulated by the user; in one non-limiting case, a cursor corresponds to an arrow-shaped digital object.

Figure 10:
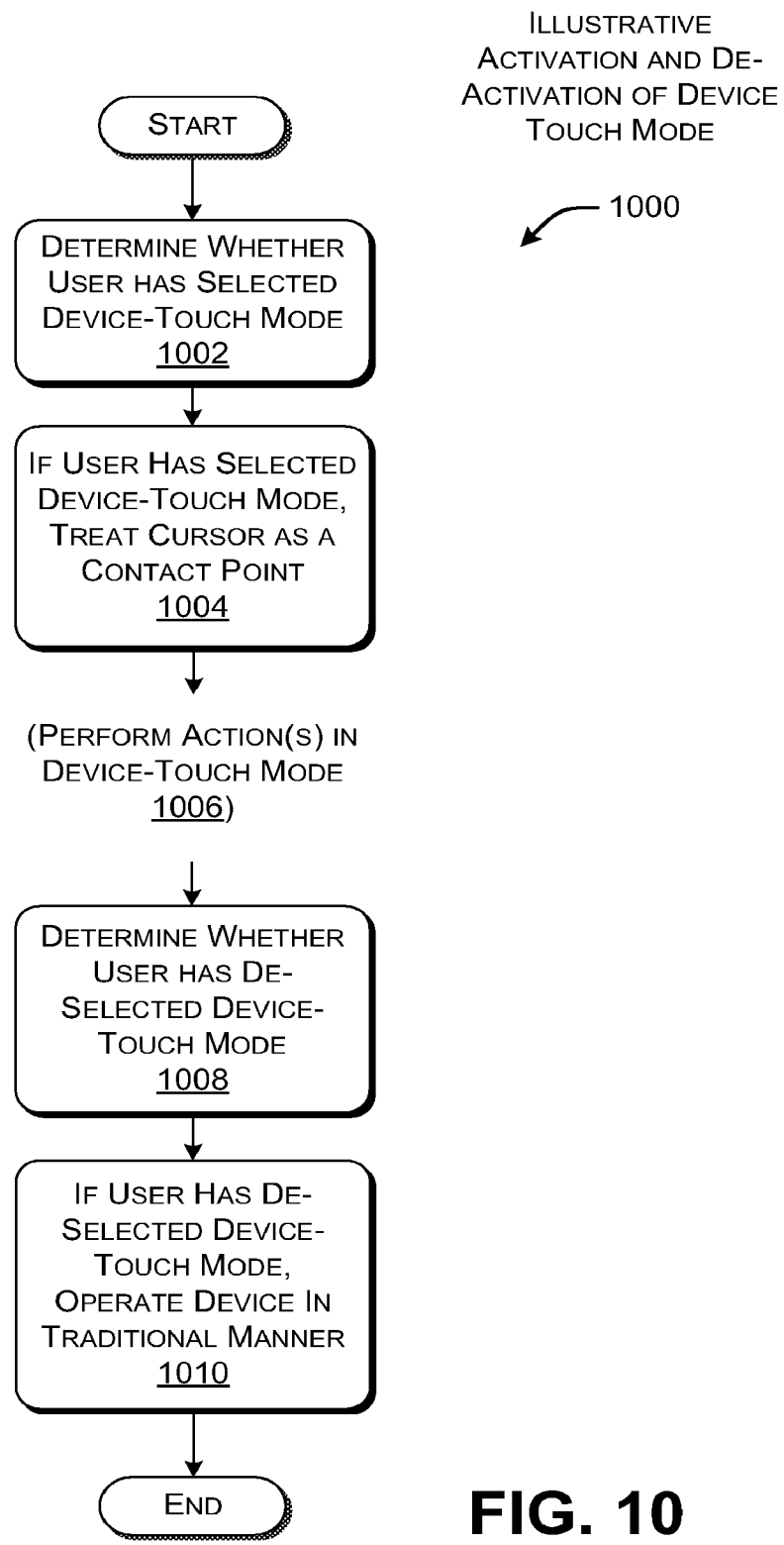
FIG. 10 is a flowchart that shows an illustrative procedure for operating a mouse-type device in a touch mode; in this mode, a cursor controlled by the mouse-type device simulates a finger contact placed on the interactive surface.

FIG. 10 is a flowchart that shows an illustrative procedure 1000 for operating a mouse-type device in a touch mode. In the touch mode, the cursor controlled by the mouse-type device simulates a finger contact placed on the interactive surface 104 in the manner described above. When not acting in the touch mode, the mouse-type device functions in a traditional manner by moving the location of the cursor without performing any supplemental image-manipulation functions.

In block 1002, the IMM 112 determines whether the user has activated the touch mode of the mouse-type device. In one merely illustrative case, the user can activate this mode by clicking on a specially-assigned mouse button or other control. So long as the user holds this button down, the device operates in the touch mode. When the user releases the button, the touch mode is de-activated. Consider the example in which the user depresses the button of the mouse-type device, and then, with the button depressed, moves the cursor from a first location to a second location. At the second location, the user releases the button. This operation is functionally equivalent to a user pressing his or her finger down on the interactive surface 104 and dragging it from the first location to the second location.

In block 1004, the IMM 112 operates the mouse-type device in the touch mode if this mode has been activated.

In block 1006, the user may perform any type of image manipulation operation within the touch mode of the mouse-type device. For example, the user can move a digital object, rotate a digital object, change the size of a digital object, and so forth. Section B provides examples of the types of actions that can be taken when the mouse-type device is operating in the touch mode of operation.

In block 1008, the IMM 112 detects that the user has de-activated the touch mode.

In block 1010, the mouse-type device transitions to a traditional mode in which it is used to control the movement of the cursor in a traditional manner of operation.

B. Illustrative Applications of Systems and Tools

FIGS. 11-22 provide several scenarios which describe how the systems and tools described in Section A can be used by users to engage the interactive surface 104. These scenarios are illustrative; the systems and tools described above can be used to perform many other operations that are not specifically enumerated in this section.

B.1. Mechanisms for Affiliating Digital Objects with Physical Objects (FIGS. 11-14)

FIGS. 11-14 show various scenarios that indicate how the IMM 112 can manage the affiliation between physical devices and digital objects. In the scenarios set forth in this subsection, the digital objects correspond to display interfaces. These display interfaces are used to present information that is entered by the users using physical devices, such as keyboard-type devices. However, the principles described here are applicable to any type of digital object and any type of physical device.

Figure 11:
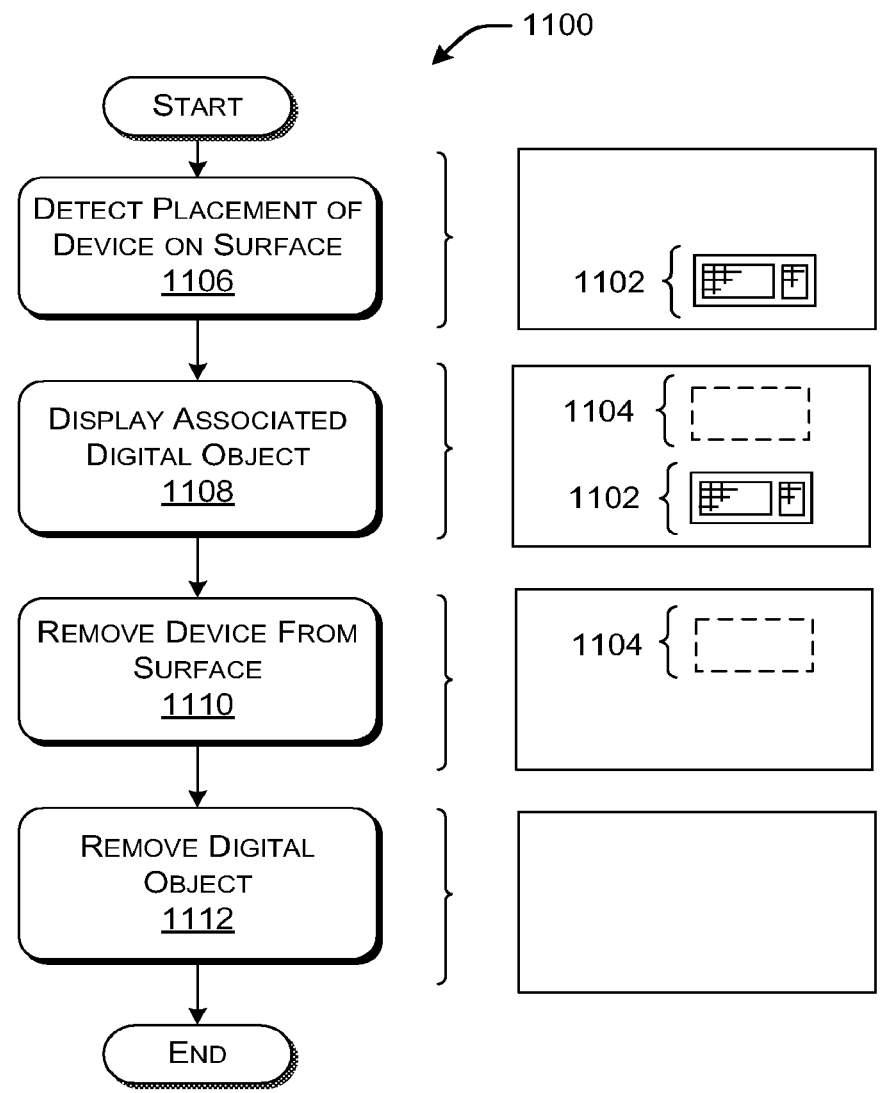
FIG. 11 is a flowchart (and accompanying example) that shows an illustrative procedure for generating a new digital object when a device is placed on the interactive surface.

Starting with FIG. 11, this figure is a flowchart (and accompanying example) that shows an illustrative procedure 1100 for generating a new digital object when a device is placed on the interactive surface 104. Namely, in this case, the user has placed a device 1102 onto the interactive surface 104; it is the goal of the procedure 1100 to display a digital object 1104 onto the interactive surface 104. In this illustrative case, the digital object 1104 provides a display interface for use in association with the device 1102 (as mentioned above).

In block 1106, the IMM 112 detects that the user has placed the device 1102 onto the interactive surface 104. The IMM 112 can make this determination based on input information provided by the position-detection modules 210, and/or any other input mechanism described above. The IMM 112 can distinguish the device 1102 from a physical article (such as a physical document) by noting that the device 1102 includes a telltale code on its underside. In addition, or alternatively, the IMM 112 can distinguish the device 1102 from the physical article (or a finger contact point and the like) based on contour analysis.

In block 1108, the IMM 112 displays the digital object 1104 on the surface just above the device 1102. More specifically, the placement procedure 900 described above (in connection with FIG. 9) can be used to determine the position (and orientation) at which to place the digital object 1104. In one case, the IMM 112 can display the digital object 1104 immediately after it detects that the user has placed the device 1102 onto the interactive surface 104. In another case, the IMM 112 can display the digital object 1104 in response to the detection that the user has begun to interact with the device 1102; for example, the IMM 112 can display the digital object 1104 when the user enters a first keystroke using the device 1102. Still other factors can play a role in determining the timing at which to present the digital object 1104. In one case, the IMM 112 can remove (e.g., turn off) the digital object 1104 when it detects inactivity with respect to the device 1102 for a prescribed period of time.

In block 1110, the IMM 112 detects that the user has removed the device 1102 from the interactive surface 104.

In block 1112, in response to the removal of the device 1102, the IMM 112 removes the digital object 1104 from the interactive surface 104.

Figure 12:
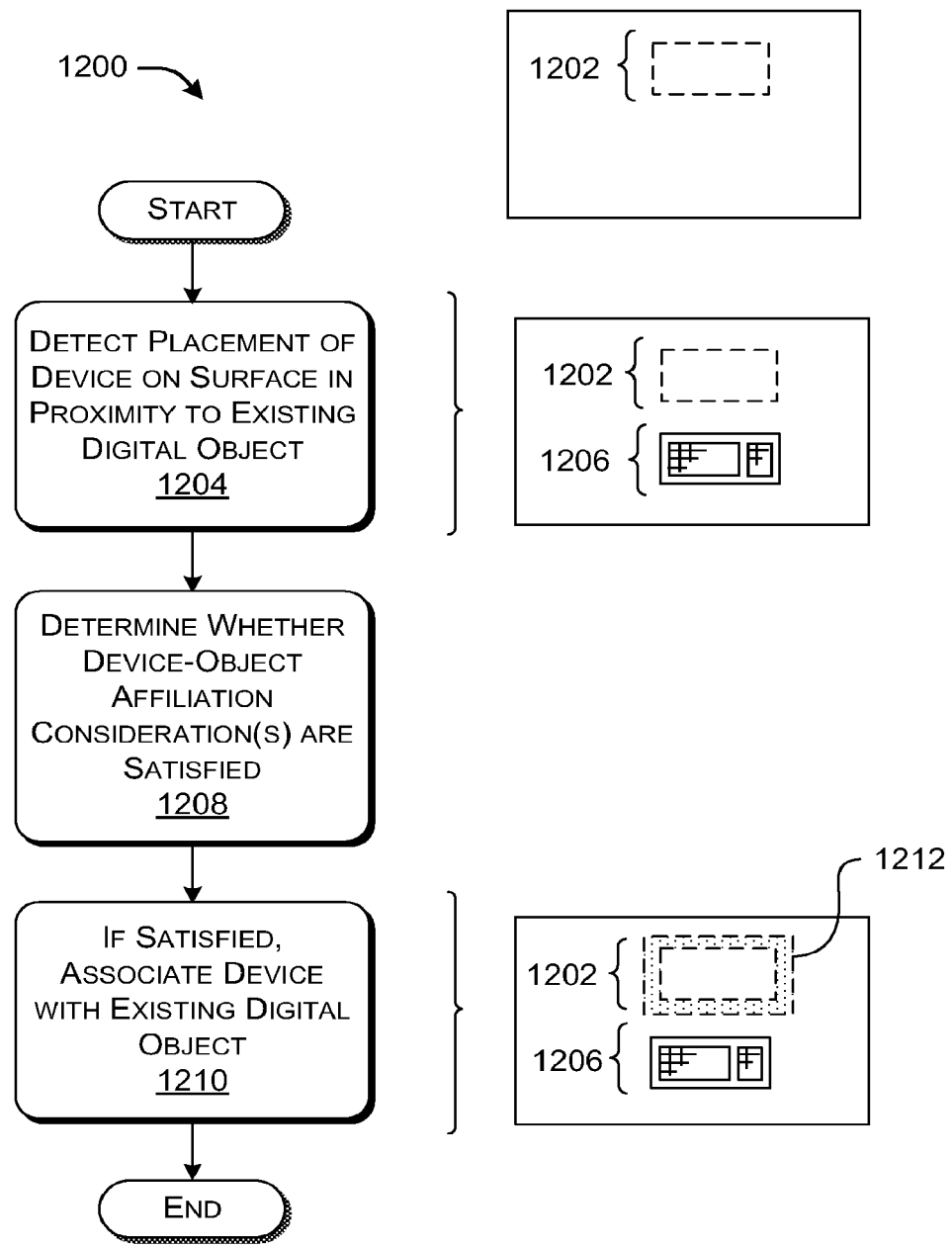
FIG. 12 is a flowchart (and accompanying example) that shows an illustrative procedure for affiliating an existing digital object with a device when the device is placed on the interactive surface in proximity to the existing digital object.

FIG. 12 is a flowchart (and accompanying example) that shows an illustrative procedure 1200 for affiliating an existing digital object with a device when the device is placed on the interactive surface 104 in proximity to the existing digital object. For example, assume that the interactive surface 104 already includes a digital object 1202. In one particular illustrative scenario, this digital object 1202 is being used by one or more users to interact with an application module. A new user may wish to join the others and also interact with the application module via the digital object 1202.

In block 1204, the IMM 112 detects that the new user has placed a device 1206 (or other type of input device) onto the interactive surface 104 in proximity to the existing digital object 1202.

In block 1208, the IMM 112 detects whether one or more device-object affiliation considerations arc satisfied. These conditions determine whether the new device 1206 is permitted to form an association with the digital object 1202. One consideration, for example, indicates whether the new user has placed the device 1206 close enough to the digital object 1202 to warrant automatic association of the device 1206 with the digital object 1202. Another consideration indicates whether the user is permitted to join in and contribute to the task. This consideration, in turn, can depend on any number of environment-specific factors, such as the nature of the task being performed, the identity of the user, and so on. No limitation is placed on what may constitute a device-object affiliation consideration.

In block 1210, the IMM 112 forms an association between the device 1206 and the digital object 1202 if the consideration(s) identified in block 1208 are satisfied. FIG. 12 shows that the display interface 1202 can be presented with a visual attribute 1212 (such as a colored border) to indicate that the digital object 1202 is now associated with the device 1206. The IMM 112 can use other techniques to signify device-object affiliation, that is, instead of the visual attribute 1212, or in addition to the visual attribute 1212. For example, the IMM 112 can project a line (not shown) that connects the device 1206 to the digital object 1202. (The same type of device-to-object visual correlation mechanism(s) can applied to the scenario shown in FIG. 11, although not shown.)

Figure 13:
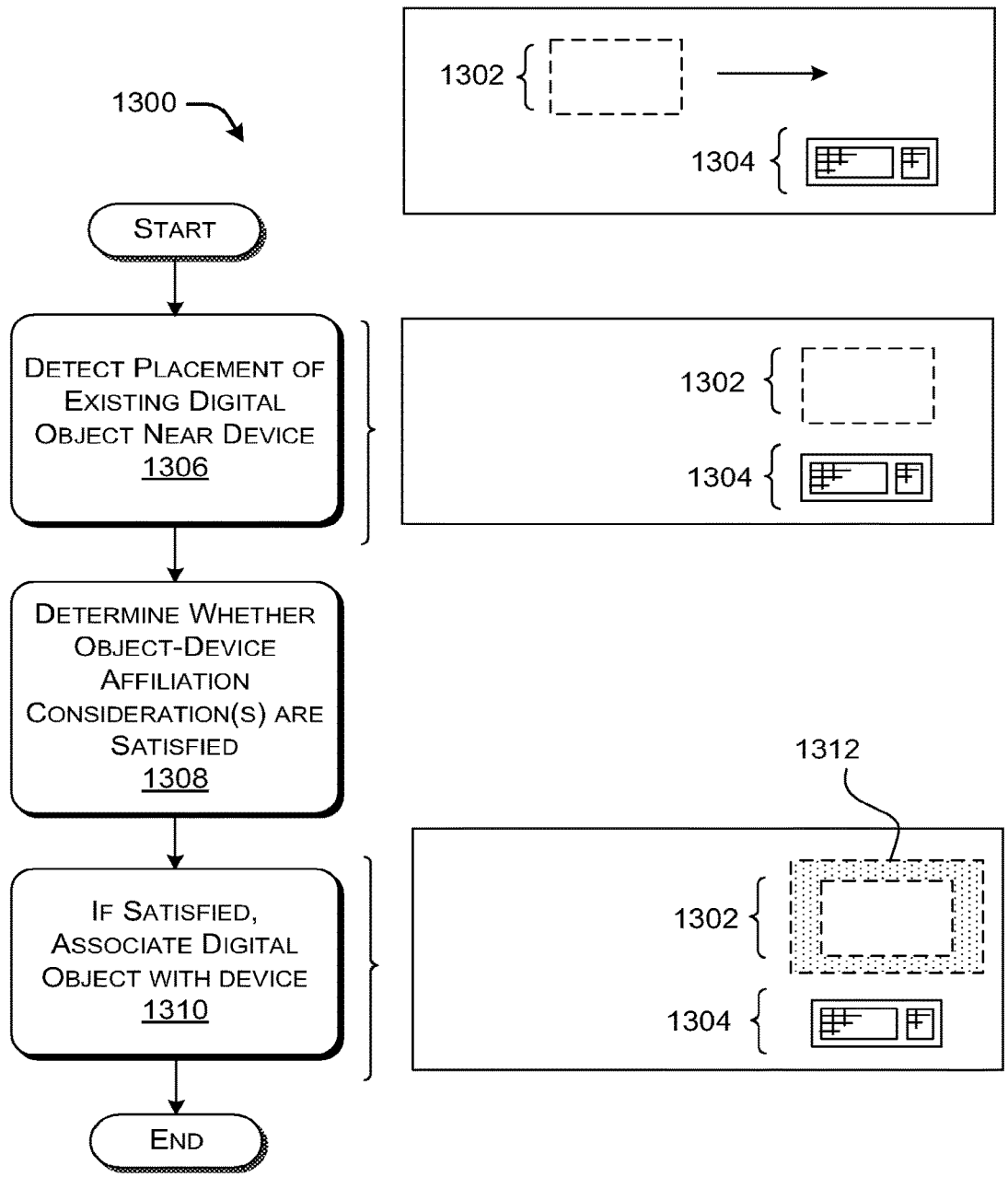
FIG. 13 is a flowchart (and accompanying example) that shows an illustrative procedure for affiliating an existing digital object with a device when the existing digital object is moved in proximity to the device.

FIG. 13 is a flowchart (and accompanying example) that shows an illustrative procedure 1300 for affiliating an existing digital object with a device when the existing digital object is moved in proximity to the device. That is, FIG. 13 shows a scenario that is complementary to the scenario described in FIG. 12. In FIG. 13, the user moves an existing digital object 1302 to a device 1304, whereas, in FIG. 12, the user moves the existing device 1206 to the digital object 1202.

In block 1306, the IMM 112 detects that the user (or some other agent) has placed the existing digital object 1302 in proximity to the device 1304.

In block 1308, the IMM 112 determines whether the device-object affiliation consideration(s) are met. These considerations define whether it is appropriate to associate the digital object 1302 with the device 1304. Exemplary such considerations were described in the context of the discussion of block 1208 of FIG. 12.

In block 1310, the IMM 112 associates the digital object 1302 with the device 1304 if the conditions defined in block 1308 arc satisfied. In one case, the IMM 112 can display a visual attribute 1312 (such as a colored border) to indicate that the digital object 1302 is now associated with the device 1304.

Figure 14:
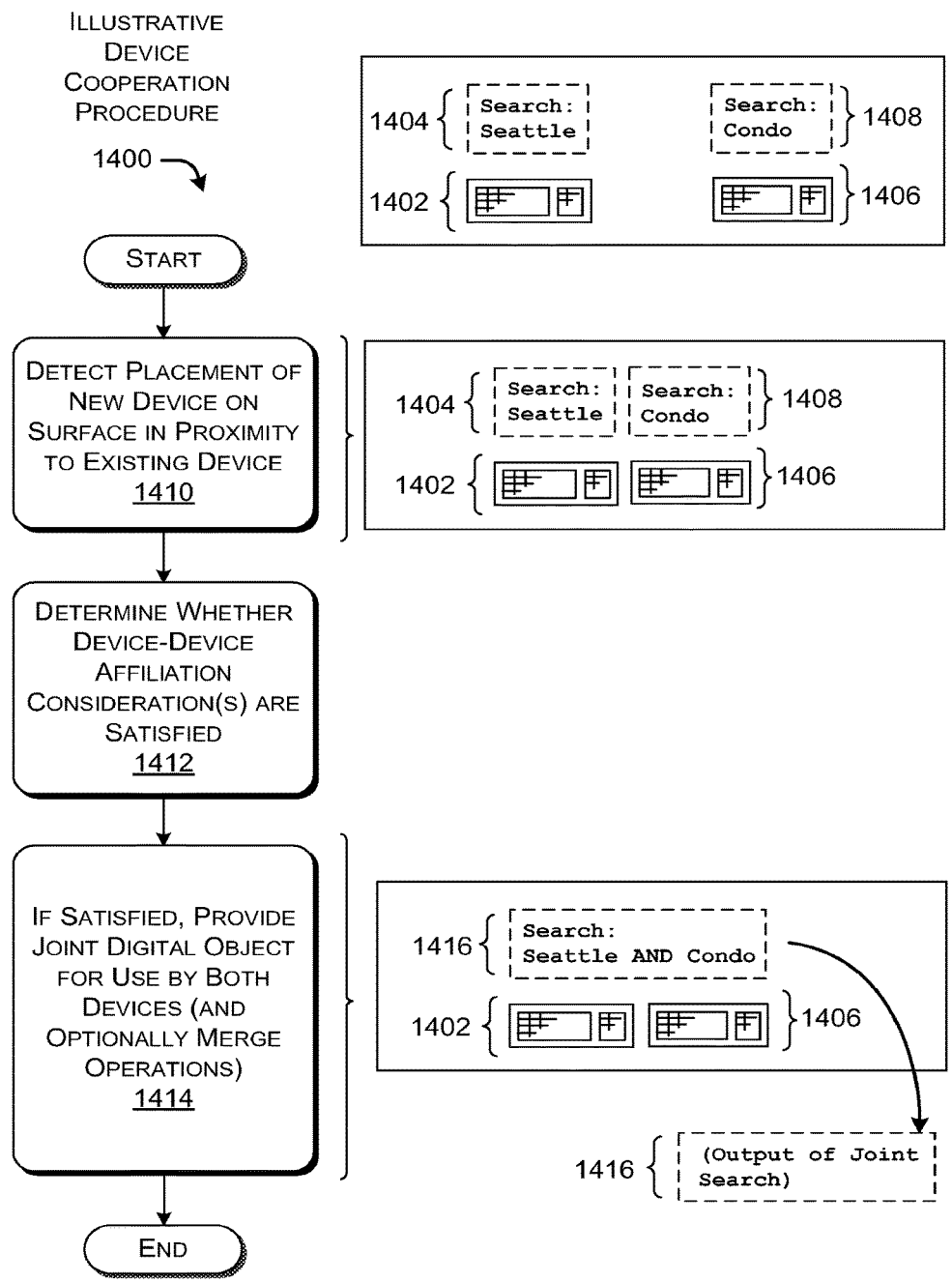
FIG. 14 is a flowchart (and accompanying example) that shows an illustrative procedure for affiliating a single digital object with two devices; this procedure also demonstrates how content provided by two respective digital objects (controlled by the two respective devices) can be merged by bringing the devices in proximity to each other.

FIG. 14 is a flowchart (and accompanying example) that shows an illustrative procedure 1400 for affiliating a single digital object with two devices; this procedure also demonstrates how operations being performed using two respective digital objects (which are controlled by the two respective devices) can be merged by bringing the devices near to each other.

For example, in one scenario, assume that a first user is using a first device 1402 and an associated display object 1404 to interact with a search application module. A second user is using a second device 1406 and associated digital object 1408 to interact with the same search application module. At an initial point of time, these users are interacting with the interactive surface 104 at locations that are relatively far apart from each other; further, these two users are performing independent search operations. Next assume that the users move their devices (1402, 1406) relatively close to each other so that they can work together on a common search task. For example, these two users may correspond to users 304 and 306 shown in FIG. 3. In this scenario, the IMM 112 can be used to combine the operations performed by these users in the manner described below.

In block 1410, the IMM 112 detects placement of the two devices (1402, 1406) in proximity to each other on the interactive surface 104.

In block 1412, the IMM 112 determines whether one or more device-device affiliation considerations are satisfied. These considerations define one or more rules that govern whether the operations being performed by one user are to be merged with the operations being performed by another user. Exemplary such considerations were described in the context of the discussion of FIGS. 12 and 13.

In block 1414, the IMM 112 merges the functions being performed by the two users if the considerations set forth in block 1412 are satisfied. This merging operation can take different forms depending on various environment-specific factors and other considerations. In the merely illustrative example shown in FIG. 14, the IMM 112 combines the digital objects (1404, 1408) that were separately being used by the devices (1402, 1406) into a single digital object 1416. Both users are permitted to engage the joint display object 1416 using their respective devices (1402, 1406).

Further, the IMM 112 can optionally combine the search selections that were independently made by the two users into a joint search selection. For example, assume that the first user has entered the search selection "Seattle" and the second user has entered the search selection "Condo" before these users moved their devices (1402, 1406) close together. Upon moving close together, the IMM 112 can form a combined search selection that represents the logical union of the independent search selections (such as by forming the combined search selection of "Seattle AND Condo"). (In other scenarios, other rules can determine the manner in which separate selections are logically combined together.) The IMM 112 can forward this combined search selection to an appropriate application module and then display the results provided by the application module in the unified display interface 1416, as graphically illustrated in FIG. 14 by the arrow pointing to the label "(Output of Joint Search)."

To repeat, the specific example developed in FIG. 14 is representative of many possible scenarios in which digital objects and corresponding operations can be merged based on various triggering events. In another example, two users can take independent notes at a meeting using independent digital objects to display those notes. Upon moving close together, the IMM 112 can merge the notes taken by these users into a common document that is displayed by a common digital object. In this scenario, the IMM 112 can optionally provide user tags of any type to indicate the contributions made by respective users to the common document. In general, the nature of the merging operation that is performed will depend, in part, on the nature of the functions being performed by the users, in combination with one or more environment-specific factors. In one case, the IMM 112 can maintain privilege information which governs, on a user-by-user basis, the object-combining and operation-combing behavior of the IMM 112. For instance, a meeting administrator may wish to prohibit certain users from contributing to a joint task, thereby locking out the behavior set forth in procedure 1400 for certain users.

FIG. 14 was described in the illustrative context of two users. But the principles set forth above can be applied to any number of users who wish to interact with a shared digital object.

Figure 15:
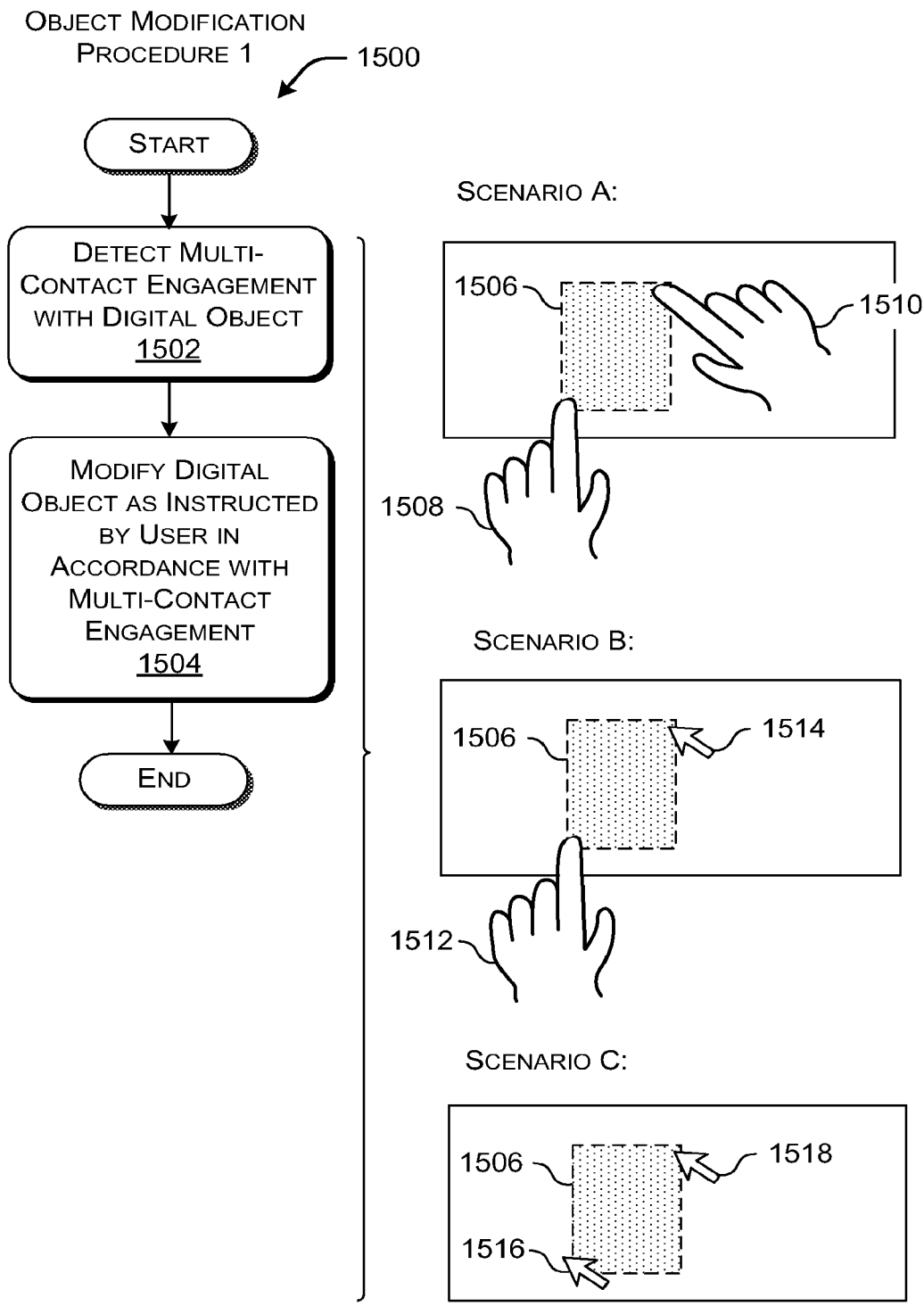
FIG. 15 is a flowchart (and accompanying example) that shows an illustrative procedure for manipulating a digital object using different contact point scenarios.
Figure 16:
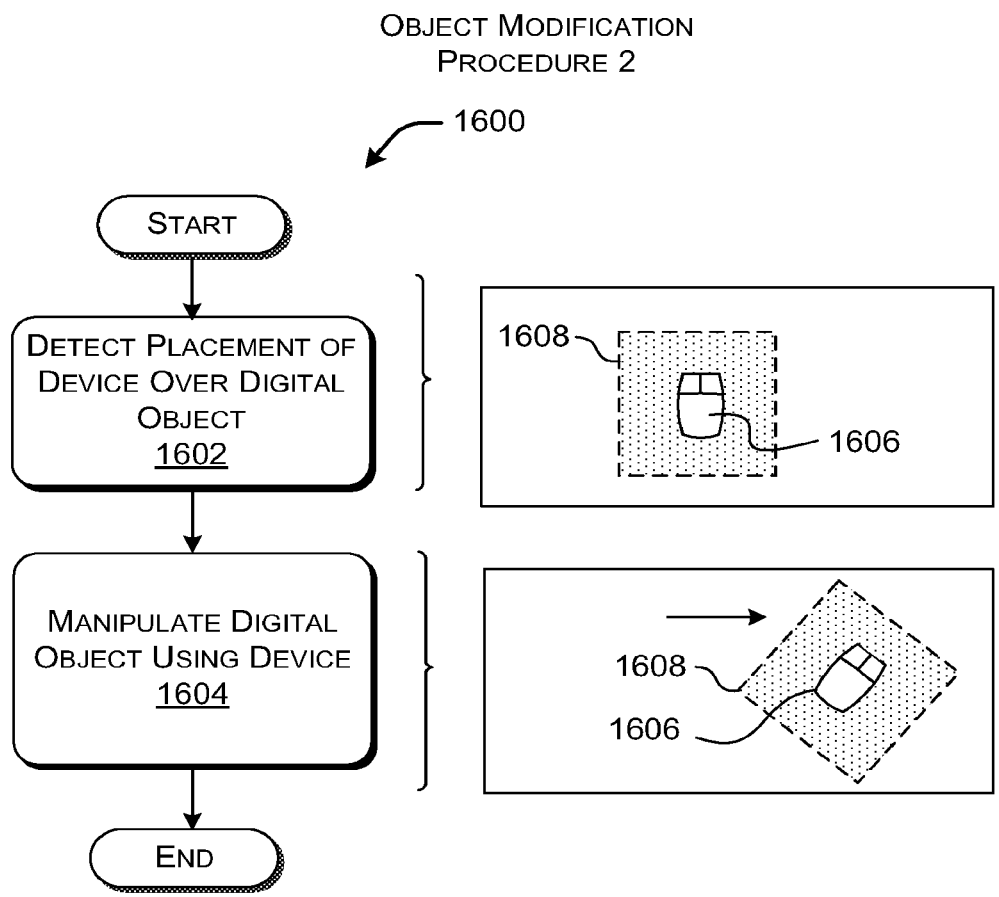
FIG. 16 is a flowchart (and accompanying example) that shows an illustrative procedure for manipulating a digital object by placing a device on top of the digital object and metaphorically using the device as a handle to move the digital object or perform some other action on the digital object.

B.2. Mechanisms for Manipulating Digital Objects (FIGS. 15 and 16)

The next series of figures shows illustrative techniques for manipulating digital objects. Starting with FIG. 15, this figure is a flowchart (and accompanying example) that shows an illustrative procedure 1500 for manipulating a digital object using different contact point scenarios. As set forth above, a contact point corresponds to a point at which a user engages (e.g., makes contact with) the surface of the interactive surface 104. This function can be performed in different ways. First, the user can create a contact point by pressing his or her finger (or other body part) or a physical instrument against the interactive surface 104; this action defines a finger contact point. Or the user can create a contact point by activating the touch mode of a mouse-type device, as described in procedure 1000 of FIG. 10; this action defines a cursor contact point.

In block 1502, the IMM 112 detects that the user has engaged a digital object using multiple contact points.

In block 1504, the IMM 112 manipulates the digital object in a manner instructed by the user (such as by moving the digital object, changing the orientation of the digital object, changing the size of the digital object, and so on).

FIG. 15 presents three representative (and non-exhaustive) scenarios that explain how the procedure 1500 can be performed. In scenario A, the user engages a digital object 1506 using two finger contact points (1508, 1510). In this merely illustrative example, the user can use the finger contact points to touch two opposing corners of the digital object 1506. The user can then manipulate the digital object 1506 by moving the finger contact points (1508, 1510) in a clockwise or counterclockwise direction to rotate the digital object 1506 (optionally with one contact point fixed as a pivot), or by moving the finger contact points (1508, 1510) towards or away from each other to change the size of the digital object 1506, and so on.

In scenario B, the user engages the digital object 1506 with a finger contact point 1512 and a cursor contact point 1514. The user can execute any manipulation described above in the context of scenario A using these contact points.

In scenario C, the user engages the digital object 1506 with two cursor contact points (1516, 1518). The user can execute any manipulation described above in the context of scenario A using these contact points. The type of manipulation shown in scenario C is particularly appropriate in those situations in which the user seeks to manipulate an object that he or she cannot reach by hand. For example, the user 302 of FIG. 3 can use two mouse-type devices (312, 314) to control two associated cursors (330, 332). By operating the mouse-type devices (312, 314) in the touch mode, the user can manipulate the digital copy 328 in the manner described above, even though the digital copy 328 is physically out of the reach of the user 302.

Although not shown, a user can also use a single contact point to manipulate a digital object. For example, the user can use a single finger contact point or a single cursor contact point to move any digital object from a first location on the interactive surface 104 to a second location.

FIG. 16 is a flowchart (and accompanying example) that shows an illustrative procedure 1600 for manipulating a digital object by placing a device on top of the digital object and metaphorically using the device as a handle to move the digital object or perform some other action on the digital object.

In block 1602, the IMM 112 detects the movement of the device over a digital object.

In block 1604, the IMM 112 manipulates the digital object using the device as a handle, in a manner instructed by the user.

For example, consider the scenario depicted to the right of the flowchart blocks in procedure 1600. Here, a user has placed a mouse-type device 1606 over the top of a digital object 1608 of any type that is displayed on the interactive surface 104. The user can then manipulate the digital object 1608 in any manner using the mouse-type device 1606, e.g., by rotating the digital object 1608, sliding the digital object 1608 to another position, and so on. The association between the mouse-type device 1606 and the digital object 1608 can be broken when the user lifts the mouse-type device 1606 off the interactive surface 104. Alternatively, or in addition, the handle-like capabilities of the mouse-type device 1606 can be activated and deactivated by pressing and releasing a mouse button that is assigned to this function.

B.3. Mechanisms for Creating and Manipulating Digital Copies (FIGS. 17-21)

The next series of flowcharts show various techniques for generating copies of any type of physical article, such as, but not limited to, a tangible (e.g., "hard-copy") document. The flowcharts also show techniques for interacting with the digital copies that have been generated. The generation and manipulation of digital copies is particularly useful in a collaborative environment. For example, as shown in FIG. 3, the user 310 is interacting with a physical article 326. The user 310 can generate digital copies of this physical article 326 (e.g., digital copies 328 and 346) for distribution to other users (e.g., users 302, 308). This makes it easy for the other users (302, 308) to examine the information imparted by the physical article 326, e.g., without requiring the user's (302, 308) to crowd around the user 310 to examine the original physical article 326, and without requiring the users (302, 308, 310) to circulate the physical article 326 amongst themselves in the traditional temporally-successive manner. Further, actions taken by any user with respect to a digital copy can automatically cause corresponding operations to be performed on the physical article, and vice versa. This also facilitates the collaborative nature of the environment, e.g., by providing a convenient mechanism whereby any user can point out a feature of interest to one or more other users stationed at different locations about the perimeter of the interactive surface 104.

Figure 17:
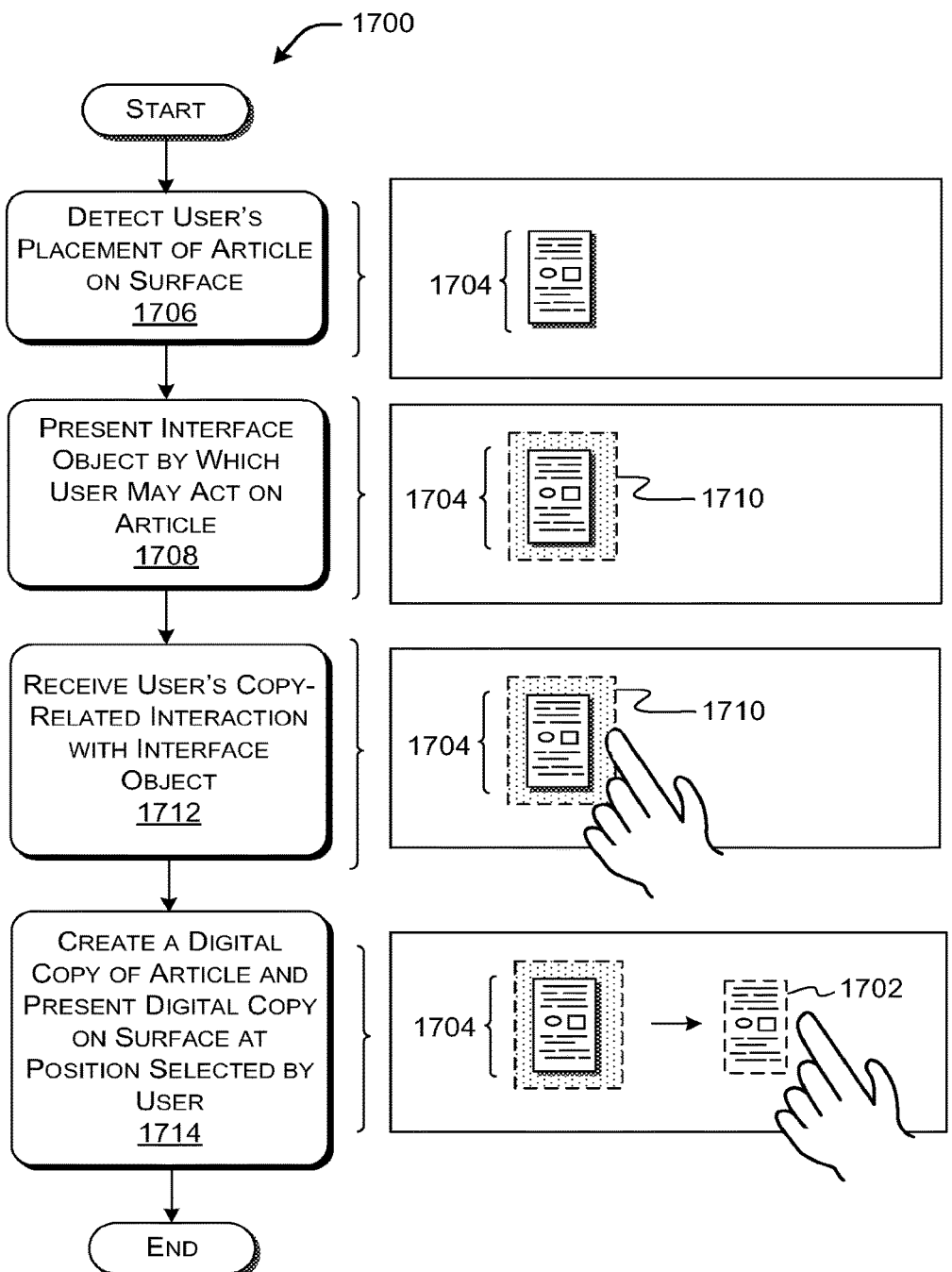
FIG. 17 is a flowchart (and accompanying example) that shows an illustrative procedure for creating a digital copy based on a physical article that is placed on the interactive surface.

Starting with FIG. 17, this figure is a flowchart (and accompanying example) that shows an illustrative procedure 1700 for creating a digital copy 1702 based on a physical article 1704 that is placed on the interactive surface 104.

In block 1706, the IMM 112 detects that the user has placed the physical article 1704 on the interactive surface 104. This detection operation can be performed based on the output of the position-detection modules 210, or by using some other input mechanism or combination of input mechanisms. The IMM 112 can distinguish the physical article 1704 from a finger contact point (and other objects) using contour analysis. The IMM 112 can distinguish the physical article 1704 from an input device by noting the lack of a telltale marking on the physical article 1704 that identifies an object as an input device.

In block 1708, the IMM 112 presents an interface object 1710 in association with the physical article 1704. The interface object 1710 is a digital object which allows the user to interact with the physical article 1704, e.g., to make digital copies of the physical article 1704 and perform other operations. In the merely representative example of FIG. 17, the interface object 1710 corresponds to a halo or a border that is formed around the physical object 1704. Any other type of interface object can be used to accomplish the functions of procedure 1700. For example, another interface object (not shown) can correspond to one or more digital pull tabs that protrude from a corner (or corners) of the physical article 1704.

In block 1712, the IMM 112 detects that the user has engaged the interface object 1710 in a manner indicative of an intent to create a digital copy of the physical article 1704. In one case, assume that the use touches the interface object 1710 with a finger and then, while maintaining the finger pressed against the interactive surface 104, drags the finger away from the physical article 1704. The IMM 112 can interpret this motion as an instruction to create a digital copy of the physical article 1704. This motion resembles the act of sliding a topmost card off of a deck of cards. The same movement can be performed using a cursor contact point instead of a finger contact point. Further, to repeat, other interface objects and associated telltale movements can be used to instruct the IMM 112 to create a digital copy. The IMM 112 can detect the telltale movement using any one or more of the detection mechanisms described above (e.g., using the position-detection modules 210 and/or the high-resolution imaging modules 208, etc.).

In block 1714, the IMM 112, having detected the type of telltale movement described above, creates the digital copy 1702 of the physical article 1704. In one case, the IMM 112 can "deposit" the digital copy 1702 at a location at which the user terminates his or her finger-dragging motion and lifts his or her finger from the interactive surface 104. Although not shown, the IMM 112 can also allow the user specify various attributes which govern the copying operation, e.g., by specifying a number of copies to be produced, a size-scaling ratio to be used, a copying density to be used, and so on.

Different environment-specific considerations can be used to determine the exact timing at which the IMM 112 captures the image of the physical article 1704. In one non-limiting case, the IMM 112 captures the image of the physical article 1704 when the user removes his or her finger from the interactive surface 104, e.g., at the end of the dragging operation. This timing can reduce the likelihood that the IMM 112 will capture part of the user's body when taking a picture of the physical article 1702.

Figure 18:
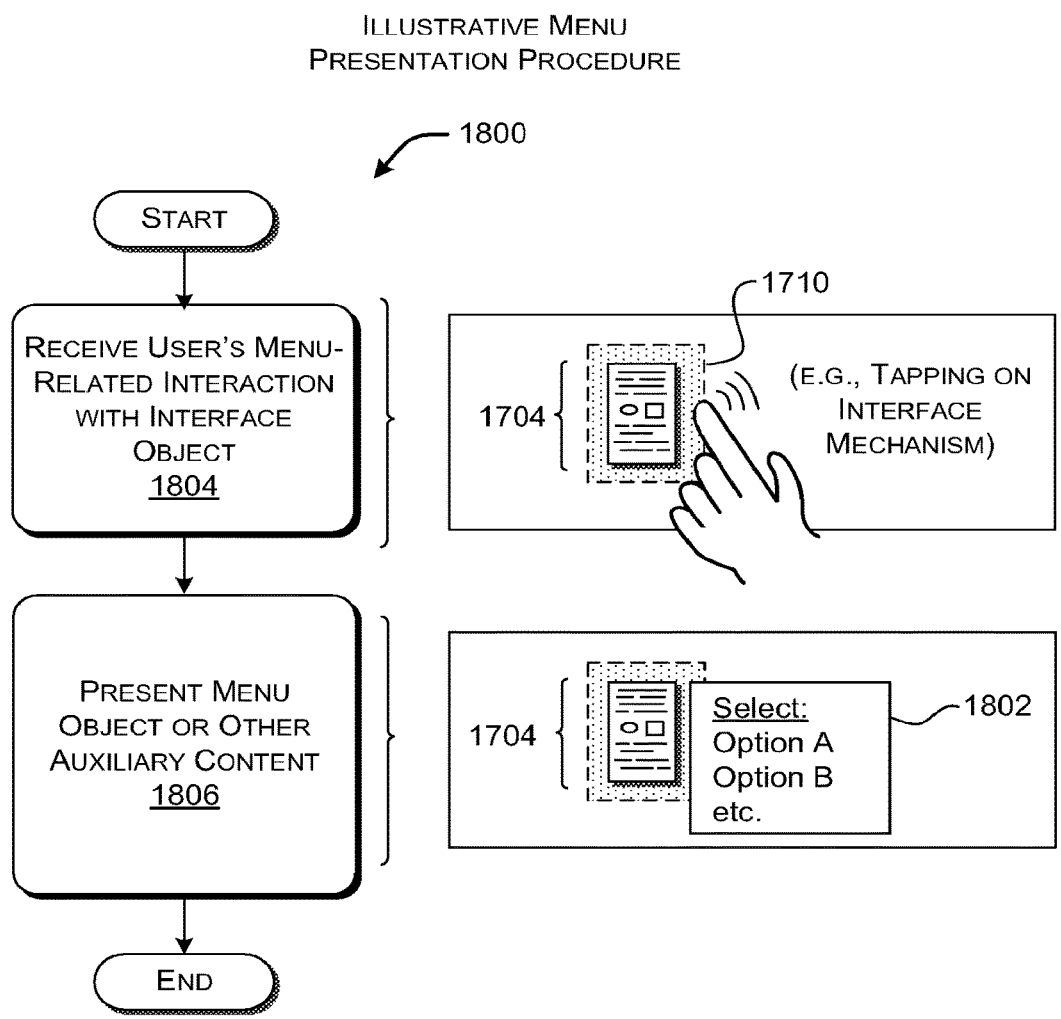
FIG. 18 is a flowchart (and accompanying example) that shows an illustrative procedure for presenting a menu object in association with an article that is placed on the interactive surface.

FIG. 18 is a flowchart (and accompanying example) that shows an illustrative procedure 1800 for presenting a menu object 1802 in association with a physical article (e.g., physical article 1804) that is placed on the interactive surface 104. More specifically, in addition to serving as a tool to perform the copying operation (described in FIG. 17), the interface object 1710 can be activated to perform other operations, such as the presentation of the menu object 1802.

In block 1804, the IMM 112 identifies an action by the user that is indicative of the user's desire to engage the interface object 1710 to perform a task other than the creation of a digital copy of the physical article 1704. For example, in one merely illustrative case, the user may tap on the interface object 1710 twice in rapid succession with a finger or with a simulated finger contact point (controlled by a mouse-type device). In the example of FIG. 18, the IMM 112 interprets this action as a request to activate the menu object 1802.

In block 1806, the IMM 112 presents the menu object 1802 to the user. The IMM 112 can display this menu object 1802 in any location, such as at the periphery of the interface object 1710. The menu object 1802 can provide any number of options for performing any number of operations with respect to the physical article 1704, such as printing a digital copy of the physical article 1704, saving a digital copy of the physical article 1704, and so on. Alternatively, or in addition, the menu object 1802 can serve as a tool which allows the user to adjust the settings which govern the copying operation (of FIG. 17).

Figure 19:
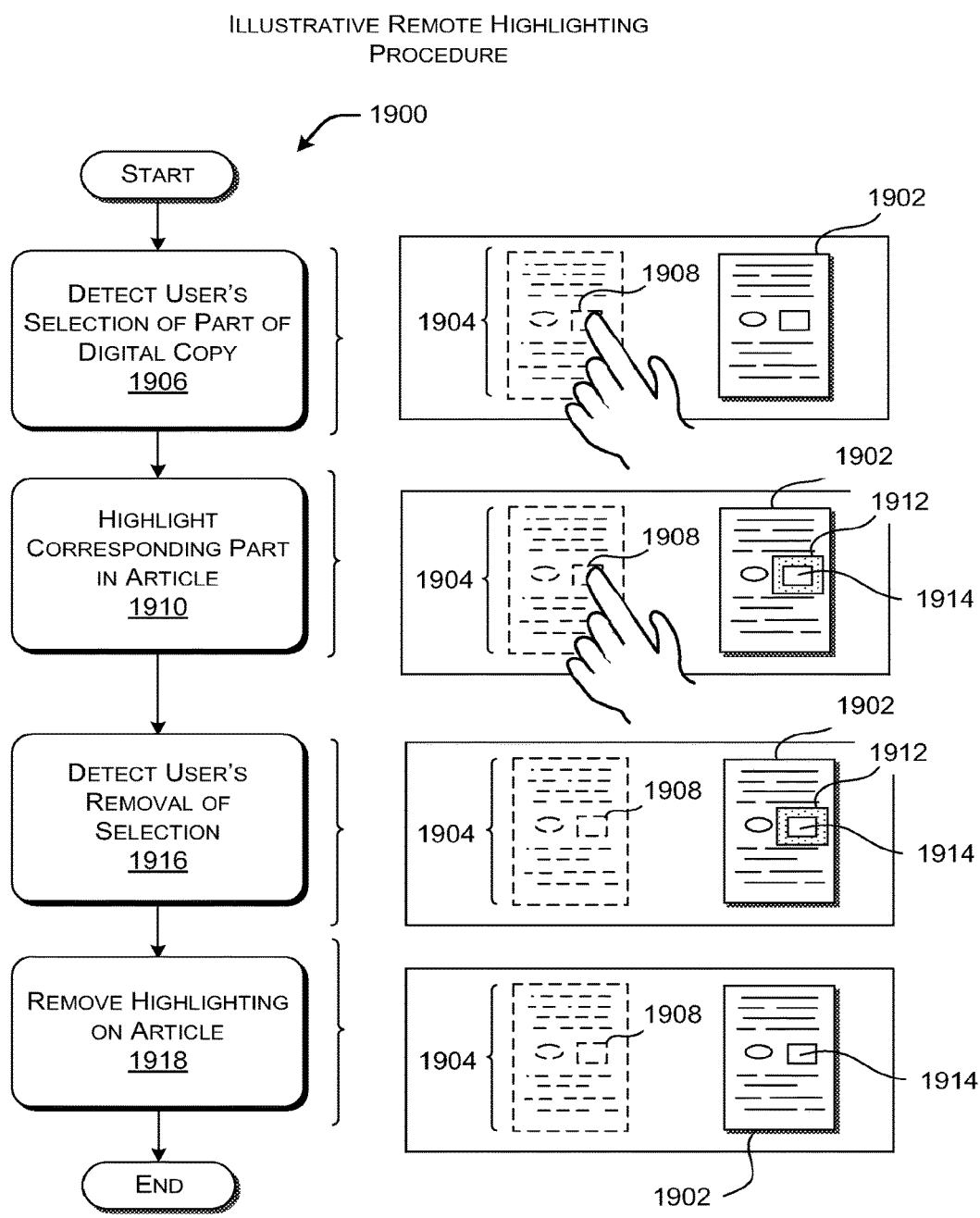
FIG. 19 is a flowchart (and accompanying example) that shows an illustrative procedure for highlighting a part of an article based on a selection of a corresponding part of a digital object (or vice versa).

FIG. 19 is a flowchart (and accompanying example) that shows an illustrative procedure 1900 for highlighting a part of a physical article 1902 based on a selection of a corresponding part of a digital copy 1904 (or vice versa).

In block 1906, the IMM 112 detects that the user has selected a part 1908 of the digital copy 1904. For example, the user may point to the particular part 1908 of the digital copy 1904 using a finger, a stylus, a cursor, or other contact point.

In block 1910, the IMM 112 can provide highlighting 1912 to a part 1914 of the physical article 1902. The part 1914 corresponds to the selected part 1908 of the digital copy 1904. The IMM 112 can perform this function by mapping positions in the digital copy 1904 to corresponding positions in the physical article 1902. The IMM 112 can highlight the part 1914 of the physical copy 1902 in any way, such as by projecting an image of a border around the part 1914, projecting an arrow (or the like) which points out the part 1914, projecting a light beam which brightens the part 1914, and so on.

In block 1916, the IMM 112 detects that the user has de-selected the part 1908 of the digital copy 1904, e.g., by removing his or her finger from the part 1908.

In block 1918, the IMM 112 removes the highlighting 1912 from the corresponding part 1914 of the physical article 1902.

Although not shown, the user can select a part of the physical article 1902 in the manner described above, which prompts the IMM 112 to add highlighting to a corresponding part of the digital copy 1904. As before, the IMM 112 can remove the highlighting when the user de-selects the previously selected part of the physical article 1902. In this scenario, the input functionality 108 can include another position-detection system (not shown) which has the capability of detecting actions taken by the user directly above the physical article 1902. For instance, the input functionality 108 can include a remote sensing mechanism of any type that is positioned above the interactive surface 104. Alternatively, or in addition, the input functionality 108 can include a touch-sensitive input mechanism that is integrated (e.g., internal to) the interactive surface 104 itself In other cases, the IMM 112 can give the user the option of preserving the highlighting applied to the physical article 1902 or the digital copy 1904 after the user has de-selected a previously selected part. For example, instead of adding an impermanent highlighting to the digital copy 1904 in the manner described above, the user can add a digital mark to the digital copy 1904. This causes the IMM 112 to add a corresponding digital mark to the physical article 1902. The digital mark applied to the physical article 1902 could remain after the user has finished engaging the digital copy 1904 (but it is also possible to give the user the option of "erasing" digital marks applied to the physical article 1904).

Figure 20:
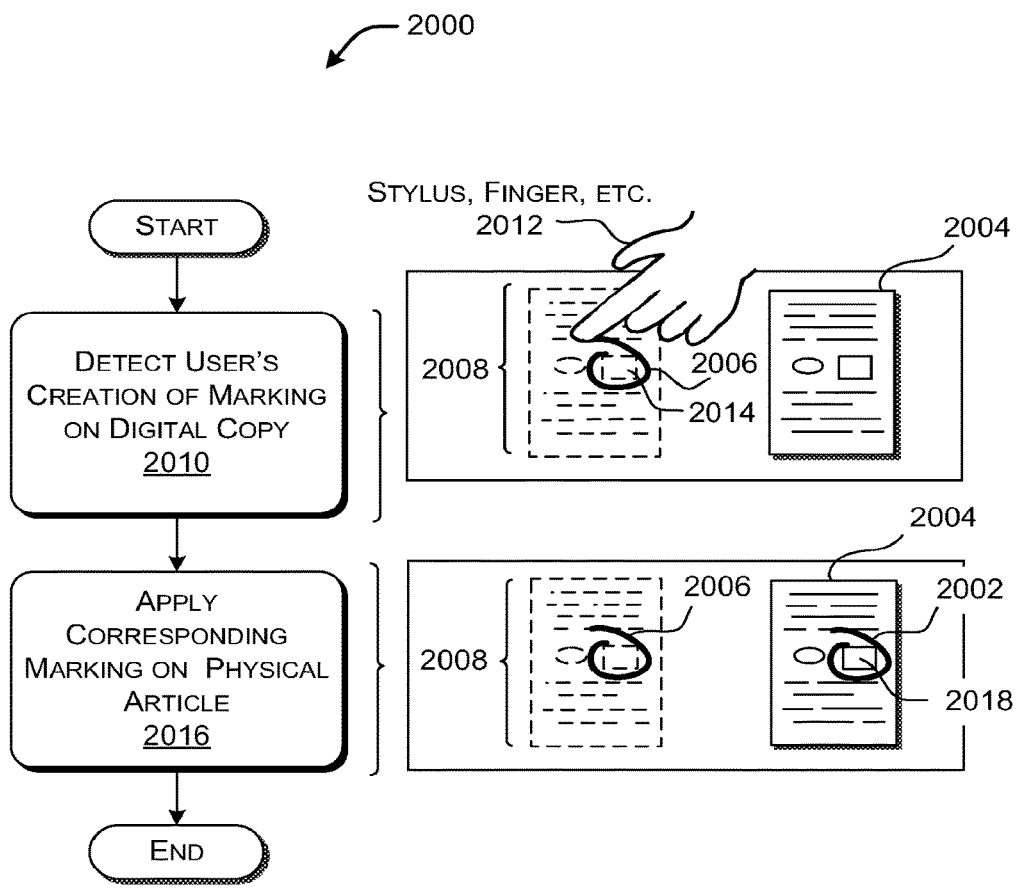
FIG. 20 is a flowchart (and accompanying example) that shows an illustrative procedure for creating a digital mark on a physical article based on a corresponding digital mark that is made to a digital copy.

FIG. 20 expands on the above-identified concept; namely, FIG. 20 is a flowchart (and accompanying example) that shows an illustrative procedure 2000 for creating a digital mark 2002 on a physical article 2004 based on a corresponding digital mark 2006 that is made to a digital copy 2008.

In block 2010, the IMM 112 detects that the user has placed the digital mark 2006 on the digital copy 2008. The user can create this digital mark 2006 using any mechanism 2012, such as a finger, stylus, cursor, and so on. In the merely illustrative scenario of FIG. 20, the user uses a finger to circle a particular part 1214 of the digital copy 2008. The IMM 112 can detect the creation of the digital mark 2006 using any one or more of the detection mechanisms described above (e.g., using the position-detection modules 210 and/or high-resolution imaging modules 208, etc.).

In block 2016, the IMM 112 applies a corresponding digital mark 2002 to a corresponding part 2018 of the physical article 2004. Unlike the case of FIG. 19, the digital mark 2002 remains on the physical article 2004, although it is also possible to provide a mechanism that allows a user to "erase" such digital marks 2002.

The procedure 2000 shown in FIG. 20 can be performed in reverse, e.g., by detecting that a user has made a physical mark (or digital mark) to the physical article 2004, and then, in response, adding a corresponding digital mark to the digital copy 2008. In this scenario, the IMM 112 can determine that a physical mark has been added by forming a difference image which reflects the difference between the physical article at time $t_1$ (before the physical mark was added) and time $t_2$ (after the physical mark was added). The digital counterpart of the physical mark can be obtained based on this difference image.

Figure 21:
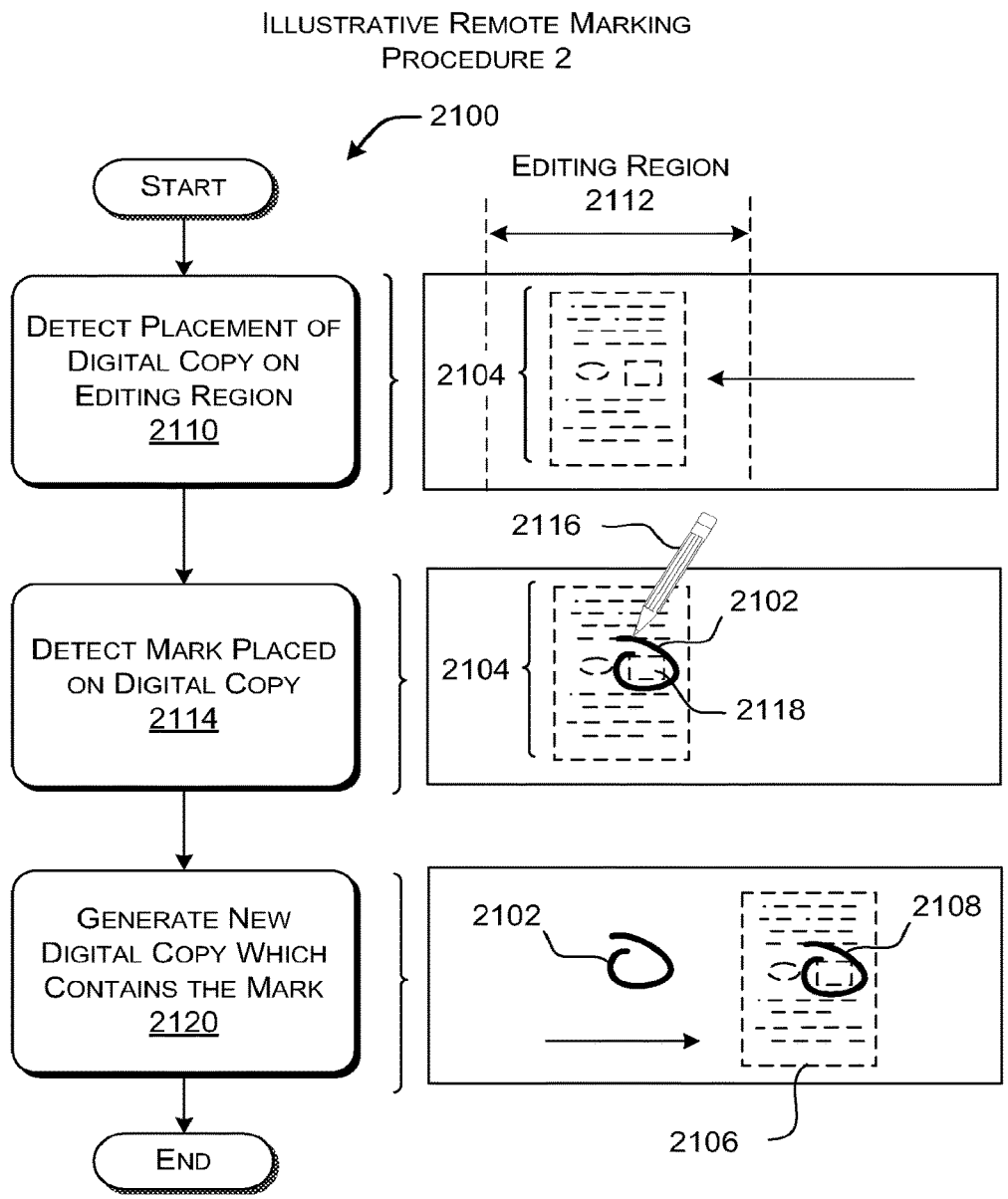
FIG. 21 is a flowchart (and accompanying example) that shows an illustrative procedure for applying a physical mark to a digital copy of an article within an editing region of the interactive surface, followed by generating a new digital copy of the article which includes a digital representation of the mark.

FIG. 21 is a flowchart (and accompanying example) that shows an illustrative procedure 2100 for applying a mark 2102 to a digital copy 2104 of a physical article (not shown), followed by generating a new digital copy which includes a digital mark 2108 that is a digital representation of the physical mark 2102.

In block 2110, the IMM 112 detects that the user has moved a digital copy 2104 of a physical article over an editing region 2112. The editing region 2112, in one illustrative case, may correspond to a white board section of the interactive surface 104. Or the editing region 2112 can correspond to a piece of paper (or the like) placed on the surface of the interactive surface 104. The users can draw on this editing region 2112, e.g., using a pen, pencil, marker, etc. The editing region 2112 has a defined size. In one case, the IMM 112 can "snap" the digital copy 2104 to the size of the editing region 2112 when the digital copy 2104 is moved over the editing region 2112, that is, by modifying the size of the digital copy 2104 such that it conforms to the size of the editing region 2112. Once the digital copy 2104 has become associated with the editing region 2112, the digital copy 2104 can remain "attached" to the editing region 2112. Thus, when (and if) the editing region 2112 is moved on the interactive surface 104 (e.g., by moving a whiteboard or paper associated with the editing region 2112), the digital copy 2104 is moved along with it. This mechanism provides another way of moving a digital copy on the interactive surface 104, e.g., by metaphorically using the editing region 2112 as a plate on which to move the digital copy 2104.

In block 2114, the IMM 112 detects that the user has created a physical mark 2102 "on" the digital copy 2104 (e.g., using the detection technique described above with respect to FIG. 20). The physical mark 2102 is physically formed on the underlying substrate provided by the editing region 2112. In this merely illustrative case, the user uses an instrument 2116 to circle apart 2118 of the digital copy 2104.

In block 2120, the IMM 112 generates a new digital copy 2106 of the previous digital copy 2104. The new digital copy 2106 includes a digital mark 2108 which is the digital counterpart to the physical mark 2102 drawn "on" the previous version of the digital copy 2104. In the example of FIG. 21, the user has also moved the new digital copy 2106 away from the editing region 2112, which reveals the "naked" original physical mark 2102 placed on the editing region 2112.

The IMM 112 can perform the operation of block 2118 in various ways. According to one technique, the IMM 112 can take another picture of the digital copy 2104 (with mark 2102 added thereto), potentially with a different exposure to account for the fact that the IMM 112 is now taking a picture primarily of an image (with the exception of the physical mark 2102), rather than the original physical document. In another technique, the IMM 112 can momentarily turn off the projection of the digital copy 2104, which will reveal the naked physical mark 2102. The IMM 112 can capture an image of the physical mark 2102 and then digitally composite the image of the physical mark 2102 with the original digital copy 2104 to generate the new digital copy 2106. Still other techniques can be used to generate the new digital copy 2106.

The procedure 2100 described above can be repeated one or more times. For each iteration, the user may provide additional annotations to the digital object in the manner described above.

More generally, any of the techniques described in subsection B.3 can be combined together in any manner.

Moreover, in the above examples, the physical article corresponds to a physical document, such as a paper document. But the procedures described above can be applied to any physical object. For example, in another case, the physical object corresponds to a three-dimensional object. In another case, the physical object includes a screen which displays information thereon. In another case, the physical object comprises (or includes) a part of the user's anatomy. For example, in the procedure 1700 of FIG. 17, the user may wish to create a digital copy of a document in which the user is physically pointing to a particular passage in the document. Still other applications are possible.

Figure 22:
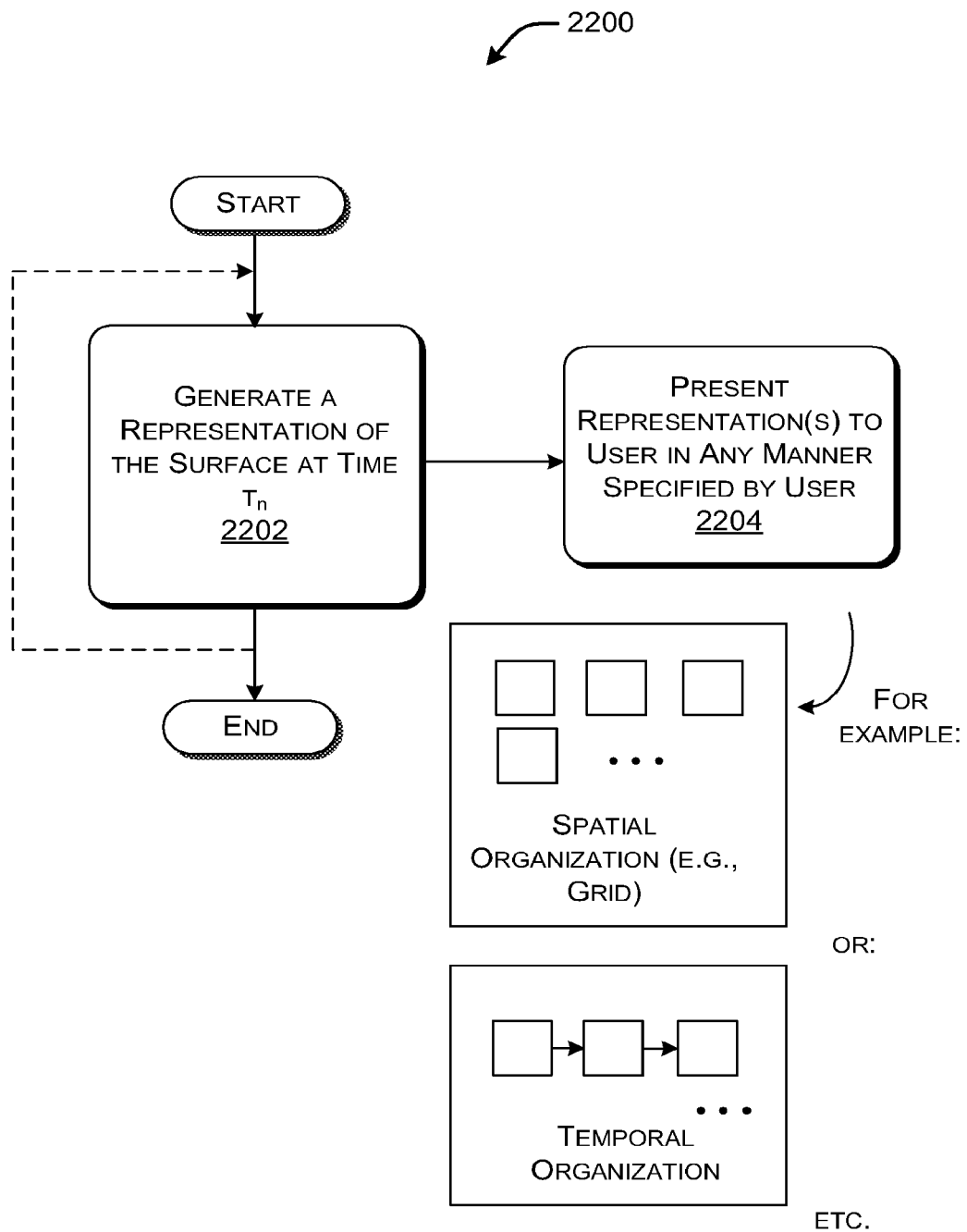
FIG. 22 is a flowchart that shows an illustrative procedure for generating a series of representations of an interactive surface (and/or a series of representations of any individual object that has appeared on the interactive surface) at different respective times, and displaying any information regarding this series to a user.

B.4. Mechanisms for Capturing a History of Actions and Performing Other Surface Management Functions FIG. 22 is a flowchart that shows an illustrative procedure 2200 for generating a series of representations of the interactive surface 104 at different respective times, and displaying any information regarding this series to a user.

In block 2202, the IMM 112 can take a picture of the entire interactive surface 104 at a time $t_n$. The IMM 112 can form this picture in different ways, such as by taking a single picture of the interactive surface 104 with both physical objects and digital objects placed thereon. Or the IMM 112 can form a composite image in the manner described above in the context of the explanation of FIG. 21, e.g., by turning the projection off, taking a picture of the physical articles on the interactive surface 104, and then combining that picture with the digital objects that are projected onto the interactive surface 104.

Different events can trigger the image capture operation. In one case, the IMM 112 periodically captures an image of the interactive surface 104 (e.g., at every n seconds or at every n minutes, and so on). Alternatively, or in addition, the user can expressly instruct the IMM 112 to capture images at various times of interest. Alternatively, or in addition, the IMM 112 can automatically capture images when it independently detects that something noteworthy is happening on the interactive surface 104, such as when a user adds a new device to the interactive surface 104, or when a user moves an existing device or digital object on the interface surface 104, and so on. Upon repetition, block 2202 establishes a plurality of images of the interactive surface taken at different respective times. The IMM 112 can archive the images in a suitable data store or stores (not shown).

In block 2204, the user can instruct the IMM 112 to show any of the images that it has previously recorded in block 2202. In one case, the user can ask the IMM 112 to show a selected image or selected images. In another case, the user can ask the IMM 112 to display a sequence of the recorded images in the order in which these images were captured over an identified time span. In this latter scenario, the IMM 112 can present the images in an animated manner or a pseudo (roughly) annotated manner.

Procedure 2200, as described above can be used to form a series of representations of the entire interactive surface 104. Alternatively, or in addition, the procedure 2200 can be used to form a series of representations of parts of the interactive surface 104, such as individual objects placed on the interactive surface 104 (including physical objects and/or digital objects), even though the user may not have expressly requested that these representations be formed). For example, the procedure 2200 can be used to show the evolution of changes made to an individual copy of a physical document or the like. The IMM 112 can obtain representations of physical objects using, for example, the masking procedure of FIG. 8 or the like. The IMM 112 has immediate access to digital objects that it projects onto the interactive surface 104.

The IMM 112 can provide various interface mechanisms for use in conjunction with the procedure 2200 of FIG. 22. For example, the IMM 122 can display a container-type digital object (not shown) on the interactive surface 104. The container-type digital object acts as an interface to a collection of digital objects (associated with individual items that have appeared on the interactive surface 104 and/or representations of the entire interface surface 104). The user can organize the digital objects in the container-type digital object using one or more views. A first view allows the user to arrange the digital objects in a grid format or other spatial organization format. A second view allows the user to arrange the digital objects in a flip-book format, e.g., as a temporal sequence of objects. In one case, the user can also manipulate any digital object via the container-type digital object, such as by scaling the digital object, rotating the digital object, and so on.

The IMM 112 can also include mechanisms that allow a user to "clean up" the interactive surface 104, e.g., by removing digital objects from the interactive surface. In one case, the IMM 112 can provide a command which allows the user to delete (e.g., remove) all digital objects from the interface surface 104. In addition, or alternatively, the IMM 112 can provide a command that allows a user to delete identified digital objects.

C. Representative Processing Functionality

FIG. 23 sets forth illustrative electrical data processing functionality 2300 (simply "processing functionality" below) that can be used to implement any aspect of the functions described above. With reference to FIG. 1, for instance, the type of processing functionality 2300 shown in FIG. 23 can be used to implement any aspect of the interactive surface environment 100. In one case, the processing functionality 2300 may correspond to any type of computing device.

The processing functionality 2300 can include volatile and non-volatile memory, such as RAM 2302 and ROM 2304, as well as one or more processing devices 2306. The processing functionality 2300 also optionally includes various media devices 2308, such as a hard disk module, an optical disk module, and so forth. The processing functionality 2300 can perform various operations identified above when the processing device(s) 2306 execute instructions that are maintained by memory (e.g., RAM 2302, ROM 2304, or elsewhere). More generally, instructions and other information can be stored on any computer-readable medium 2310, including, but not limited to, static memory storage devices, magnetic storage devices, optical storage devices, and so on. The term "computer-readable medium" also encompasses plural storage devices. The term "computer-readable medium" also encompasses signals transmitted from a first location to a second location, e.g., via wire, cable, wireless transmission, etc.

The processing functionality 2300 also includes an input/output module 2312 for receiving various inputs from a user (via input modules 2314), and for providing various outputs to the user (via output modules 2316). FIGS. 1 and 2 describe various types of such input modules 2312 and output modules 2314 (e.g., corresponding to the input functionality 108 and content-projection functionality 106, respectively). The processing functionality 2300 can also include one or more network interfaces 2318 for exchanging data with other devices via one or more communication conduits 2320. One or more communication buses 2322 communicatively couple the above-described components together.

In closing, the description may have described various concepts in the context of illustrative challenges or problems. This manner of explication does not constitute an admission that others have appreciated and/or articulated the challenges or problems in the manner specified herein.

More generally, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
one or more processing devices; and
one or more computer-readable memory devices or storage devices storing computer-readable instructions which, when executed by the one or more processing devices, cause the one or more processing devices to:
detect a physical object placed on an interactive surface;
display a digital object on the interactive surface, the digital object being a digital copy of the physical object;
detect multiple contact points on the interactive surface, the multiple contact points engaging the digital object displayed on the interactive surface, at least one of the multiple contact points being a cursor contact point simulating a finger contact point, the cursor contact point being controlled by an input device that is operating in a touch mode and is operable in at least one other mode; and
manipulate an orientation, size, or location of the digital object on the interactive surface responsive to the multiple contact points.

2. The system of claim 1, wherein:
the orientation of the digital object is manipulated; and
the computer-readable instructions, when executed by the one or more processing devices, cause the one or more processing devices to rotate the digital object around a fixed pivot defined by one of the multiple contact points.

3. The system of claim 1, further comprising:
an infrared emitter-detector configured to detect the multiple contact points.

4. The system of claim 1, further comprising:
a projector disposed above the interactive surface and configured to project the digital object onto the interactive surface.

5. The system of claim 1, further comprising:
a projector integrated into the interactive surface and configured to project the digital object on the interactive surface.

6. A system comprising:
one or more processing devices; and
one or more computer-readable storage media storing computer-readable instructions which, when executed by the one or more processing devices, cause the one or more processing devices to:
display a digital copy of a physical article placed on an interactive surface;
receive a finger touch contact at a first part of the digital copy displayed on the interactive surface; and
responsive to the finger touch contact, display a digital mark at a second part of the physical article,
wherein a position of the second part on the physical article maps to a corresponding position of the first part on the digital copy.

7. The system of claim 6, wherein the digital mark is a digital highlight.

8. The system of claim 6, wherein the computer-readable instructions further cause the one or more processing devices to:
detect that the finger touch contact has been removed from the digital copy; and
responsive to removal of the finger touch contact from the digital copy, remove the digital mark from the physical article.

9. The system of claim 6, wherein the computer-readable instructions further cause the one or more processing devices to:
detect that the finger touch contact has been removed from the digital copy; and
preserve the digital mark on the physical article after removal of the finger touch contact.

10. The system of claim 6, wherein the computer-readable instructions further cause the one or more processing devices to:
responsive to the finger touch contact, display a matching digital mark at the first part of the digital copy.

11. The system of claim 6, further comprising:
an infrared emitter-detector configured to detect the finger touch contact.

12. The system of claim 6, further comprising:
a projector disposed above the interactive surface and configured to project the digital copy of the physical article onto the interactive surface.

13. The system of claim 6, wherein the computer-readable instructions further cause the one or more processing devices to:
display another digital copy of the physical article that includes the digital mark.

14. The system of claim 6, wherein the interactive surface includes an editing region for creating the digital mark.

15. A method, comprising:
detecting a physical object placed on an interactive surface;
displaying a digital object on the interactive surface, the digital object being a digital copy of the physical object;
detecting multiple contact points on the interactive surface, the multiple contact points engaging the digital object displayed on the interactive surface, at least one of the multiple contact points being a cursor contact point simulating a finger contact point, the cursor contact point being controlled by an input device that is operating in a touch mode and is operable in at least one other mode; and
manipulating an orientation, size, or location of the digital object on the interactive surface responsive to the multiple contact points.

16. The method of claim 15, wherein manipulating the orientation of the digital object comprises:
rotating the digital object around a fixed pivot defined by one of the multiple contact points.

17. The method of claim 15, further comprising:
detecting a movement of the input device when the input device is operating in the at least one other mode; and
in response to detecting the movement, moving a cursor on the interactive surface in correspondence with the movement of the input device.

18. A method, comprising:
displaying a digital copy of a physical article placed on an interactive surface;
receiving a finger touch contact at a first part of the digital copy displayed on the interactive surface; and
responsive to the finger touch contact, displaying a digital mark at a second part of the physical article,
wherein a position of the second part on the physical article maps to a corresponding position of the first part on the digital copy.

19. The method of claim 18, further comprising:
responsive to the finger touch contact, displaying a matching digital mark at the first part of the digital copy.

20. The method of claim 18, further comprising:
displaying another digital copy of the physical article that includes the digital mark.

* * * * *